US005870608A

United States Patent [19]

Gregory

[11] Patent Number: 5,870,608

[45] **Date of Patent: *Feb. 9, 1999**

[54] METHOD AND APPARATUS FOR DISPLAYING TEXT INCLUDING CONTEXT SENSITIVE INFORMATION DERIVED FROM PARSE TREE

[75] Inventor: Brent Gregory, Sunnyvale, Calif.

[73] Assignee: Synopsys, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 459,580

[22] Filed: Jun. 2, 1995

Related U.S. Application Data

[63] Continuation-in-part of Ser. No. 253,453, Jun. 3, 1994, abandoned.

[51] Int. Cl.$^{6}$ .................................................... G06F 9/455

[52] U.S. Cl. ............................................................ 395/708

[58] Field of Search ............................................. 395/708

[56] References Cited

U.S. PATENT DOCUMENTS

| | | | |
|---|---|---|---|
| 4,546,435 | 10/1985 | Herbert et al. | 395/705 |
| 4,667,290 | 5/1987 | Goss et al. | 395/707 |
| 4,703,435 | 10/1987 | Darringer et al. | 364/489 |

(List continued on next page.)

OTHER PUBLICATIONS

"7A Programming the User Interface," Manual of Symbolics, Inc., 4 New England Tech Center, 555 Virginia Road, Concord, MA 01742, title page, pp. iii–v and pp. 1–134, Sep. 1986.

Pure Software Inc., Pure Coverage Data Sheet (Web Page), copyright 1996.

Pure Software Inc., Quantify Data Sheet (Web Page), copyright 1996.

Pure Software Inc., Purify, Finding Run–Time Memory Errors (Web Page), copyright 1996.

Reed Hastings et al., Pure Software, Inc., Purify, Usenix White Paper on Purify (Web Page), copyright 1996.

Printout of Web Page for Centerline, Code Center, Release 4, Nov. 1994.

HDC Computer Corporation, FirstApps User's Guide, pp. 112–116, copyright 1992.

Louis Trevillyan, "An Overview of Logic Synthesis Systems," 1987, pp. 166–172.

Timothy Kam, "Comparing Layouts with HDL Models: A Formal Verification Technique," 1992, pp. 588–591.

D. E. Thomas et al., "Algorithmic and Register–Transfer Level Synthesis: The System Architect's Workbench," pp. 257–274, publication date unknown.

(List continued on next page.)

*Primary Examiner*—Emanuel Todd Voeltz
*Assistant Examiner*—John Q. Chavis
*Attorney, Agent, or Firm*—Jonathan T. Kaplan; McDermott, Will & Emery

[57] ABSTRACT

A method and apparatus for displaying text which efficiently couples information derived from the parse tree for the text with the display of the text. Use of parse tree information allows the system to display different parts of the text in a context-sensitive manner. The method involves creating a parse array from a parse tree for the text. The parse array contains a compressed representation of the nodes of the parse tree. This parse array is used to find the parse node which corresponds to a particular location in the text. The parse array can be traversed to a chosen character using a stack. In one embodiment the stack can be saved periodically to improve performance so that the parse node corresponding to a character can be more quickly determined. The parse array is also used to find the entire portion of the text which corresponds to the parse node. The text corresponding to a particular parse node is displayed with a display characteristic which differentiates this portion of the text from the remainder of the text. Thus, a user of this display can view the text in a context-sensitive fashion.

24 Claims, 7 Drawing Sheets

U.S. PATENT DOCUMENTS

| | | | |
|---|---|---|---|
| 4,827,427 | 5/1989 | Hyduke | 364/489 |
| 4,852,173 | 7/1989 | Bahl et al. | 704/240 |
| 4,866,663 | 9/1989 | Griffin | 395/500 |
| 4,868,770 | 9/1989 | Smith et al. | 364/578 |
| 4,882,690 | 11/1989 | Shinsha et al. | 364/490 |
| 4,907,180 | 3/1990 | Smith | 364/578 |
| 4,942,536 | 7/1990 | Watanabe et al. | 364/489 |
| 4,942,615 | 7/1990 | Hirose | 364/578 |
| 4,967,386 | 10/1990 | Maeda et al. | 364/578 |
| 4,970,664 | 11/1990 | Kaiser et al. | 364/488 |
| 5,111,413 | 5/1992 | Lazansky et al. | 364/578 |
| 5,146,583 | 9/1992 | Matsunaka et al. | 395/500 |
| 5,191,541 | 3/1993 | Landman et al. | 364/489 |
| 5,191,646 | 3/1993 | Naito et al. | 395/704 |
| 5,265,254 | 11/1993 | Blasciak et al. | 395/703 |
| 5,282,146 | 1/1994 | Aihara et al. | 364/489 |
| 5,282,148 | 1/1994 | Poirot et al. | 364/491 |
| 5,329,471 | 7/1994 | Swoboda et al. | 395/183.06 |
| 5,335,191 | 8/1994 | Kundert et al. | 364/578 |
| 5,377,997 | 1/1995 | Wilden et al. | 463/43 |
| 5,437,037 | 7/1995 | Furuichi | 395/707 |
| 5,446,900 | 8/1995 | Kimelman | 395/705 |
| 5,452,239 | 9/1995 | Dai et al. | 364/578 |
| 5,530,841 | 6/1996 | Gregory et al. | 395/500 |
| 5,541,849 | 7/1996 | Rostoker et al. | 364/489 |
| 5,544,066 | 8/1996 | Rostoker et al. | 364/489 |
| 5,544,067 | 8/1996 | Rostoker et al. | 364/489 |
| 5,544,068 | 8/1996 | Takimoto et al. | 364/489 |
| 5,553,002 | 9/1996 | Dangelo et al. | 364/489 |
| 5,555,201 | 9/1996 | Dangelo et al. | 364/489 |
| 5,557,531 | 9/1996 | Rostoker et al. | 364/489 |
| 5,613,117 | 3/1997 | Davidson et al. | 395/708 |
| 5,659,753 | 8/1997 | Murphy et al. | 395/705 |

OTHER PUBLICATIONS

Brian Ebert et al., "SeeSaw: A Verilog Synthesis Viewer," pp. 55–60, publication date unknown.

Joseph S. Lis et al., VHDL Synthesis Using Structured Modeling, pp. 606–609; 26th ACM/IEEE Design Automation Conference©; Las Vegas Convention Center, Jun. 25, 1989, Proceedings 1989.

Sougata Mukherjea et al., Applying Algorithm Animation Techniques for Program Tracing, Debugging, and Understanding; Proceedings 15th International Conference on Software Engineering, May 17, 1993, Baltimore, MD, pp.456–465.

METHOD AND APPARATUS FOR DISPLAYING TEXT INCLUDING CONTEXT SENSITIVE INFORMATION DERIVED FROM PARSE TREE

RELATED APPLICATIONS

This application is a continuation-in-part of application Ser. No. 08/253,453, filed Jun. 3, 1994 now abandoned.

BACKGROUND OF THE INVENTION

1. Field of Invention

This invention relates to the field of context sensitive text displays. In particular, this invention relates to determining the display characteristics of text efficiently from the parse node containing the text in a parse derived from the text.

2. Description of Background Art

Computers have long been used to display text to humans to facilitate editing and understanding. Typically, a human using a computer to manipulate or view a block of text. For purposes of illustration, a block of text will be assumed to be simply an array of characters.

In a modern computer text editor or text display tool, displaying text on a computer screen involves several steps. First, the tool needs to identify where in the text array the display should begin. This amounts to having an integer that indicates the starting position in the array. This information can be provided to the tool from the human being by keystrokes indicating a line number or a scroll bar indicating the relative position in the file. Next, the tool needs to "paint" the screen with the characters. Conceptually, the tool gets a character at the indexed point, determines the screen display characteristics, such as color, font, size, or format, associated with that character at that point in the text array, and provides that information to the graphical display hardware. The computer then increments the index and repeats the process with the next character.

Conventional text editors require the user to specify the display characteristics associated with particular points in the text without regard to what the particular text is or "means." However, in certain applications, the text may have context that the computer could use to determine the display characteristics. For example, computer programs are written in computer languages like C, Pascal, or Cobol. A program written in computer language has text strings within it that have a particular meaning or significance, such as keywords like "if", "else", or "while". A more sophisticated text display tool could use this context-sensitive information within the text to define the display characteristics of the text. Borland's C++ development environment for DOS machines provides a text editor that, for example, displays keywords with one color and comments in another color.

Using the context of the text to determine the display characteristics presents computational performance problems. The user wants to see the text displayed on the computer screen displayed promptly. However, setting the display characteristics as a function of the context requires that the computer compute the context. That computation can be done at the time the display is requested, or, alternatively, the context computation could be performed at some other, earlier time and the result stored. At the time the display is requested, the computer has to perform some computation either directly or by finding a previous result. This computation takes time. If this time is too long, then the text will not be displayed promptly, thus frustrating the user.

Economically viable context-sensitive text displays therefore must efficiently store and compute the context.

A review of the process of extracting context out of certain kinds of text will clarify the problems a context-sensitive display has. One place that context extraction occurs is in the process of generating executable machine code from the text of a computer program written in a high level language. This process is called compilation. Compilation involves several steps: lexical analysis, parsing, code generation, and optimization. Only lexical analysis and parsing are relevant for purposes of displaying context sensitive information Lexical analysis involves breaking the text into distinct, non-overlapping text strings in accordance with the rules of a specified language. These non-overlapping objects are referred to as tokens. The lexical analyzer can characterize some of these text strings because the text matches a keyword, or is a number or a symbol such as "&". Lexical analysis is computationally fast because it relies only on "local" information to determine where the next token begins and ends.

After the lexical analyzer breaks the text into tokens, a parser converts the entire sequence of tokens into a parse tree that describes the computer program's structure. From this parse tree, the code generator can create blocks of executable code corresponding to the nodes of the parse tree. The code generator can then link the blocks together to make an executable program. An optimizer can then look for improvements to make in each block to reduce the amount of memory required to store the executable code or to decrease the run time of the executable code. The nature and mathematical structure of compilers is described in Compilers Principles, Techniques and Tools, by Alfred Aho, Ravi Sethi, and Jeffrey Ullman, 1986, ISBN 0-201-10088-6 which is hereby incorporated by reference. The steps for building a compiler are shown in Introduction to Compiler Construction with UNIX by Axel T. Schreiner and H. George Friedman, Jr., published by Prentice-Hall, 1985, ISBN 0-13-474396-2, which is hereby incorporated by reference.

If it is only desired to modify the display characteristics of the text depending solely on information that can be obtained "locally" from a lexical analyzer, then a text display tool can perform lexical analysis at the time it scans the text for the display. For common computer languages, this would allow the display tool to paint different keywords in different colors without a noticeable performance problem. However, this may not produce enough information for the user.

Changing the display characteristics of the text in accordance with information associated with the corresponding parts of a parse tree can be very useful. However, because constructing a parse tree requires processing all of the text, a tool using the parse tree to determine the display characteristics of the text will probably not be able to compute the entire parse tree every time the display needs to be changed. Therefore, such a display tool will generally require that the parse tree be generated once and stored, and then accessed when the need arises. However, conventional parse trees occupy significant amounts of memory, and require a substantial amount of time to build.

The memory requirements of a conventional parse tree are straight-forward to compute. Consider a text block consisting of N characters. Experience has shown that a file of N characters will generate a parse tree with N/4 nodes. A conventional parse tree which has nodes with a data structure written in C could be declared as follows:

```
typedef tree__nod__struct {
struct pt__node__struct *parent, **children;
int child__count;
char *start__position, *end__position;
int parse__tree__id;
/* other stuff*/
} tree__node__struct, *pt__node;
```

This data structure provides a pointer to the parent node, a pointer to an array of pointers to the children of the node, an integer for counting the number of children, pointers for indicating where, in the text block, the text that generated this node begins and ends, and an integer to indicate what number node this is. In a conventional, 32 bit machine, each node will require one word for the parent pointer, one word to point at the array of children, one word for the child__count, one word each for start__position and end__position, and one word for parse__tree__id. In addition, each node will require an additional word in its parent's array of children. Therefore, each parse node will require 7 words of memory. Therefore, this conventional tree structure will require 7N/4 words to store the parse tree for an N character file. In a conventional machine, there are 4 bytes per word, thus making the conventional data structure consume 7N bytes.

SUMMARY OF INVENTION

This invention provides a compact and easily accessed data structure for representing a parse tree associated with a block of text, and efficiently allowing text associated with a particular parse nodes to be displayed in a manner specified by the parse node. Linking the display characteristics of text with the parse tree associated with the text is particularly useful in viewing the results of circuit analysis for circuits created by synthesis from the same text.

A parse tree consists of one or more parse nodes in a tree configuration. Each parse node has associated with it subordinate parse nodes or a particular contiguous group of characters within the text block. The data structure of this invention represents the parse tree as an array of elements, with each element represented by two bits. The index to this array is related to the position in the text block.

Using two bits for each element provides for four kinds of elements. One element represents the beginning of a parse node, called TREE__START. Another element represents the end of a parse node, called TREE__END. Another element represents the existence of a single character, called TREE__CHAR. To make the parse array more compact, the fourth element represents a fixed number of sequential characters, called the block size. The fourth element is called TREE__BLOCK. In this invention, using the fourth element to represent four characters works well.

Generating the parse array representation from a conventional tree representation can be done by recursively traversing the conventional tree. A TREE__START is written every time a child node is accessed. A TREE__END is written every time a parent node is accessed to after accessing a child node. TREE__BLOCKs and TREE__CHARs are written to reflect the size of the text string found at the node. (See the function "ve__write__paren__tree" in Appendix A for an example.)

Constructing a conventional tree representation from the parse array can be done by sequentially marching through the parse array, keeping a stack of parse nodes, and keeping a current index into the text array. When a TREE__START symbol is encountered, a new node is created, made a child of the current node on the top of the stack, and pushed onto the stack. When a TREE__CHAR or TREE__BLOCK symbol is encountered, the appropriate number of characters beginning with the current index in the text array is assigned to the node at the top of the stack. When a TREE__END symbol is encountered, the stack is popped. (See the function "tree__convert__to__full" in Appendix A for an example.)

Estimating the size of the parse array offers insight into the value of the invention. Each node in the parse tree will require a TREE__START symbol and a TREE__END symbol. These symbols each require 2 bits, so, with 8 bits per byte, each node will therefore require ½ byte. If the file has N characters, and tends to have N/4 nodes, then the node symbols will require (½) *N/4=N/8 bytes. If no compression is used, then there needs to be storage space for an additional N symbols to store the representation of the characters. In this situation, each character requires 2 bits to store, thus the parse array requires N/4 bytes to store the character representation in an uncompressed form. However, experience has shown that using the TREE__BLOCK symbol to represent 4 characters halves the character storage requirement to N/8 bytes. Therefore, the parse array requires N/8 bytes for the node markers, and N/8 bytes for the text, thus requiring N/4 bytes for the entire parse array, compared to the 7N bytes for the conventional approach. The parse array therefore reduces the memory required by a factor of 28 over a conventional parse tree. The reduced memory usage also leads to reduced access times, and therefore a faster performing display tool. In addition, this data structure can be loaded directly from permanent storage, such as a file, because it does not contain pointers. This makes the loading time very small, and initialization very fast.

One disadvantage to using any parse tree to guide the selection of display characteristics is that it is necessary to traverse the parse tree to get to the point in the parse tree that corresponds to the portion of text that needs to be displayed. However, this invention helps reduce this computation by creating a table that is keyed to the line number in the text file. This table stores a copy of the stack created by traversing the parse tree to the point in the text file corresponding to the end of the particular line. To further reduce storage requirements, a stack only needs to be saved every several text lines. (Every 16 lines works well.) When it comes time to get information from the parse tree, it is only necessary to get a copy of the stack corresponding to the nearest preceding recorded line, and continue traversing the parse tree from there.

DETAILED DESCRIPTION OF A PREFERRED EMBODIMENT

The present invention comprises a novel method and provides a novel structure for compactly storing a parse tree and using that parse tree to change the display characteristics of the associated text efficiently. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 7:
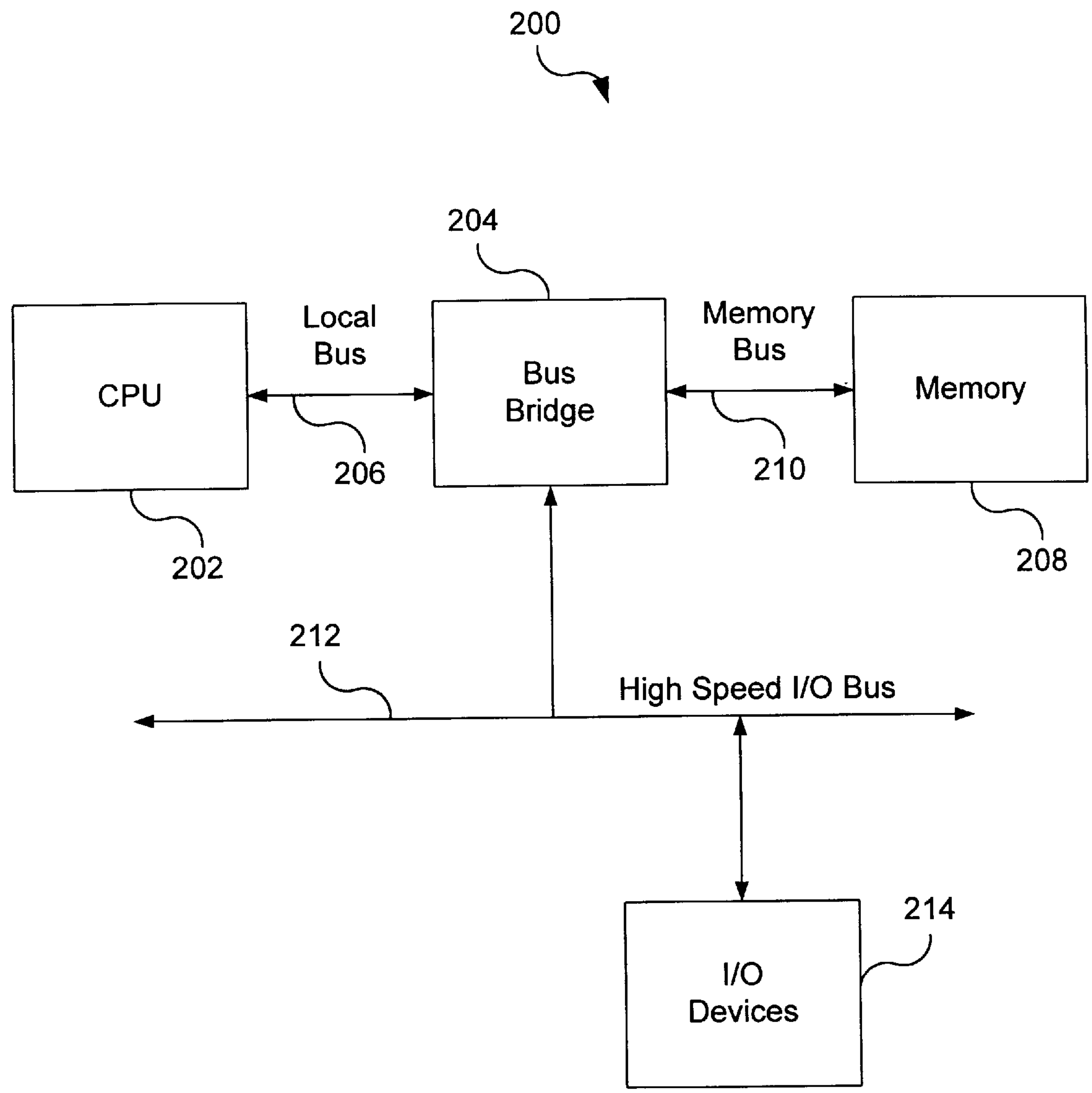
FIG. 7. A diagram of a general purpose computer system.

FIG. 7 is a simplified block diagram illustrating a general purpose programmable computer system, generally indicated at 200, which may be used in conjunction with a first embodiment of the present invention. In the presently preferred embodiment, a Sun Microsystems SPARC Workstation is used. Of course, a wide variety of computer systems may be used, including without limitation, workstations running the UNIX system, IBM compatible personal computer systems running the DOS operating system, and the Apple Macintosh computer system running the Apple System 7 operating system. FIG. 7 shows one of several common architectures for such a system. Referring to FIG. 7, such computer systems may include a central processing unit (CPU) 202 for executing instructions and performing calculations, a bus bridge 204 coupled to the CPU 202 by a local bus 206, a memory 208 for storing data and instructions coupled to the bus bridge 204 by memory bus 210, a high speed input/output (I/O) bus 212 coupled to the bus bridge 204, and I/O devices 214 coupled to the high speed I/O bus 212. As is known in the art, the various buses provide for communication among system components. The I/O devices 214 preferably include a manually operated keyboard and a mouse or other selecting device for input, a CRT or other computer display monitor for output, and a disk drive or other storage device for non-volatile storage of data and program instructions. The operating system typically controls the above-identified components and provides a user interface. The user interface is preferably a graphical user interface which includes windows and menus that may be controlled by the keyboard or selecting device. Of course, as will be readily apparent to one of ordinary skill in the art, other computer systems and architectures are readily adapted for use with embodiments of the present invention.

The present invention advantageously uses the fact that parse node information has been linked to automated design display technology. For example, netlist data structures may retain links to parse nodes generated from HDL code used to produce such structures. Moreover, graphical display tools used to illustrate features or performance of such structures also may contain links to the parse nodes generated from HDL code. See, for example, commonly assigned U.S. patent application Ser. No. 08/417,147, filed Apr. 3, 1995, which is expressly incorporated herein by this reference.

Figure 6:
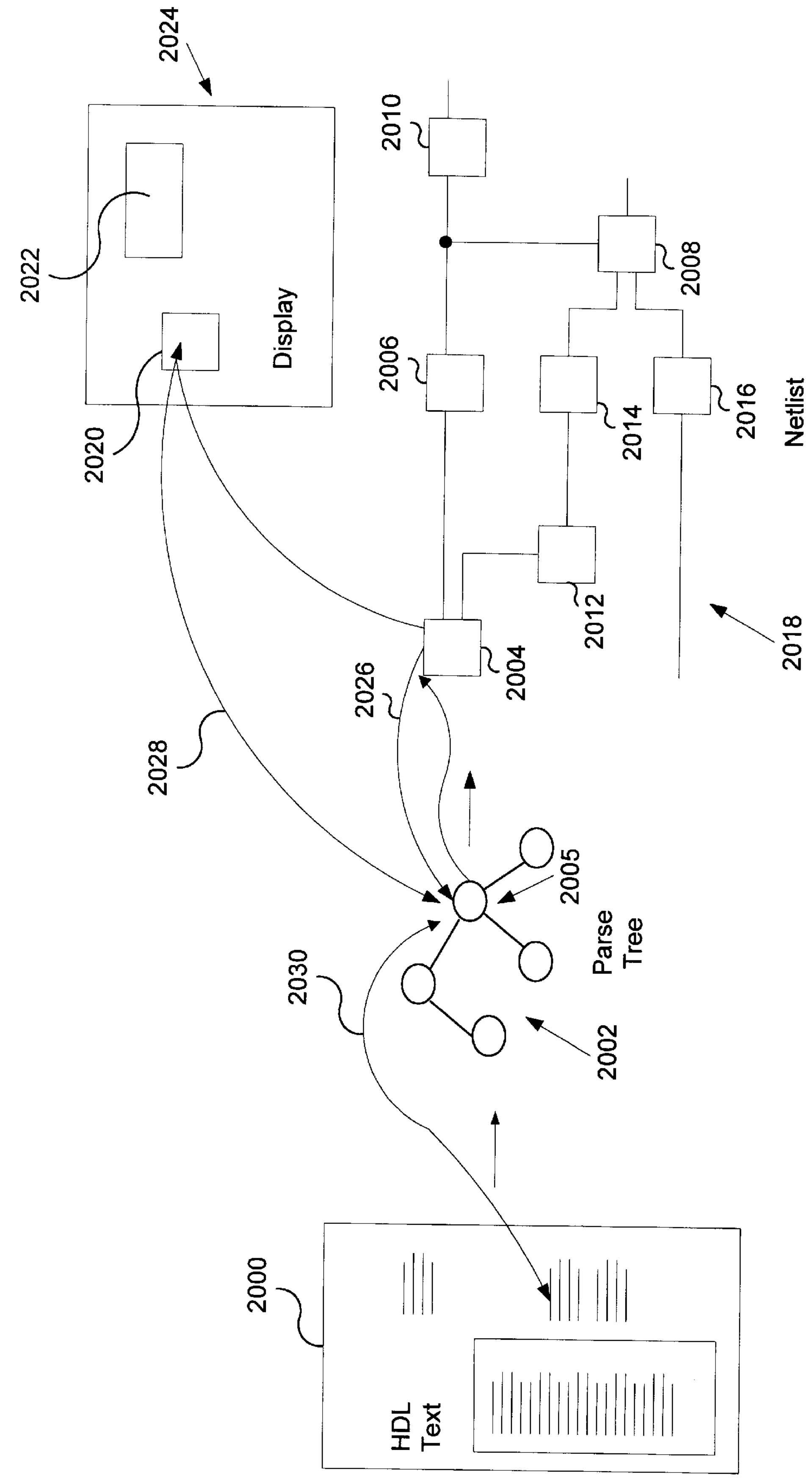
FIG. 6. A generalized diagram showing relationships between parse node, program text and electronic structures created from the text.

Referring to FIG. 6, there is provided an overview which illustrates where the mechanisms of the present invention fit within the overall process of using parse nodes to create electronic or software-based structures. HDL text 2000 is created by a user. At compile time, a parse tree 2002 is created. Nodes on the parse tree correspond to portions of the HDL text. Nodes of the parse tree also correspond, for example, to cells 2004–2016 within a netlist 2018 and, for example, to portions 2020, 2022, of a display image 2024 used to analyze the netlist. Arc 2003 indicates that cell 2004 was created from parse node 2005. A netlist may retain references, such as arc 2026, to a parse node used to create netlist nodes and nets. Similarly, electronic structures within the display tool also may have references, such as arc 2028, to a parse node used to create netlist cells or nets analyzed in the display.

The mechanism of the present invention advantageously provides a two-way link between parse node information and text. See, for example, two-way link 2030 which can be created through the mechanism of the present invention. It should be appreciated that a parse tree, once created, often is not saved. Nevertheless, as explained above, electronic structures such as a netlist cell or computer display information may retain references to the parse nodes of the parse tree after the tree has been discarded. The mechanism of the present invention permits linkages between text and electronic structures based upon retained parse node information.

Appendix A contains a C program listing describing the data structure of the present invention and methods of manipulating the data structure to obtain display characteristics of the associated text. The procedures beginning with "xm" or "Xt" or "topLevelShellWidgetClass" involve the graphical user interface, and are described in "The X Window System: Programming and Applications with XT, COSF/Motif edition", by Douglas Young, published by Prentice-Hall in 1990 with ISBN 013-497074-8, which is hereby incorporated by reference. Basic data structure manipulations such as hash tables and stacks are described in "Introduction to Algorithms" by Thomas Cormen, Charles Leiserson and Ronald Rivest, by the MIT Press in 1990 with ISBN 0-07-013143-0, which is hereby incorporated by reference.

The routine "os_show_stat" merely gathers computer performance statistics and is not functionally related to the parse array operations. "Error_if" is based on the "assert" macro commonly used in C programs. "Error_if" causes the program to terminate if a specified condition is true, and continue if the condition is false.

The program listing in appendix A along with its comments and the library references are hereby incorporated by reference into the specification.

The Array Data Structure

Figure 1:
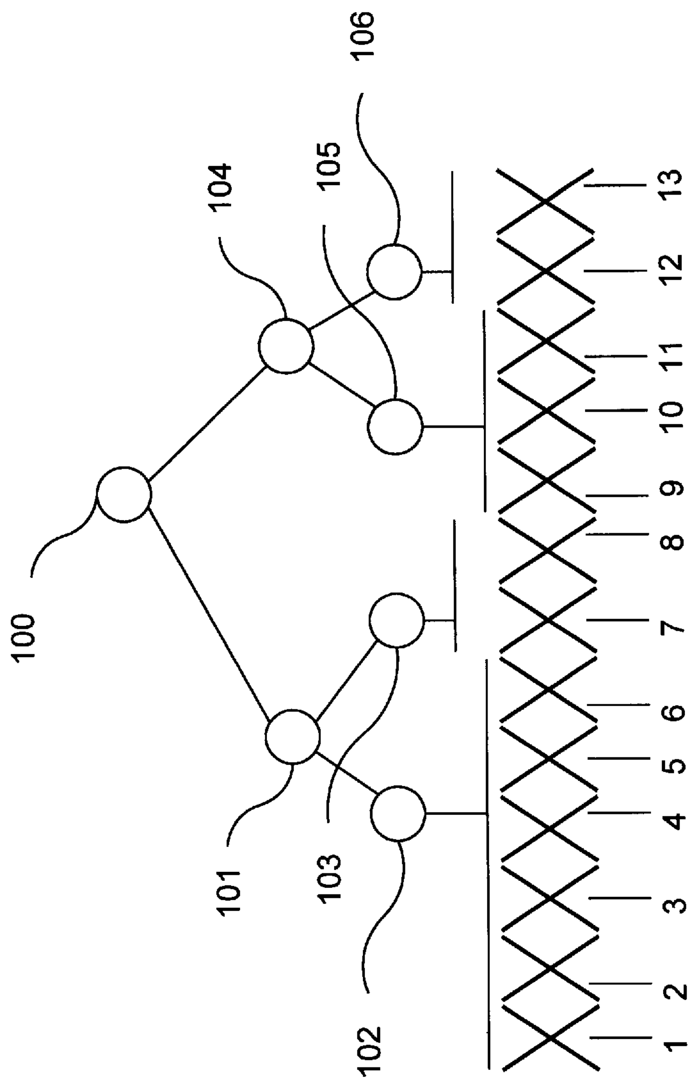
FIG. 1. A parse tree showing the text corresponding to the nodes.

FIG. 1 illustrates a parse tree associated with some text. The parse tree consists of nodes 100, 101, 102, 103, 104, 105, and 106. The characters 1 through 13 represent generic characters. Characters 1, 2, 3, 4, 5 and 6 are associated with node 102. Characters 7 and 8 are associated with node 103. Characters 9, 10 and 11 are associated with node 105 and characters 12 and 13 are associated with node 106.

Figure 2:
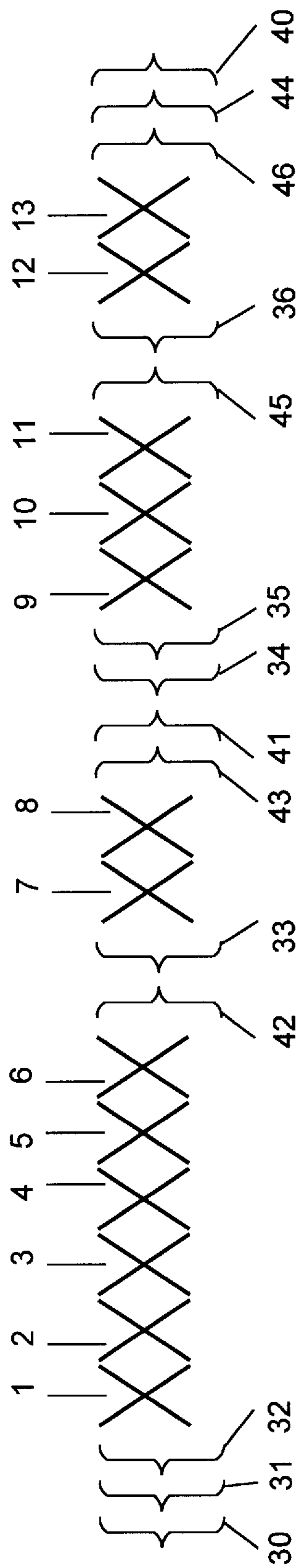
FIG. 2. A textual representation of the parse tree of FIG. 1 in accordance with the present invention.

FIG. 2 illustrates a text representation of the parse tree using "{" to mark the beginning of a node and "}" to mark the end of a node. For example, left brace 30 and right brace 40 together contain all of the text and nodes associated with node 100. Left brace 31 and right brace 41 demarcate the text and nodes associated with node 101. Left brace 32 and right brace 42 demarcate the text associated with node 102. Left brace 33 and right brace 43 demarcate the text associated with node 103. Left brace 34 and right brace 44 demarcate the text associated and nodes with node 104. Left brace 35 and right brace 45 demarcate the text associated with node 105. Left brace 36 and right brace 46 demarcate the text associated with node 106. One alternative embodiment of the present invention is to rewrite the text data structure with a brace or equivalent symbol inserted into the text.

The left braces serve as begin markers which denote the beginning of information encompassed by a parse node. The right braces serve as end markers which denote the end of information encompassed by a parse node. Begin and end markers are grouped in sets: a left brace in a set denotes the beginning of information encompassed by a parse node. A right brace in the same set denotes the end of information encompassed by a parse node.

Figure 3:
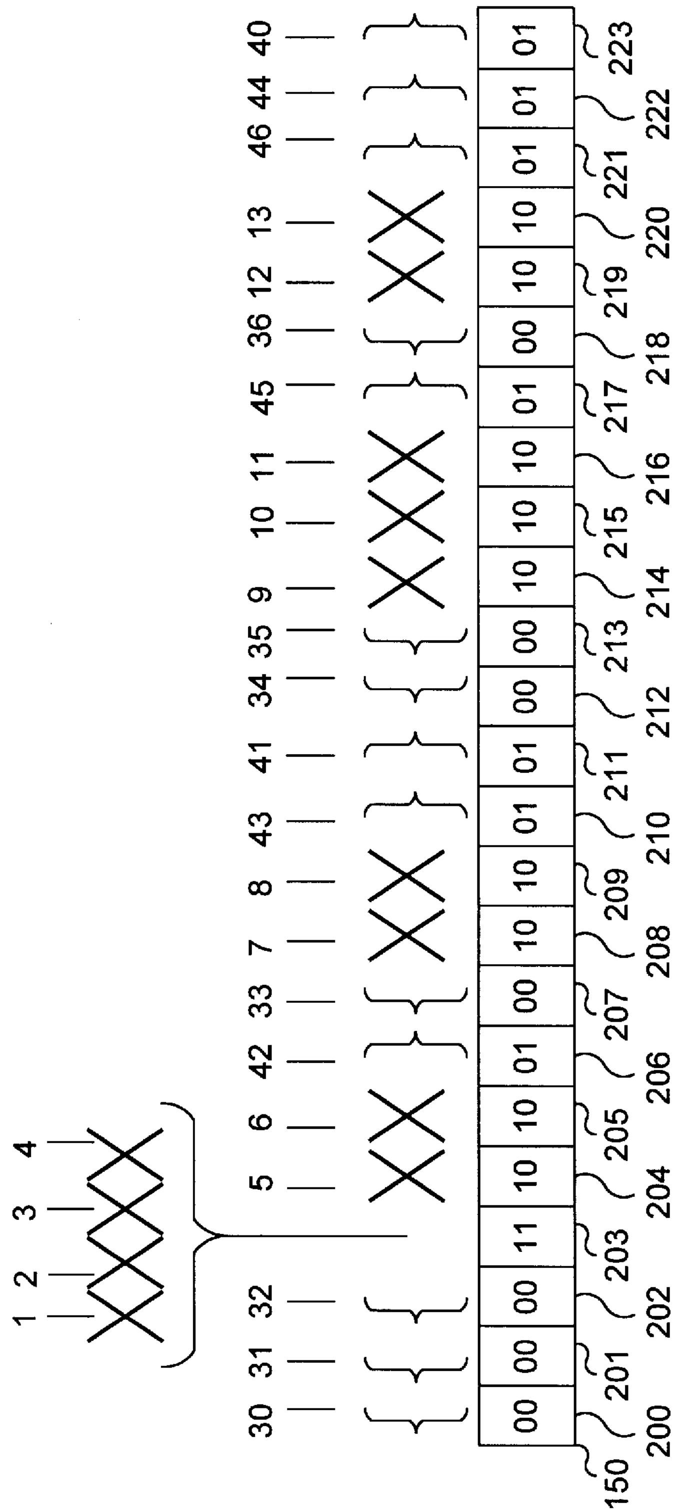
FIG. 3. A binary representation of the parse tree of FIG. 1 in accordance with the present invention.

FIG. 3 illustrates the use of a parse array 150 to store a representation of the parse tree using the text representation of FIG. 2 as a guide. Parse array 150 is really an array of bits divided into bit pairs 200 through 223. Each bit pair is used to represent a symbol. In one embodiment, the beginning of node is denoted with the TREE_START symbol, and that symbol has a value of "00". The TREE_START symbol is a begin marker. The TREE_END symbol has value "01" and is used to demarcate the end of a node. The TREE_END symbol is an end marker. The TREE_CHAR symbol has value "10" and is used to demarcate a single character. The TREE_CHAR symbol is a character marker. The TREE_BLOCK symbol has value "11" is used to demarcate a group of 4 characters.

Using this encoding, the parse tree of FIG. 1 begins with the "00" to denote the beginning of the node 100, as shown with bit pair 200. The next two bits are set to "00" to denote the beginning of node 101, as shown with bit pair 201. Bit pair 202 holds "00" to denote the beginning of node 103.

Note that node 103 has 6 characters associated with it. One embodiment of the invention would use the value "11" in bit pair 203 to note the presence of characters 1, 2, 3, and 4, while bit pairs 204 and 205 each hold a "10" to mark a place for characters 5 and 6 respectively. Other compression schemes could be used to store the character count.

Bit pair 206 holds the value "01" to mark the end of node 102.

Determining Node Identification (Direct Computation)

It can be very useful to associate an unique identification number with a particular node in a parse tree. A conventional parse tree often allocates an entire word in the data structure to hold that information. However, the parse array provides that information indirectly. The identification number of the node at a particular point in the parse array is the number of TREE_START symbols to the "left" of the TREE_START symbol corresponding to the particular point. For example, to determine the node identification number for the node containing bit pair 215 of FIG. 3, back up to the TREE_START symbol demarcating the boundary of the node containing bit pair 215. This is bit pair 213. Then and count the number of TREE_START symbols preceding bit pair 213. In this case, there are 5, namely bit pairs 200, 201, 202, 207, and 212. Therefore, the node corresponding to bit pair 213 is uniquely identified as node number 5.

Of course, if the request for bit pair identification is made at a point where a TREE_START symbol is already located, it is not necessary to back up.

Constructing the Parse Array from a Conventional Parse Tree

Constructing the parse array from a conventional parse tree can be done as follows. Define an index and a tree pointer. Set the index to zero, and the tree pointer to the root node. At a particular node, write all unwritten characters up to the start of the node, write the TREE_START symbol into the parse array, and increment the index. Recursively apply this start symbol/character rule for each child node. If there are no more children, write all the unwritten characters up to the end of the node, then write the TREE_END symbol into the parse array, increment the index, and return to processing the parent node. See "ve_write_paren_tree" in Appendix A for an example.

Constructing A Conventional Parse Tree from a Parse Array

Constructing a conventional parse tree from the parse array can be done as follows. Define a stack pointer, a text index, and a parse array index. Set the text index and the parse array index to zero.

If the symbol in the parse array at the parse array index is the TREE_START symbol, create a new parse node. The new parse node should be made a child of the node at the current stack pointer, if there is anything on the stack pointer. Push the new node onto the top of the stack, and increment the parse array index, and process the next symbol.

If the symbol in the parse array at the parse array index is a TREE_BLOCK or TREE_CHAR, then associate the appropriate number of characters in text block beginning with the text index with the parse node on top of the stack. Increment the text index and the parse array index appropriately.

If the symbol in the parse array at the parse array index is the TREE_END symbol, then pop the parse node on the top of the stack, and increment the parse array index. See "tree_convert_to_full" in Appendix A for an example.

Associating Display Characteristics with a Parse Tree

A variety of information can be attached to a parse tree that is useful to guide the selection of the display characteristics. One way to do this is to allow another component of a system to define the display characteristic for every parse node. By using an unique identification number associated with every parse node, the display tool can look up or compute the appropriate display characteristic for that node.

For example, in conjunction with circuit analysis and as described in U.S. application Ser. No. 08/417,147 by Gregory et al filed on Apr. 3, 1995, it is possible to determine the circuit characteristics associated with a particular piece of source text. For example, it might be useful to have the text corresponding to the critical path of the circuit displayed in red while all other parts are displayed in black. A database and analysis tools can be used to identify the parts of the parse tree that are on the critical path. The display tool can then inquire about the status of a particular node, and use that to select the color for the text corresponding to that node.

Using the Parse Array to Determine Display Characteristics (Simplified Version)

Figure 4:
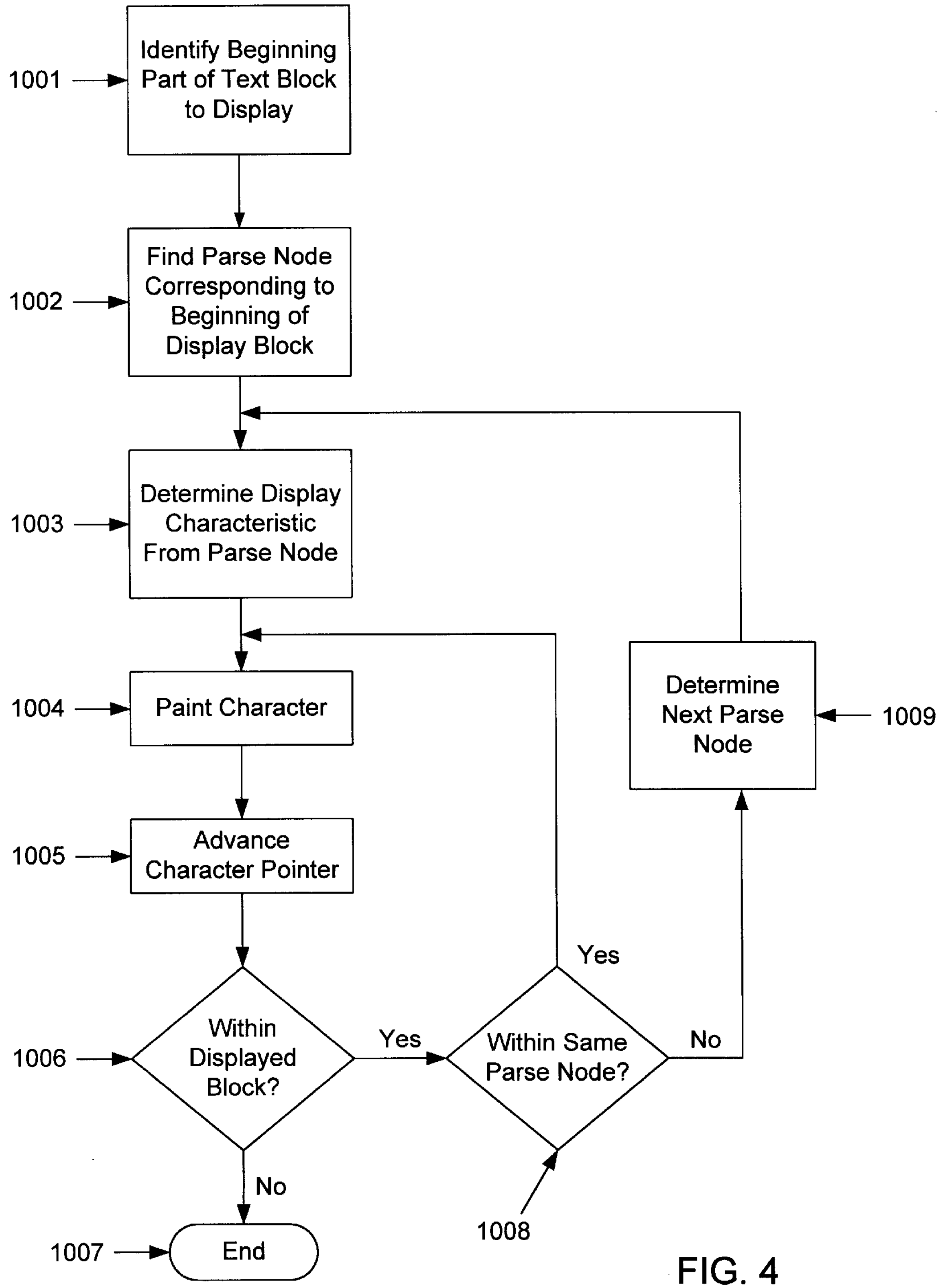
FIG. 4. A flow chart showing a method of setting the display characteristic of the text as a function of the parse node containing that text.

The process for determining the display characteristics of the text associated with a particular node is shown in FIG. 4. This section provides a general and simple explanation of the process. Later sections identify modifications that can be made to decrease execution time. The process begins at step 1001 where the human interface portion of the software identifies the place in the text where the user wants the display to begin. This amounts to computing an index into the text array.

Figure 5:
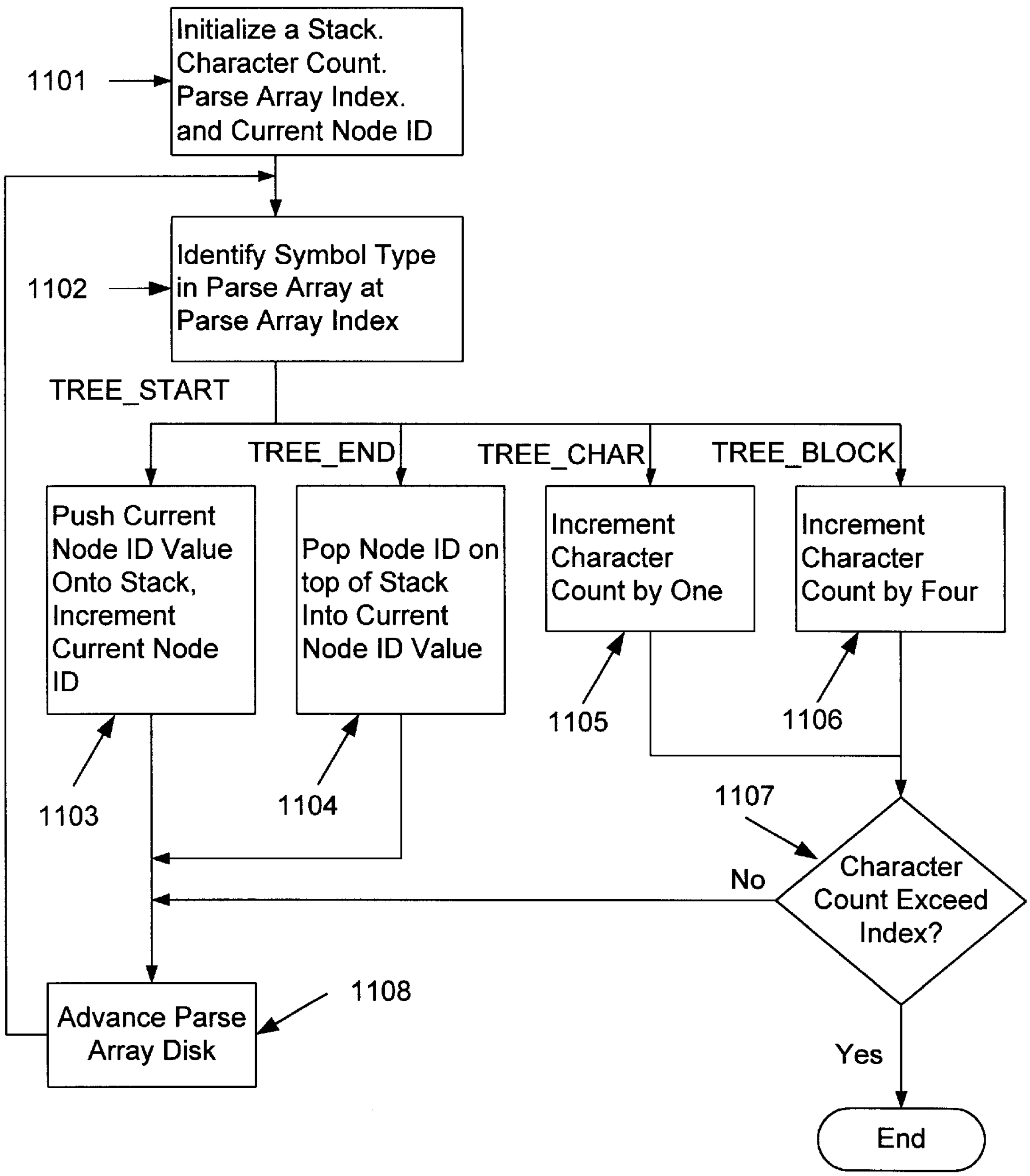
FIG. 5. A flow chart showing a method of obtaining the initial parse node corresponding to a particular point in the text array.

Step 1002 finds the parse node containing the starting point of the text. In particular, step 1002 involves traversing the parse tree and keeping track of how many characters in the text have been covered as well as keeping track of the current parse node. When the number of characters covered equals or exceeds the index value, then the current parse node is the parse node containing the particular text point. FIG. 5 shows a conceptually straight-forward approach to this process.

Step 1101 of FIG. 5 involves initializing a character count, the parse array index, and the current node id to zero and creating a stack.

Step 1102 involves identifying the bit pair in the parse array at the location specified by the parse array index.

If the symbol identified in step 1102 is the TREE_START symbol, then push the current node id onto the stack and increment the value of the current node id as shown in step 1103.

If the symbol identified in step 1102 is the TREE_END symbol, then pop the value on top of the stack into the current node id as shown in step 1104.

If the symbol identified in step 1102 is the TREE_BLOCK symbol, then increment the character count by the number of characters represented by the TREE_BLOCK symbol as shown in step 1106. In one embodiment, this is four characters.

If the symbol identified in step 1102 is the TREE_CHAR symbol, then increment the character count by 1, as shown in step 1105.

After incrementing the character count in steps 1106 or 1105, determine if the parse tree has been parsed far enough by comparing the character count with the index into the text array as shown in step 1107. If the tree has been parsed far enough, stop this process and go to step 1002 of FIG. 4. To proceed efficiently in the process of FIG. 4, it useful to keep the variables and stack computed in FIG. 5 intact.

If the parse tree has not been traversed far enough, increment the parse array index as indicated by step 1108, and return to step 1102.

After identifying the appropriate parse node from the process in FIG. 5, then it is necessary to obtain the display characteristic associated with the current parse node. This is done through a data base or a look-up table in step 1003 of FIG. 4.

In step 1004, the character is painted onto the screen with the characteristic established in step 1003.

In step 1005, the next character is identified by incrementing the character index by one. In step 1006 it is determined whether the display block has been completed. If it has, then stop the process. Otherwise, determine if the next character belongs to the current parse node, as shown in step 1008. If the current bit pair referred to by the parse array index is a TREE_BLOCK, and the new character is part of that block, then the character is within the same parse node, and the painting continues in step 1004. If the block has been exceeded or the current bit pair is a TREE_CHAR, then the parse array index needs to be incremented to obtain a new current bit pair. If the new current bit pair is a TREE_BLOCK or a TREE_CHAR, then the new character is part of the current parse node, and painting continues in step 1004. If the new current bit pair is a TREE_END, then the parse node changes in step 1009.

Adjusting the current parse node requires adjusting the stack formed in step 1002 and the current parse node and incrementing the parse array index until the parse array index refers to bit pair that is a TREE_BLOCK or a TREE_CHAR. Adjusting the stack involves popping the top of the stacking into the current parse node when a TREE_END is encountered and pushing the current parse node onto the stack when a TREE_START is encountered. After a new parse node is identified, the display characteristic is determined in step 1003.

Alternate Text Representation

The processes shown in FIG. 4 and FIG. 5 assumed that the text was stored as an array. The techniques shown can be trivially modified for other text data structures. For example, another approach to storing text is to have an array of pointers with each pointer referring to a block of text with each block of text ending with a new line character. Using this or another data structure requires modifying the character incrementing step 1005 of FIG. 4, and step 1105 and step 1106 of FIG. 5.

Efficient Initialization

The processes shown in FIG. 4 and FIG. 5 require traversing the parse tree from the beginning of the text block to identify current parse node. This can require much computational effort. One way to improve performance in step 1002 is to create a storage mechanism that can retrieve the parse tree traversal state as a function of the text display index. This can be done efficiently by observing a few characteristics of the text display and the parse tree traversal state.

The process in FIG. 5 manipulates several variables, namely the character count, the parse array index, the current node, and the stack as the computer marches through the parse array. Together, this information specifies the state of traversing the parse tree. Conceptually, the process in FIG. 5 specifies a parse tree traversal state for every character in the text array. For example, see the type definition for "tree_gen" in Appendix A. In principle, with some adjustments for the compaction performed using the TREE_BLOCK symbol, one could store this state in step 1107, and create a look-up table that would hold the state for each character in the text array. Then the process of FIG. 5 could be replaced by looking data up. This would result in a very fast access time. Unfortunately, a table for every character would occupy a great deal of memory and take a long time to create.

However, an intermediate approach could work where the state at step 1107 is stored for every fixed number of characters. For example, the state could be stored in a table every 256 characters. At the initialization step 1101, a table index could be computed by dividing the text index by 256 and truncating, and the various variables initialized to the value stored in the corresponding table entry. This way, the process in FIG. 5 would only need to parse the tree for no more than an additional 255 characters.

The state storing scheme could also be modified to deal with line numbers instead of the number of characters. In step 1001, the user interface could provide a line number in the file where the display is to start. The parse tree traversal state of step 1107 could be stored every several lines in a table. Experience has indicated that storing every 16 lines works well. At the initialization step 1101, a table index could be computed from the line index, and the initial parse tree traversal state set to the values found in the table.

Efficient Traversal

The parse tree traversal method shown in FIG. 5 proceeds with one symbol in the parse array at a time. Determining the correct symbol from the parse array directly would require many machine instructions for massaging the bits in the array to identify the symbol, and process it accordingly. An alternate method that takes advantage of the compact nature of the representation processes four symbols concurrently by using a look-up table to determine the appropriate actions required to process the symbols contained in a byte of storage. In particular, the function "tree_build_expanded_array" on data input converts a byte's worth of parse array to a short list of symbols. The function "tree_gen_next" uses this converted representation to proceed through the parse array efficiently. A similar approach could be used where the parse tree is traversed in step 1009 of FIG. 4.

PATENT
Attorney Docket No. 9222-740

METHOD AND APPARATUS FOR CONTEXT SENSITIVE TEXT DISPLAYS

Inventor: Brent Gregory

APPENDIX A

```
#ifndef lint
static char rcsid[] = "$Header$";
#endif
/****************************************************************
*****************
****************************************************************
*****************

    FILE NAME: gr.c           MODULE: MGR

    ABSTRACT: Generic Graphics interface

    COPYRIGHT (C) 1991, SYNOPSYS INC., ALL RIGHTS RESERVED.

****************************************************************
****************
****************************************************************
***************/

#include "osi.h"
#include "mini_generic.h"
#include "gr.h"


/****************************************************************
****************

    FUNCTION: gr_alloc_context          AUTHOR: Brent Gregory -
May  2 1994

    ABSTRACT: Allocates and initializes a gr_context

    The caller must install all specified functions

****************************************************************
***************/

gr_context gr_alloc_context()
{
  gr_context context = mem_allocate(gr_context_struct, 1);

  context->args = NIL(hash_table);
  context->sub_context = NIL(gr_sub_context);

  return(context);
}


/****************************************************************
****************

    FUNCTION: gr_set_arg      AUTHOR: Brent Gregory - May  1 1994
```

ABSTRACT: Allow users to set arguments to graphics functions.

```
****************************************************************
***************/

void gr_set_arg(string arg_name, void *arg_value, gr_context context)
{
  if(context->args == NIL(hash_table)) {
    context->args = hash_create_char();
  }

  hash_force_put(context->args,  (caddr_t)  arg_name,  (caddr_t)
arg_value);
}


/****************************************************************
****************

    FUNCTION: gr_initialize        AUTHOR: Brent Gregory - May
1 1994

    ABSTRACT: Initialize all graphics, return a gr_context.

****************************************************************
***************/

void gr_initialize(gr_widget *p_top_widget, gr_context context)
{
  (*context->initialize_func)(p_top_widget,    &context-
>sub_context);
}


/****************************************************************
****************

    FUNCTION: gr_create_scrolled_window   AUTHOR: Brent Gregory -
 May  1 1994

    ABSTRACT: Creates a canvas with a scrollbar.  Returns a handle
that
    will be used to identify the window in the future.

    Recognizes the following arguments:

    gr_height
    gr_width
    gr_scroll_min
    gr_scroll_max
    gr_scroll_increment
    gr_page_increment
    gr_slider_size
```

```
*****************************************************************
***************/

gr_widget gr_create_scrolled_window
  (gr_widget owner_widget,
   gr_user_context user_context,
   void (*exposure_callback)(gr_user_context user_context),
   void (*button_callback)(gr_user_context user_context, int x,
int y),
   void  (*scroll_callback)(gr_user_context  user_context,  int
line),
   gr_context context)
{
    g r _ w i d g e t   w i d g e t   =   ( * c o n t e x t -
>create_scrolled_window_func)(owner_widget,
                                             user_context,
                                             exposure_callback,
                                             button_callback,
                                             scroll_callback,
                                             context->args);
  hash_free(context->args);
  context->args = NIL(hash_table);

  return(widget);
}


/****************************************************************
****************

    FUNCTION: gr_set_layer         AUTHOR: Brent Gregory - May
1 1994

    ABSTRACT: Change the layer for future drawings on the canvas

*****************************************************************
***************/

void gr_set_layer(gr_widget canvas, gr_layer layer, gr_context
context)
{
  (*context->set_layer_func)(canvas, layer);
}


/****************************************************************
****************

    FUNCTION: gr_draw_text         AUTHOR: Brent Gregory - May
1 1994

    ABSTRACT: Plop some text on the canvas
```

```
*****************************************************************
***************/

void gr_draw_text(gr_widget canvas, int x, int y, string text, int
length,
            gr_context context)
{
  (*context->draw_text_func)(canvas, x, y, text, length);
}


/*****************************************************************
****************

    FUNCTION: gr_text_width        AUTHOR: Brent Gregory - May
1 1994

    ABSTRACT: Returns the width of text drawn with a specified
layer

*****************************************************************
***************/

int gr_get_text_width(gr_layer layer, string text, int length,
                gr_context context)
{
  return((*context->get_text_width_func)(layer, text, length));
}


/*****************************************************************
****************

    FUNCTION: gr_get_layers        AUTHOR: Brent Gregory - May
1 1994

    ABSTRACT: Return the available layers to the caller

*****************************************************************
***************/

void gr_get_layers(gr_layer *p_default, gr_layer *p_select,
            gr_layer **p_others, int *p_num_others,
            gr_context context)
{
  (context->get_layers_func)(p_default,   p_select,   p_others,
p_num_others,
                    context->sub_context);
}


/*****************************************************************
```

```
****************

    FUNCTION: gr_font_height        AUTHOR: Brent Gregory - May
1 1994

    ABSTRACT: Returns the largest height of any character in the
font
    of a layer.

*****************************************************************
***************/

int gr_font_height(gr_layer layer, gr_context context)
{
  return((*context->font_height_func)(layer));
}


/****************************************************************
***************/
/****************************************************************
****************
*****************************************************************
****************

    FILE NAME: gr.h             MODULE: GR

    ABSTRACT: Generalized graphics package.

    Can be retarget to multiple graphics packages

    COPYRIGHT (C) 1991, SYNOPSYS INC., ALL RIGHTS RESERVED.

*****************************************************************
****************
*****************************************************************
***************/

/* Note: the struct contents are never declared.  I am making
these
   declarations so that good type checking will be performed on
the interfaces.
   I could make them all void *, but this would disble much
checking */

typedef struct gr_layer_struct *gr_layer;
typedef struct gr_widget_struct *gr_widget;
typedef struct gr_sub_context_struct *gr_sub_context;
typedef struct gr_user_context_struct *gr_user_context;


/****************************************************************
****************
```

```
   STRUCTURE: gr_context          AUTHOR: Brent Gregory - May
1 1994

   ABSTRACT: Holds information about the graphics state

*****************************************************************
***************/

typedef struct gr_context_struct {
  hash_table args;
  gr_sub_context sub_context;
  void (*initialize_func)(gr_widget *p_top_widget,
                 gr_sub_context *p_context);

  gr_widget (*create_scrolled_window_func)
    (gr_widget owner_widget,
     gr_user_context user_context,
     void (*exposure_callback)(gr_user_context user_context),
     void (*button_callback)(gr_user_context user_context, int x,
int y),
     void  (*scroll_callback)(gr_user_context  user_context,  int
line),
     hash_table args);

  void (*set_layer_func)(gr_widget canvas, gr_layer layer);
  void (*draw_text_func)(gr_widget canvas, int x, int y, string
text,
                int length);
  int  (*get_text_width_func)(gr_layer  layer,  string  text,  int
length);
  void (*get_layers_func)(gr_layer *p_default, gr_layer *p_select,
                gr_layer **p_others, int *p_num_others,
                gr_sub_context context);
  int (*font_height_func)(gr_layer layer);
} gr_context_struct, *gr_context;


/* Functions defined in gr.c */
gr_context gr_alloc_context();
void  gr_set_arg(string  arg_name,  void  *arg_value,  gr_context
context);
void gr_initialize(gr_widget *p_top_widget, gr_context context);
gr_widget gr_create_scrolled_window
  (gr_widget owner_widget,
   gr_user_context user_context,
   void (*exposure_callback)(gr_user_context user_context),
   void  (*button_callback)(gr_user_context user_context, int x,
int y),
   void   (*scroll_callback)(gr_user_context   user_context,   int
line),
   gr_context context);
void gr_set_layer(gr_widget  canvas,  gr_layer  layer,  gr_context
context);
void gr_draw_text(gr_widget canvas, int x, int y, string text, int
```

```
length,
            gr_context context);
int gr_get_text_width(gr_layer layer, string text, int length,
                gr_context context);
void gr_get_layers(gr_layer *p_default, gr_layer *p_select,
            gr_layer **p_others, int *p_num_others,
            gr_context context);
int gr_font_height(gr_layer layer, gr_context context);


/****************************************************************
***************/
#ifndef lint
static char rcsid[] = "$Header$";
#endif
/****************************************************************
****************
*****************************************************************
****************

    FILE NAME: mgr.c                    MODULE: MGR

    ABSTRACT: File supports the Motif version of the graphics
package

    COPYRIGHT (C) 1991, SYNOPSYS INC., ALL RIGHTS RESERVED.

*****************************************************************
****************
*****************************************************************
***************/

#include <X11/Intrinsic.h>
#include <X11/StringDefs.h>
#include <X11/Xutil.h>
#include <Xm/Xm.h>
#include <Xm/DrawingA.h>
#include <Xm/ScrolledW.h>
#include <Xm/ScrollBar.h>
#include "osi.h"
#include "mini_generic.h"
#include "gr.h"
#include "mgr.h"
#include "mgr_int.h"


/* declare the fonts we will use */
static XtResource resources[] =
{
  {XtNfont, XtCFont, XtRFontStruct, sizeof(XFontStruct *),
     XtOffset(mgr_context, default_font), XtRString, "Fixed"},
  {XtNfont, XtCFont, XtRFontStruct, sizeof(XFontStruct *),
     XtOffset(mgr_context, small_font), XtRString, "lucidasans-
```

```
10"},
  {XtNfont, XtCFont, XtRFontStruct, sizeof(XFontStruct *),
     XtOffset(mgr_context, medium_font), XtRString, "lucidasans-
14"},
  {XtNfont, XtCFont, XtRFontStruct, sizeof(XFontStruct *),
     XtOffset(mgr_context, large_font), XtRString, "lucidasans-
bold-18"},
  {XtNfont, XtCFont, XtRFontStruct, sizeof(XFontStruct *),
     XtOffset(mgr_context, italic_font), XtRString,
     "lucidasans-bolditalic-18"},
};


/*****************************************************************
****************

  Private Functions

*****************************************************************
***************/

static mgr_context mgr_alloc_context();
static mgr_widget mgr_alloc_widget();
static mgr_layer mgr_create_layer(XFontStruct *font);


/*****************************************************************
****************

    FUNCTION: mgr_initialize       AUTHOR: Brent Gregory - May
1 1994

    ABSTRACT: Get graphics started.  Return the top widget, and
the
    mgr context.

*****************************************************************
***************/

void  mgr_initialize(gr_widget  *p_top_widget,  gr_sub_context
*p_sub_context)
{
  int argc = 0;
  string *argv;
  mgr_context context = mgr_alloc_context();

  context->top_widget = mgr_alloc_widget();
  context->top_widget->context = context;

  context->top_widget->widget =
    XtInitialize("Program_name", "Text Widget", NULL, 0, &argc,
argv);
```

```
  XtGetApplicationResources(context->top_widget->widget,context,
resources,
                     XtNumber(resources), NULL, 0);

  *p_top_widget = (gr_widget) context->top_widget;
  *p_sub_context = (gr_sub_context) context;
}


/*****************************************************************
****************

    FUNCTION: mgr_alloc_context         AUTHOR: Brent Gregory -
May  1 1994

    ABSTRACT: Allocate and initialize a mgr_context

*****************************************************************
***************/

static mgr_context mgr_alloc_context()
{
  mgr_context context = mem_allocate(mgr_context_struct, 1);

  return(context);
}


/*****************************************************************
****************

    FUNCTION: mgr_create_scrolled_window  AUTHOR: Brent Gregory -
 May  1 1994

    ABSTRACT: Creates a canvas with a scrollbar.  Returns a handle
that
    will be used to identify the window in the future.

    This routine recognizes the following arguments:

    gr_height
    gr_width
    gr_scroll_min
    gr_scroll_max
    gr_scroll_increment
    gr_page_increment
    gr_slider_size

*****************************************************************
***************/

gr_widget mgr_create_scrolled_window
  (gr_widget owner_widget,
```

```
   gr_user_context user_context,
   void (*exposure_callback)(gr_user_context user_context),
   void (*button_callback)(gr_user_context user_context, int x,
int y),
   void  (*scroll_callback)(gr_user_context  user_context,  int
line),
   hash_table args)
{
  mgr_widget our_owner_widget = (mgr_widget) owner_widget;
  mgr_widget canvas = mgr_alloc_widget();
  Arg wargs[10];
  XGCValues gcv;
  Display *dpy;
  Window w;
  int *p_height, mask;
  int *p_width;
  int n, scroll_min, scroll_max, scroll_increment, page_increment;
  int slider_size;
  Widget scrolled_widget, scrollbar, shell_widget;

  canvas->user_context = user_context;

  /* Get initial size */
  if(!hash_get(args, "gr_height", (caddr_t *) &p_height)) {
    error_if_verbose(TRUE, "Missing arg: gr_height");
  }
  if(!hash_get(args, "gr_width", (caddr_t *) &p_width)) {
    error_if_verbose(TRUE, "Missing arg: gr_width");
  }

  /* note place for size variables */
  canvas->p_height = p_height;
  canvas->p_width = p_width;

  /* Build main widgets */

  shell_widget = XtCreateApplicationShell("Scrolled widget",
                          topLevelShellWidgetClass,
                          NULL, 0);

  n = 0;
  XtSetArg(wargs[n], XtNheight, *p_height); n++;
  XtSetArg(wargs[n], XtNwidth, *p_width); n++;

  scrolled_widget = XtCreateManagedWidget("Scrolled widget",
                          xmScrolledWindowWidgetClass,
                          shell_widget,
                          wargs, n);

  canvas->widget    =    XtCreateManagedWidget("Canvas",
xmDrawingAreaWidgetClass,
                        scrolled_widget, NULL, 0);

  /* Set up canvas callbacks */
  canvas->exposure_callback = exposure_callback;
```

```
canvas->button_callback = button_callback;
   XtAddCallback(canvas->widget,    XmNexposeCallback,
mgr_handle_exposure,
          canvas);
   XtAddCallback(canvas->widget,    XmNresizeCallback,
mgr_handle_resize,
          canvas);
  XtAddEventHandler(canvas->widget,    ButtonPressMask,    FALSE,
mgr_handle_button,
              canvas);

  /* Create scrollbar */

  if(!hash_get(args, "gr_scroll_min", (caddr_t **) &scroll_min))
{
    error_if_verbose(TRUE, "Missing arg: gr_scroll_min");
  }

  if(!hash_get(args, "gr_scroll_max", (caddr_t **) &scroll_max))
{
    error_if_verbose(TRUE, "Missing arg: gr_scroll_max");
  }

  if(!hash_get(args,    "gr_scroll_increment",    (caddr_t    **)
&scroll_increment)) {
    error_if_verbose(TRUE, "Missing arg: gr_scroll_increment");
  }

  if(!hash_get(args,    "gr_page_increment",    (caddr_t    **)
&page_increment)) {
    error_if_verbose(TRUE, "Missing arg: gr_page_increment");
  }

  if(!hash_get(args, "gr_slider_size", (caddr_t **) &slider_size))
{
    error_if_verbose(TRUE, "Missing arg: gr_slider_size");
  }

  n = 0;
  XtSetArg(wargs[n], XmNminimum, scroll_min); n++;
  XtSetArg(wargs[n], XmNmaximum, scroll_max); n++;
  XtSetArg(wargs[n], XmNincrement, scroll_increment); n++;
  XtSetArg(wargs[n], XmNsliderSize, slider_size); n++;
  XtSetArg(wargs[n], XmNpageIncrement, page_increment);n++;

  scrollbar    =    XtCreateManagedWidget("Scrollbar",
xmScrollBarWidgetClass,
                  scrolled_widget, wargs, n);

  /* set up scollbar callbacks */
  canvas->scroll_callback = scroll_callback;
  XtAddCallback(scrollbar, XmNdragCallback, mgr_handle_scroll,
         canvas);

  /* register scrollbar and canvas with scrolled widget */
```

H:\HOME\BCE\SYNOPSYS\SY723\ALLSRC0.5PI(5PI)

```
  n=0;
  XtSetArg(wargs[n], XmNverticalScrollBar, scrollbar); n++;
  XtSetArg(wargs[n], XmNworkWindow, canvas->widget); n++;
  XtSetValues(scrolled_widget, wargs, n);

  /* Realize the widget */
  XtRealizeWidget(shell_widget);

  /* Create Graphics Context */
  dpy = XtDisplay(canvas->widget);
  w = XtWindow(canvas->widget);
  mask = GCFont | GCForeground | GCBackground;

  n=0;
  XtSetArg(wargs[n], XtNforeground, &gcv.foreground); n++;
  XtSetArg(wargs[n], XtNbackground, &gcv.background); n++;
  XtGetValues(canvas->widget, wargs, n);

  gcv.font = ((mgr_widget) owner_widget)->context->default_font-
>fid;
  canvas->gc = XCreateGC(dpy, w, mask, &gcv);

  canvas->context = ((mgr_widget) owner_widget)->context;

  return((gr_widget) canvas);
}


/*****************************************************************
****************

    FUNCTION: mgr_alloc_widget          AUTHOR: Brent Gregory -
May  1 1994

    ABSTRACT: Allocate and initialize a mgr_widget

*****************************************************************
***************/

static mgr_widget mgr_alloc_widget()
{
  mgr_widget widget = mem_allocate(mgr_widget_struct, 1);

  return(widget);
}


/*****************************************************************
****************

    FUNCTION: mgr_set_layer        AUTHOR: Brent Gregory - May
1 1994
```

```
    ABSTRACT: Set the display attributes for all drawing commands
until
    the next change.

****************************************************************
***************/

void mgr_set_layer(gr_widget canvas, gr_layer layer)
{
  XSetFont(XtDisplay(((mgr_widget) canvas)->widget),
         ((mgr_widget) canvas)->gc,
         ((mgr_layer) layer)->font->fid);
}


/***************************************************************
****************

    FUNCTION: mgr_draw_text          AUTHOR: Brent Gregory - May
1 1994

    ABSTRACT: Draw text on canvas at the specified spot.

****************************************************************
***************/

void mgr_draw_text(gr_widget canvas, int x, int y, string text,
int length)
{
  XDrawImageString(XtDisplay(((mgr_widget) canvas)->widget),
              XtWindow(((mgr_widget) canvas)->widget),
              ((mgr_widget) canvas)->gc, x, y, text, length);
}


/***************************************************************
****************

    FUNCTION: mgr_get_text_width   AUTHOR: Brent Gregory - May
2 1994

    ABSTRACT: Return the width of text in the specified layer

****************************************************************
***************/

int mgr_get_text_width(gr_layer layer, string text, int length)
{
  return(XTextWidth(((mgr_layer) layer)->font, text, length));
}
```

```
/****************************************************************
****************

    FUNCTION: mgr_get_layers        AUTHOR: Brent Gregory - May
1 1994

    ABSTRACT: Return the layers

*****************************************************************
***************/

void mgr_get_layers(gr_layer *p_default, gr_layer *p_select,
              gr_layer **p_others, int *p_num_others,
              gr_sub_context context)
{
  *p_default =
    (gr_layer)    mgr_create_layer(((mgr_context)    context)-
>default_font);
  *p_select =
    (gr_layer)    mgr_create_layer(((mgr_context)    context)-
>italic_font);
  *p_others = mem_allocate(gr_layer, 3);
  *p_num_others = 3;
  (*p_others)[0] =
    (gr_layer)    mgr_create_layer(((mgr_context)    context)-
>small_font);
  (*p_others)[1] =
    (gr_layer)    mgr_create_layer(((mgr_context)    context)-
>medium_font);
  (*p_others)[2] =
    (gr_layer)    mgr_create_layer(((mgr_context)    context)-
>large_font);
}


/****************************************************************
****************

    FUNCTION: mgr_create_layer          AUTHOR: Brent Gregory -
Apr 25 1994

    ABSTRACT: Allocate and initialize layer

*****************************************************************
***************/

static mgr_layer mgr_create_layer(XFontStruct *font)
{
  mgr_layer layer = mem_allocate(mgr_layer_struct, 1);
  layer->font = font;
  layer->color = 0;
  return(layer);
}
```

```
/****************************************************************
****************

   FUNCTION: mgr_font_height      AUTHOR: Brent Gregory - May
1 1994

   ABSTRACT:

****************************************************************
***************/

int mgr_font_height(gr_layer layer)
{
  return(((mgr_layer) layer)->font->ascent +
      ((mgr_layer) layer)->font->descent);
}


/****************************************************************
***************/
/****************************************************************
****************
****************************************************************
****************

   FILE NAME: mgr.h                 MODULE: Header for mgr

   ABSTRACT: Motif version of graphics package

   COPYRIGHT (C) 1991, SYNOPSYS INC., ALL RIGHTS RESERVED.

****************************************************************
****************
****************************************************************
***************/


/****************************************************************
****************

   STRUCTURE: mgr_layer      AUTHOR: Brent Gregory - Apr 24 1994

   ABSTRACT: Stores display attributes.

****************************************************************
***************/

typedef struct mgr_layer_struct {
  XFontStruct *font;
  int color;
} mgr_layer_struct, *mgr_layer;
```

```
/*****************************************************************
****************

    STRUCTURE: mgr_widget          AUTHOR: Brent Gregory - May
1 1994

    ABSTRACT: Infomation we need for a widget

*****************************************************************
***************/

typedef struct mgr_widget_struct {
  int *p_width, *p_height;
  Widget widget;
  gr_user_context user_context;
  GC gc;
  void (*exposure_callback)(gr_user_context user_context);
  void (*button_callback)(gr_user_context user_context, int x, int
y);
  void (*scroll_callback)(gr_user_context user_context, int line);
  struct mgr_context_struct *context;
} mgr_widget_struct, *mgr_widget;


/*****************************************************************
****************

    STRUCTURE: mgr_context         AUTHOR: Brent Gregory - May
1 1994

    ABSTRACT: Global data for the motif window system

*****************************************************************
***************/

typedef struct mgr_context_struct {
  mgr_widget top_widget;
  XFontStruct   *italic_font,   *small_font,   *medium_font,
*large_font;
  XFontStruct *default_font;
} mgr_context_struct, *mgr_context;


/* Functions defined in mgr.c */
void  mgr_initialize(gr_widget  *p_top_widget,  gr_sub_context
*p_sub_context);
gr_widget mgr_create_scrolled_window
  (gr_widget owner_widget,
   gr_user_context user_context,
   void (*exposure_callback)(gr_user_context user_context),
   void (*button_callback)(gr_user_context user_context, int x,
int y),
```

```
   void  (*scroll_callback)(gr_user_context  user_context,  int
line),
   hash_table args);
void mgr_set_layer(gr_widget canvas, gr_layer layer);
void mgr_draw_text(gr_widget canvas, int x, int y, string text,
int length);
int mgr_get_text_width(gr_layer layer, string text, int length);
void mgr_get_layers(gr_layer *p_default, gr_layer *p_select,
              gr_layer **p_others, int *p_num_others,
              gr_sub_context context);
int mgr_font_height(gr_layer layer);


/*****************************************************************
***************/
#ifndef lint
static char rcsid[] = "$Header$";
#endif
/*****************************************************************
****************
*****************************************************************
****************

    FILE NAME: mgr_callback.c       MODULE: MGR

    ABSTRACT: Callback functions for Motif version of graphics

    COPYRIGHT (C) 1991, SYNOPSYS INC., ALL RIGHTS RESERVED.

*****************************************************************
****************
*****************************************************************
***************/

#include <X11/Intrinsic.h>
#include <X11/StringDefs.h>
#include <X11/Xutil.h>
#include <Xm/Xm.h>
#include <Xm/DrawingA.h>
#include <Xm/ScrolledW.h>
#include <Xm/ScrollBar.h>

#include "osi.h"
#include "mini_generic.h"
#include "gr.h"
#include "mgr.h"
#include "mgr_int.h"


/*****************************************************************
****************

    FUNCTION: mgr_handle_canvas_exposure    AUTHOR: Brent Gregory
```

```
- May  1 1994

    ABSTRACT: Redraw a canvas

*****************************************************************
***************/

void mgr_handle_exposure(Widget w, mgr_widget canvas,
                XmDrawingAreaCallbackStruct *cb)
{
  (*canvas->exposure_callback)(canvas->user_context);
}


/****************************************************************
****************

    FUNCTION: mgr_handle_resize         AUTHOR: Brent Gregory -
May  1 1994

    ABSTRACT: Note new canvas size

*****************************************************************
***************/

void mgr_handle_resize(Widget w, mgr_widget canvas,
                caddr_t call_data)
{
  Arg wargs[2];
  int n = 0;
  Dimension height, width;

  XtSetArg(wargs[n], XtNheight, &height); n++;
  XtSetArg(wargs[n], XtNwidth, &width); n++;
  XtGetValues(canvas->widget, wargs, n);

  *canvas->p_height = height;
  *canvas->p_width = width;
}


/****************************************************************
****************

    FUNCTION: mgr_handle_button         AUTHOR: Brent Gregory -
May  1 1994

    ABSTRACT: Handle a button click

*****************************************************************
***************/

void mgr_handle_button(Widget w, mgr_widget canvas, XEvent *event)
```

```
  int x = event->xbutton.x;
  int y = event->xbutton.y;

  (*canvas->button_callback)(canvas->user_context, x, y);

  XClearArea(XtDisplay(w), XtWindow(canvas->widget), 0, 0, 0, 0,
TRUE);
}


/***************************************************************
****************

    FUNCTION: mgr_handle_scroll          AUTHOR: Brent Gregory -
May  1 1994

    ABSTRACT: Note new top of screen for next expose

****************************************************************
***************/

void mgr_handle_scroll(Widget w, mgr_widget canvas,
                  XmScrollBarCallbackStruct *call_data)
{
  int line = call_data->value;

  (*canvas->scroll_callback)(canvas->user_context, line);

  XClearArea(XtDisplay(w), XtWindow(canvas->widget), 0, 0, 0, 0,
TRUE);
}


/***************************************************************
***************/
/***************************************************************
****************
****************************************************************
****************

    FILE NAME: mgr_int.h      MODULE:

    ABSTRACT: Private routines in mgr

    COPYRIGHT (C) 1991, SYNOPSYS INC., ALL RIGHTS RESERVED.

****************************************************************
****************
****************************************************************
***************/
```

```
/* Defined by mgr_callback.c */
void mgr_handle_exposure(Widget w, mgr_widget canvas,
                XmDrawingAreaCallbackStruct *cb);
void mgr_handle_resize(Widget w, mgr_widget canvas,
                 caddr_t call_data);
void  mgr_handle_button(Widget  w,  mgr_widget  canvas,  XEvent
*event);
void mgr_handle_scroll(Widget w, mgr_widget canvas,
                 XmScrollBarCallbackStruct *call_data);


/*****************************************************************
****************/
/*****************************************************************
****************
*****************************************************************
****************

    FILE NAME: txt.h                       MODULE: TREE

    ABSTRACT: Declarations for tree widget

    COPYRIGHT (C) 1991, SYNOPSYS INC., ALL RIGHTS RESERVED.

*****************************************************************
****************
*****************************************************************
****************/

#define TXT_INITIAL_WIDTH 500
#define TXT_INITIAL_HEIGHT 700
#define TXT_LEFT_MARGIN 5
#define TXT_BOTTOM_MARGIN 5
#define TXT_TAB 8
#define TXT_LOG_LINES_PER_BLOCK 5


/*****************************************************************
****************

    STRUCTURE: txt_token      AUTHOR: Brent Gregory - Apr 24 1994

    ABSTRACT: Stores info about a token that will be displayed

*****************************************************************
****************/

typedef struct txt_token_struct {
  string text;
  int length;
  gr_layer layer;
  int node_id;
} txt_token_struct, *txt_token;
```

```
/****************************************************************
****************

    STRUCTURE: txt_text_context        AUTHOR: Brent Gregory -
May  2 1994

    ABSTRACT: Infor about a text file

*****************************************************************
***************/

typedef struct txt_text_context_struct {
  string file_name_prefix;
  string source_file_name;
  string tree_file_name;
  tree_pt pt;
  string source;
  int source_size;        /* Number of chars in the source */
  ar_array gens;          /* Array of gens for some lines */
  int line_count;         /* Lines in the file */
  tree_gen top_of_source;
} txt_text_context_struct, *txt_text_context;


/****************************************************************
****************

    STRUCTURE: txt_widget_context  AUTHOR: Brent Gregory - Apr 24
1994

    ABSTRACT: Info about the widget

*****************************************************************
***************/

typedef struct txt_widget_context_struct {
  gr_context gr_context;
  txt_text_context text_context;
  gr_widget top_widget;        /* Onwer of all widgets */
  gr_widget canvas;       /* Drawing area */
  int canvas_height;
  int canvas_width;
  int tallest_token_height;    /* Tallest on current line */
  int token_count;
  ar_array tokens;        /* Current array of tokens */
  hash_table layers;           /* Key: node_id, Data: layer of node
*/
  gr_layer default_layer;
  gr_layer select_layer;
  gr_layer *other_layers;
  int num_other_layers;
  gr_layer last_layer;
  gr_layer current_layer;
```

```
  string tab_memory;
  int tab_memory_size_minus_buffer;
  tree_gen current_source_spot;    /*  Place  to  start  screen
display */
  int lines_on_screen;
  ar_array token_info;
  ar_array y_ranges;
  int selected_node;
  tree_gen current_gen;
  boolean inside_selection;
} txt_widget_context_struct, *txt_widget_context;


/***************************************************************
****************

    STRUCTURE: txt_token_spot      AUTHOR: Brent Gregory - Apr 28
1994

    ABSTRACT: Keeps track of token X locations, and node id's

****************************************************************
***************/

typedef struct txt_token_spot_struct {
  int x_spot, node_id;
} txt_token_spot_struct, *txt_token_spot;



/* Declared in txt_build.c */
gr_widget txt_make_widget(txt_text_context text_context,
                 gr_widget owner_widget,
                 gr_context graphics_context);

/* Declared in txt_text.c */
txt_text_context txt_read_file(string prefix);
tree_gen txt_get_gen_for_line(txt_text_context text_context, int
line);

/* Declared in txt_expose.c */
void txt_handle_exposure(gr_user_context user_context);
void txt_handle_button(gr_user_context user_context, int x, int
y);
void txt_handle_scroll(gr_user_context user_context, int line);


/***************************************************************
***************/
#ifndef lint
static char rcsid[] = "$Header$";
#endif
/***************************************************************
```

```
****************
******************************************************************
****************

    FILE NAME: txt.c          MODULE: txt

    ABSTRACT: Draw a scrollable text widget

    Supports proportional fonts.  Display attributes (including
font)
    is a function of the parse tree node id.

    COPYRIGHT (C) 1991, SYNOPSYS INC., ALL RIGHTS RESERVED.

******************************************************************
****************
******************************************************************
***************/

#include "osi.h"
#include "mini_generic.h"
#include "ar.h"
#include "arg.h"

#include "tree.h"
#include "gr.h"
#include "txt.h"


/*****************************************************************
****************

  Private Functions

******************************************************************
***************/

static    gr_widget    txt_build_windows(txt_widget_context
widget_context);
static   txt_widget_context    txt_widget_initialize(gr_context
graphics_context);


/*****************************************************************
****************

    FUNCTION: txt_make_widget      AUTHOR: Brent Gregory - Apr 24
1994

    ABSTRACT: Create text widget

******************************************************************
***************/
```

```
gr_widget txt_make_widget(txt_text_context text_context,
                 gr_widget owner_widget,
                 gr_context graphics_context)
{
  txt_widget_context widget_context;

  os_show_stat("starting new widget");
  widget_context = txt_widget_initialize(graphics_context);
  widget_context->top_widget = owner_widget;
  widget_context->text_context = text_context;
  widget_context->current_source_spot =
    tree_gen_dup(text_context->top_of_source);
  os_show_stat("Building Windows");
  return(txt_build_windows(widget_context));
}


/****************************************************************
****************

    FUNCTION: txt_build_windows    AUTHOR: Brent Gregory - Apr 24
1994

    ABSTRACT: Create canvas and scrollbar

*****************************************************************
***************/

static   gr_widget   txt_build_windows(txt_widget_context
widget_context)
{
  int default_font_height, slider_size;

  /* Create layers */
  gr_get_layers(&widget_context->default_layer, &widget_context-
>select_layer,
          &widget_context->other_layers,
          &widget_context->num_other_layers,
          widget_context->gr_context);

  widget_context->last_layer = widget_context->default_layer;

  widget_context->canvas_height = TXT_INITIAL_HEIGHT;
  widget_context->canvas_width = TXT_INITIAL_WIDTH;

  default_font_height    =    gr_font_height(widget_context-
>default_layer,
                         widget_context->gr_context);
  slider_size = widget_context->canvas_height/default_font_height;
  if(slider_size > widget_context->text_context->line_count) {
    slider_size = widget_context->text_context->line_count;
  }

  gr_set_arg("gr_height", (void*) &widget_context->canvas_height,
```

```
        widget_context->gr_context);
  gr_set_arg("gr_width", (void *) &widget_context->canvas_width,
        widget_context->gr_context);
  gr_set_arg("gr_scroll_min", (void *) 0, widget_context->gr_context);
  gr_set_arg("gr_scroll_max",
        (void *) (widget_context->text_context->line_count+slider_size),
        widget_context->gr_context);
  gr_set_arg("gr_scroll_increment", (void *) 1, widget_context->gr_context);
  gr_set_arg("gr_page_increment",
        (void *) (widget_context->canvas_height/default_font_height),
        widget_context->gr_context);
  gr_set_arg("gr_slider_size", (void *) slider_size,
        widget_context->gr_context);

  widget_context->canvas =
    gr_create_scrolled_window(widget_context->top_widget,
                  (gr_user_context) widget_context,
                  txt_handle_exposure,
                  txt_handle_button,
                  txt_handle_scroll,
                  widget_context->gr_context);

  return(widget_context->canvas);
}


/*****************************************************************************
****

    FUNCTION: txt_widget_initialize     AUTHOR: Brent Gregory - Apr 24 1994

    ABSTRACT: Allocate context, start of graphics system

*****************************************************************************
****/

static   txt_widget_context   txt_widget_initialize(gr_context graphics_context)
{
  txt_widget_context widget_context = mem_allocate(txt_widget_context_struct,
                                   1);

  widget_context->gr_context = graphics_context;

  widget_context->tokens = ar_alloc(txt_token_struct, 0);
  widget_context->layers = hash_create_caddr_t();
  widget_context->tab_memory_size_minus_buffer = 1;
  widget_context->tab_memory = mem_malloc((int) 1);
```

```
  widget_context->canvas_width = TXT_INITIAL_WIDTH;
  widget_context->canvas_height = TXT_INITIAL_HEIGHT;
  widget_context->token_info = ar_alloc(ar_array, 0);
  widget_context->y_ranges = ar_alloc(int, 0);
  widget_context->selected_node = -1;

  return(widget_context);
}


/***************************************************************
***************/
#ifndef lint
static char rcsid[] = "$Header$";
#endif
/***************************************************************
****************
****************************************************************
****************

    FILE NAME: txt_handle.c        MODULE: txt

    ABSTRACT: Handles events, such as exposure and mouse clicks

    COPYRIGHT (C) 1991, SYNOPSYS INC., ALL RIGHTS RESERVED.

****************************************************************
****************
****************************************************************
***************/

#include "osi.h"
#include "mini_generic.h"
#include "ar.h"
#include "arg.h"

#include "tree.h"
#include "gr.h"
#include "txt.h"


/***************************************************************
****************

  Private Functions

****************************************************************
***************/

static void txt_display_text(int *p_y_spot, int node_id,
                       string text, int length,
                       txt_widget_context widget_context);
static   gr_layer   txt_get_layer_from_node_id(txt_widget_context
```

```
widget_context,
                                int node_id);
static void txt_display_new_line(int *p_y_spot,
                     txt_widget_context widget_context);
static void txt_expand_tabs(string from_text, int from_length,
                    string *p_to_text, int *p_to_length,
                    txt_widget_context widget_context);
static int txt_get_id_from_x_y(int x, int y,
                      txt_widget_context widget_context);


/*****************************************************************
****************

    FUNCTION: txt_handle_exposure  AUTHOR: Brent Gregory - Apr 24
1994

    ABSTRACT: Handle exposure events

*****************************************************************
***************/

void txt_handle_exposure(gr_user_context user_context)
{
  txt_widget_context   widget_context   =   (txt_widget_context)
user_context;
  int previous_node_id = 0;
  int y_spot = 0;
  int current_length = 0;
  string current_text;
  int contents, type;
  char source_char, *source;
  tree_gen   gen   =   tree_gen_dup(widget_context-
>current_source_spot);

  widget_context->tallest_token_height = 0;
  widget_context->token_count = 0;
  widget_context->lines_on_screen = 0;
  widget_context->current_layer = NIL(gr_layer);

  current_text = tree_gen_source(gen);

  widget_context->inside_selection =
    tree_node_is_active(gen, widget_context->selected_node);

  while(tree_gen_next(gen, &type, &source)) {

    widget_context->current_gen = gen;

    switch(type) {
    case TREE_START:
      txt_display_text(&y_spot, previous_node_id,
              current_text, current_length, widget_context);
      if(tree_gen_current_node_id(gen)    ==    widget_context-
```

```
>selected_node) {
      widget_context->inside_selection = TRUE;
       }
       current_text = source;
       current_length = 0;
       break;
    case TREE_END:
       txt_display_text(&y_spot, previous_node_id,
                  current_text, current_length, widget_context);
       if(previous_node_id == widget_context->selected_node) {
      widget_context->inside_selection = FALSE;
       }
       current_text = source;
       current_length = 0;
       break;
    case TREE_CHAR:
       source_char = *source;
       if(source_char == '\n') {
      txt_display_text(&y_spot, tree_gen_current_node_id(gen),
                  current_text, current_length, widget_context);

      if(TXT_BOTTOM_MARGIN    +    y_spot    +    widget_context-
>tallest_token_height >
         widget_context->canvas_height) {

        tree_gen_free(gen);
        return;
      }
      txt_display_new_line(&y_spot, widget_context);
      current_text = source+1;
      current_length = 0;
       } else {
      current_length++;
       }
       break;
    default:
       error_if_verbose(TRUE, "Bad token type");
    }

    previous_node_id = tree_gen_current_node_id(gen);
  }

  tree_gen_free(gen);

  /* handle case where newline is missing at the end of the file
*/
  txt_display_new_line(&y_spot, widget_context);
}


/********************************************************************
****************

    FUNCTION: txt_display_text          AUTHOR: Brent Gregory -
```

```
Apr 24 1994

    ABSTRACT: Put the text on the canvas, keep the x,y up to date.
Remember
    where stuff got put.

    Note: the text does not actually get displayed until the
newline because
    we don't know the height until then.

    I'm using an array of structs, not pointers to structs to
avoid the
    overhead of mallocing and freeing each one.  Allowing "ar" to
manage a
    single array of structs is much more efficient.

*****************************************************************
***************/

static void txt_display_text(int *p_y_spot, int node_id,
                    string text, int length,
                    txt_widget_context widget_context)
{
  gr_layer layer;
  int font_height;
  txt_token_struct new_token_struct;
  txt_token new_token = &new_token_struct;
  txt_token old_token;

  if(length <=0) return;

  layer = txt_get_layer_from_node_id(widget_context, node_id);

  /* add token to the list */
  new_token->text = text;
  new_token->length = length;
  new_token->layer = layer;
  new_token->node_id = node_id;
  ar_insert(txt_token_struct, widget_context->tokens,
        widget_context->token_count++,
        new_token_struct);

  font_height=gr_font_height(layer, widget_context->gr_context);
  if(font_height > widget_context->tallest_token_height) {
    widget_context->tallest_token_height = font_height;
  }

  widget_context->last_layer = layer;
}


/*****************************************************************
****************
```

```
    FUNCTION: txt_get_layer_from_node_id
    AUTHOR: Brent Gregory - Apr 24 1994

    ABSTRACT: Get layer from node id

*****************************************************************
***************/

static  gr_layer  txt_get_layer_from_node_id(txt_widget_context
widget_context,
                                int node_id)
{
  gr_layer layer;

  if(widget_context->inside_selection) {
    return(widget_context->select_layer);
  }

  return(widget_context->other_layers[(node_id>>6)%
                          widget_context->num_other_layers]);
}


/*****************************************************************
****************

    FUNCTION: txt_display_new_line AUTHOR: Brent Gregory - Apr 24
1994

    ABSTRACT: Write all tokens on the line

*****************************************************************
***************/

static void txt_display_new_line(int *p_y_spot,
                     txt_widget_context widget_context)
{
  boolean restart;
  int i, length, x_spot, total_length, start_spot;
  txt_token token;
  string text, start_text;
  ar_array line_array;
  int line = widget_context->lines_on_screen;
  txt_token_spot_struct token_spot_struct;
  txt_token_spot token_spot = &token_spot_struct;
  int tokens_on_line = 0;

  x_spot = TXT_LEFT_MARGIN;

  if(ar_size(widget_context->token_info) <= line) {
    line_array = ar_alloc(txt_token_spot_struct, 0);
    ar_insert(ar_array,    widget_context->token_info,    line,
line_array);
  } else {
```

```
    line_array = ar_fetch(ar_array, widget_context->token_info,
line);
    ar_delete_all(line_array);
  }

  /* If it's a blank line, use most recent text height */
  if(widget_context->tallest_token_height == 0) {
    widget_context->tallest_token_height =
      gr_font_height(widget_context->last_layer,
                widget_context->gr_context);
  }

  *p_y_spot += widget_context->tallest_token_height;

  token = ar_data(txt_token_struct, widget_context->tokens);

  restart = TRUE;

  for(i=widget_context->token_count; i>0; i--) {
    /* set font, color, etc. */
    if(token->layer != widget_context->current_layer) {
      widget_context->current_layer = token->layer;
      gr_set_layer(widget_context->canvas, token->layer,
             widget_context->gr_context);
    }

    if(restart) {
      start_spot = x_spot;
      start_text = token->text;
      total_length = 0;
    }

    total_length += token->length;

    if((i==1) || (token->layer != (token+1)->layer)) {
      txt_expand_tabs(start_text, total_length, &text, &length,
                widget_context);

      gr_draw_text(widget_context->canvas, start_spot, *p_y_spot,
text, length,
              widget_context->gr_context);

      restart = TRUE;
    } else {
      restart = FALSE;
    }

    txt_expand_tabs(token->text, token->length, &text, &length,
              widget_context);
    x_spot += gr_get_text_width(token->layer, text, length,
                 widget_context->gr_context);

    /* note token location */
    line_array = ar_fetch(ar_array, widget_context->token_info,
```

```
line);
    token_spot_struct.node_id = token->node_id;
    token_spot_struct.x_spot = x_spot;
    ar_insert(txt_token_spot_struct, line_array, tokens_on_line++,
            token_spot_struct);
    token++;
  }

  ar_insert(int,    widget_context->y_ranges,    widget_context-
>lines_on_screen,
         *p_y_spot);

  widget_context->tallest_token_height = 0;
  widget_context->token_count = 0;
  widget_context->lines_on_screen++;
}


/*****************************************************************
****************

    FUNCTION: txt_expand_tabs      AUTHOR: Brent Gregory - Apr 24
1994

    ABSTRACT: Use context memory to store expanded version to
avoid
    lots of memory management problems.

    Double memory size and restart if the buffer is not large
enough.

*****************************************************************
***************/

static void txt_expand_tabs(string from_text, int from_length,
                     string *p_to_text, int *p_to_length,
                     txt_widget_context widget_context)
{
  int i, j;
  int to_length = 0;
  int spaces = TXT_TAB;
  string to_spot = widget_context->tab_memory;
  string from_spot = from_text;
  char c;

  for(i=0; i<from_length; i++) {
    if(to_length >= widget_context->tab_memory_size_minus_buffer)
{
      widget_context->tab_memory_size_minus_buffer <<= 1;
      widget_context->tab_memory =
     mem_realloc(widget_context->tab_memory, (int)
             widget_context->tab_memory_size_minus_buffer    +
TXT_TAB*2);
```

```
      /* The easiest way to restart is to recurse */
      txt_expand_tabs(from_text,    from_length,    p_to_text,
p_to_length,
                widget_context);
      return;
    }

    c = *(from_spot++);

    if(c == '\t') {
      for(j=0; j<spaces; j++) {
     *(to_spot++) = ' ';
      }
      to_length += spaces;
      spaces = TXT_TAB;
    } else {
      *(to_spot++) = c;
      to_length++;
      spaces--;
      if(spaces==0) {
     spaces = TXT_TAB;
      }
    }
  }

  *p_to_text = widget_context->tab_memory;
  *p_to_length = to_length;
}


/**************************************************************
****************

    FUNCTION: txt_handle_button    AUTHOR: Brent Gregory - Apr 28
1994

    ABSTRACT: React to button press

**************************************************************
***************/

void txt_handle_button(gr_user_context user_context, int x, int
y)
{
  txt_widget_context   widget_context   =   (txt_widget_context)
user_context;

  int node_id = txt_get_id_from_x_y(x, y, widget_context);

  widget_context->selected_node = node_id;
}
```

```
/*****************************************************************
****************

    FUNCTION: txt_get_id_from_x_y  AUTHOR: Brent Gregory - Apr 28
1994

    ABSTRACT: Compute node if from coordinate.

*****************************************************************
***************/

static int txt_get_id_from_x_y(int x, int y, txt_widget_context
widget_context)
{
  int y_count = ar_size(widget_context->y_ranges);
  int x_count;
  int step = y_count>>1;
  int *y_data = ar_data(int, widget_context->y_ranges);
  txt_token_spot x_data;
  int line, token;
  ar_array line_array;

  if(*(y_data+y_count-1) < y) return(-1);

  for(line=0; line<y_count; line++) {
    if(*(y_data) >= y) break;
    y_data++;
  }

  line_array  =  ar_fetch(ar_array,  widget_context->token_info,
line);

  x_data   =   (txt_token_spot)   ar_data(txt_token_spot_struct,
line_array);

  x_count = ar_size(line_array);

  if((x_data+x_count-1)->x_spot < x) return(-1);

  for(token=0; token<x_count; token++) {
    if(x_data->x_spot >= x) break;
    x_data++;
  }

  return(x_data->node_id);
}


/*****************************************************************
****************

    FUNCTION: txt_handle_scroll    AUTHOR: Brent Gregory - Apr 24
1994
```

```
    ABSTRACT: Handle scroll Events

****************************************************************
***************/

void txt_handle_scroll(gr_user_context user_context, int line)
{
  txt_widget_context   widget_context   =   (txt_widget_context)
user_context;

  tree_gen_free(widget_context->current_source_spot);
  widget_context->current_source_spot =
    txt_get_gen_for_line(widget_context->text_context, line);
}


/***************************************************************
***************/
#ifndef lint
static char rcsid[] = "$Header$";
#endif
/***************************************************************
****************************************************************
****************

    FILE NAME: txt_file.c          MODULE: txt

    ABSTRACT: Routines for reading text files and parse trees

    COPYRIGHT (C) 1991, SYNOPSYS INC., ALL RIGHTS RESERVED.

****************************************************************
****************
****************************************************************
***************/

#include "osi.h"
#include "mini_generic.h"
#include "ar.h"
#include "arg.h"

#include "tree.h"
#include "gr.h"
#include "txt.h"


/***************************************************************
****************

  Private Functions

****************************************************************
***************/
```

```
static void txt_read_data(txt_text_context text_context);
static    void    txt_count_source_newlines(txt_text_context
text_context);


/***************************************************************
****************

    FUNCTION: txt_read_file        AUTHOR: Brent Gregory - May
2 1994

    ABSTRACT: Given a prefix, reads the prefix.src and prefix.bi
files.

****************************************************************
***************/

txt_text_context txt_read_file(string prefix)
{
   t x t _ t e x t _ c o n t e x t   t e x t _ c o n t e x t   =
mem_allocate(txt_text_context_struct, 1);

  text_context->gens = ar_alloc(tree_gen, 0);


  text_context->file_name_prefix = prefix;
  os_show_stat("Reading data files");
  txt_read_data(text_context);
  os_show_stat("Counting newlines");
  txt_count_source_newlines(text_context);

  return(text_context);
}


/***************************************************************
****************

    FUNCTION: txt_read_data        AUTHOR: Brent Gregory - Apr 24
1994

    ABSTRACT: Read source and tree files

****************************************************************
***************/

static void txt_read_data(txt_text_context text_context)
{
  text_context->source_file_name    =    str_dup(text_context-
>file_name_prefix);
  str_cat(&text_context->source_file_name, ".src");

  text_context->tree_file_name    =    str_dup(text_context-
```

```
>file_name_prefix);
  str_cat(&text_context->tree_file_name, ".bi");

  text_context->pt = tree_read_pt(text_context->tree_file_name);
  text_context->source = (string)
    tree_read_raw_file(text_context->source_file_name,
                 (int *) &text_context->source_size);

  tree_set_source(text_context->pt, text_context->source);
}


/*****************************************************************
****************

    FUNCTION: txt_count_source_newlines
    AUTHOR: Brent Gregory - Apr 25 1994

    ABSTRACT: Sum the number of \n in source

    As a side-effect, builds a gen for each block.

*****************************************************************
***************/

static    void    txt_count_source_newlines(txt_text_context
text_context)
{
  char *source;
  int newlines = 0;
  tree_gen gen;
  int type;

  gen = tree_alloc_gen(text_context->pt);
  text_context->top_of_source = tree_gen_dup(gen);
  ar_insert(tree_gen, text_context->gens, 0, tree_gen_dup(gen));

  tree_for_all(text_context->pt, gen, &type, &source) {
    if(type == TREE_CHAR) {
      if(*source == '\n') {
     newlines++;

     if((newlines & ((1 << TXT_LOG_LINES_PER_BLOCK) - 1)) == 0)
{
       ar_insert(tree_gen, text_context->gens,
             newlines>>TXT_LOG_LINES_PER_BLOCK,
tree_gen_dup(gen));
      }
      }
    }
  } tree_end_for;

  text_context->line_count = newlines;
}
```

```
/*****************************************************************
****************

    FUNCTION: txt_get_gen_for_line AUTHOR: Brent Gregory - Apr 26
1994

    ABSTRACT: Given a line number, will return a generator that
will
    start at that line.

    Note: line numbers start at zero!

*****************************************************************
***************/

tree_gen txt_get_gen_for_line(txt_text_context text_context, int
line)
{
  int i, type;
  int line_offset = line & ((1 << TXT_LOG_LINES_PER_BLOCK) - 1);
  tree_gen gen;
  char *source;


  if(line  >=  text_context->line_count)  line  =  text_context-
>line_count - 1;

  gen = tree_gen_dup(ar_fetch(tree_gen, text_context->gens,
                     line >> TXT_LOG_LINES_PER_BLOCK));

  while(1) {
    if(line_offset == 0) return(gen);

    tree_gen_next(gen, &type, &source);

    if(type == TREE_CHAR) {
      if(*source == '\n') {
     line_offset--;
      }
    }
  }
}


/*****************************************************************
***************/
#ifndef lint
static char rcsid[] = "$Header$";
#endif
/*****************************************************************
****************
*****************************************************************
```

```
****************

    FILE NAME: xtxt.c                MODULE: xtxt.c

    ABSTRACT: The Motif version of the text widget

    COPYRIGHT (C) 1991, SYNOPSYS INC., ALL RIGHTS RESERVED.

****************************************************************
****************
****************************************************************
***************/

#include <X11/Intrinsic.h>
#include <X11/StringDefs.h>
#include <X11/Xutil.h>
#include <Xm/Xm.h>
#include <Xm/DrawingA.h>
#include <Xm/ScrolledW.h>
#include <Xm/ScrollBar.h>

#include "osi.h"
#include "mini_generic.h"
#include "ar.h"
#include "arg.h"

#include "tree.h"
#include "gr.h"
#include "mgr.h"
#include "txt.h"
#include "xtxt.h"


/***************************************************************
****************

  Private Functions

****************************************************************
***************/

static xtxt_context xtxt_parse_args(int argc, char **argv);
static gr_context xtxt_create_graphics_context();


/***************************************************************
****************

    FUNCTION: main              AUTHOR: Brent Gregory - May  2 1994

    ABSTRACT: Make a text widget

*****************************************************************************/
```

```
void main(int argc, string *argv)
{
  gr_widget top_widget, last_widget, next_to_last_widget;
  int i;
  xtxt_context context = xtxt_parse_args(argc, argv);
  gr_context graphics_context = xtxt_create_graphics_context();
  txt_text_context    text_context    =    txt_read_file(context-
>file_name_prefix);

  gr_initialize(&top_widget, graphics_context);

  for(i=0; i<context->view_count; i++) {
    next_to_last_widget = last_widget;
    last_widget   =   txt_make_widget(text_context,   top_widget,
graphics_context);
  }

  os_show_stat("Waiting");
  XtMainLoop();
}


/****************************************************************
****************

    FUNCTION: xtxt_parse_args      AUTHOR: Brent Gregory - Apr 24
1994

    ABSTRACT: Decipher arguments

*****************************************************************
***************/

static xtxt_context xtxt_parse_args(int argc, char **argv)
{
  xtxt_context context = mem_allocate(xtxt_context_struct, 1);
  set syntax = set_create();

  (void) set_add_to_end(syntax, (caddr_t)
            arg_define((caddr_t) &context->file_name_prefix,
                "<source prefix>", ARG_REQUIRED));

  context->view_count = 1;
  (void) set_add_to_end(syntax, (caddr_t)
            arg_define((caddr_t) &context->view_count,
                "-num_views#", ARG_OPTIONAL));

  arg_parse(argc, argv, syntax);

  set_delete(syntax);

  return(context);
}
```

H:\HOME\BCE\SYNOPSYS\SY723\ALLSRC0.5P1(5P1)

```
/*****************************************************************
****************

    FUNCTION: xtxt_create_graphics_context  AUTHOR: Brent Gregory
- May  2 1994

    ABSTRACT:

*****************************************************************
***************/

static gr_context xtxt_create_graphics_context()
{
  gr_context graphics_context = gr_alloc_context();

  graphics_context->initialize_func = mgr_initialize;
  graphics_context->create_scrolled_window_func   =
mgr_create_scrolled_window;
  graphics_context->set_layer_func = mgr_set_layer;
  graphics_context->draw_text_func = mgr_draw_text;
  graphics_context->get_text_width_func = mgr_get_text_width;
  graphics_context->get_layers_func = mgr_get_layers;
  graphics_context->font_height_func = mgr_font_height;

  return(graphics_context);
}


/*****************************************************************
***************/
/*****************************************************************
****************
*****************************************************************
****************

    FILE NAME: xtxt.h              MODULE: xtxt

    ABSTRACT: motif version of the txt widget

    COPYRIGHT (C) 1991, SYNOPSYS INC., ALL RIGHTS RESERVED.

*****************************************************************
****************
*****************************************************************
***************/


/*****************************************************************
****************

    STRUCTURE: xtxt_context        AUTHOR: Brent Gregory - May
2 1994
```

```
    ABSTRACT: Globa data for the widget

****************************************************************
***************/

typedef struct xtxt_context_struct {
  string file_name_prefix;
  int view_count;
} xtxt_context_struct, *xtxt_context;


/******************************************************************************/
/***************************************************************
****************
****************************************************************
****************

    FILE NAME: tree.h                MODULE:

    ABSTRACT: Routines for manipulaing parse trees.

    COPYRIGHT (C) 1991, SYNOPSYS INC., ALL RIGHTS RESERVED.

****************************************************************
****************
****************************************************************
***************/

#define TREE_LOG_BLOCK_SIZE   ((int) 2)

#define TREE_START          ((unsigned char) 0)
#define TREE_END            ((unsigned char) 1)
#define TREE_CHAR           ((unsigned char) 2)
#define TREE_BLOCK          ((unsigned char) 3)
#define TREE_END_OF_EXPANDED  ((unsigned char) 4)

#define TREE_BITS_PER_ELEMENT ((int) 2)
#define BITS_PER_BYTE         ((int) 8)


/***************************************************************
****************

    STRUCTURE: tree_stream           AUTHOR: Brent Gregory - Apr 15
1994

    ABSTRACT: This is a recepticle for a parse tree.  You send a
tree here by
    traversing it in "inorder".  Write text to a stream with
tree_write_text.
    Write start and end markers for parse tree delimiters with
    tree_write_element.
```

```
*****************************************************************
***************/

typedef struct tree_stream_struct {
  unsigned char current_character;
  int elements_left;
  FILE *out_fp;
} tree_stream_struct, *tree_stream;


/*****************************************************************
****************

    STRUCTURE: tree_pt               AUTHOR: Brent Gregory - Apr 18
1994

    ABSTRACT: Abstract data type for a parse tree in memory.

*****************************************************************
***************/

typedef struct tree_pt_struct {
  unsigned char *raw_tree;
  int raw_tree_size;
  string source;
} tree_pt_struct, *tree_pt;


/*****************************************************************
****************

    STRUCTURE: tree_gen       AUTHOR: Brent Gregory - Apr 25 1994

    ABSTRACT: Stores the information necessary to iterate through
a tree.

*****************************************************************
***************/

typedef struct tree_gen_struct {
  unsigned char *tree_spot;
  unsigned char *last_tree_spot;
  char *source_spot;
  int current_type;
  ar_array current_node_ids;
  int stack_depth;
  int last_node_id;
  int current_node_id;
  int **expanded_array;       /* Tokens for each possible tree
char */
  int *next_token;
} tree_gen_struct, *tree_gen;
```

```
/****************************************************************
****************
    MACRO: tree_for_all            AUTHOR: Brent Gregory - Apr 18
1994

    ABSTRACT: Iterate through all characters and start/ends in the
tree.

    This macro expands all character blocks to the variable is set
to
    either TREE_START, TREE_END, or TREE_CHAR (Never TREE_BLOCK).

    continue and break ARE supported.

    tree_for_all(pt, variable, &type, &source) {
      ...
    } tree_end_for;
*****************************************************************
***************/
#define tree_for_all(pt, gen, p_type, p_source)
             \
{
             \
  tree_gen_struct _gen_struct;
             \
  tree_gen _gen = &_gen_struct;
             \

             \
  gen = _gen;
             \
  tree_init_gen(_gen, pt);
             \

             \
  while(tree_gen_next(_gen, p_type, p_source)) {
#define tree_end_for
             \

             \
  }
             \
  tree_gen_empty(_gen);
             \
}

/* Public Functions exported by tree_io.c */
```

```
void tree_write_text(tree_stream stream, int new_char_count);
void tree_write_element(tree_stream stream, unsigned char
new_element);
tree_stream tree_create_stream(string out_file_name);
void tree_free_stream(tree_stream stream);
unsigned char *tree_read_raw_file(string file_name, int
*p_length);
tree_pt tree_read_pt(string file_name);


/* Public Functions exported by tree_debug.c */
void tree_display(tree_pt pt);

/* Public Functions exported by tree_util.c */
tree_pt tree_create_pt();
void tree_set_source(tree_pt pt, string source);

/* Public Functions exported by tree_gen.c */
void tree_init_gen(tree_gen gen, tree_pt pt);
tree_gen tree_alloc_gen(tree_pt pt);
boolean tree_gen_next(tree_gen gen, int *p_type, char **p_source);
int **tree_build_expanded_array();
void tree_gen_empty(tree_gen gen);
void tree_gen_free(tree_gen gen);
tree_gen tree_gen_dup(tree_gen gen);
int tree_gen_type(tree_gen gen);
string tree_gen_source(tree_gen gen);
int tree_gen_current_node_id(tree_gen gen);
boolean tree_node_is_active(tree_gen gen, int node_id);


/****************************************************************
***************/
#ifndef lint
static char rcsid[] = "$Header:
/remote/src/syn/garp/dev/ht/tree/RCS/tree_debug.
c,v 1.1 1994/05/01 15:36:30 brent Exp $";
#endif
/****************************************************************
****************
*****************************************************************
****************

    FILE NAME: tree_debug.c        MODULE: TREE

    ABSTRACT: Display tree data

    COPYRIGHT (C) 1991, SYNOPSYS INC., ALL RIGHTS RESERVED.

*****************************************************************
****************
*****************************************************************
***************/
```

```
#include "osi.h"
#include "mini_generic.h"
#include "ar.h"
#include "tree.h"
#include "tree_int.h"


/*****************************************************************
****************

    FUNCTION: tree_display          AUTHOR: Brent Gregory - Apr 18
1994

    ABSTRACT: Show tree with source and braces

*****************************************************************
***************/

void tree_display(tree_pt pt)
{
  char source_char, *source;
  tree_gen gen;
  int type;

  tree_for_all(pt, gen, &type, &source) {
    switch(type) {
    case TREE_START:
      putchar('{');
      break;
    case TREE_END:
      putchar('}');
      break;
    case TREE_CHAR:
      putchar(*source);
      break;
    default:
      error_if(TRUE);
    }
  } tree_end_for;
}


/*****************************************************************
***************/
#ifndef lint
static char rcsid[] = "$Header:
/remote/src/syn/garp/dev/ht/tree/RCS/tree_dump.c
,v 1.1 1994/05/01 15:36:19 brent Exp $";
#endif
/*****************************************************************
****************
*****************************************************************
****************
```

```
FILE NAME: tree_dump.c          MODULE: tree

ABSTRACT: Test routine to dump a tree file

COPYRIGHT (C) 1991, SYNOPSYS INC., ALL RIGHTS RESERVED.

*****************************************************************
****************
*****************************************************************
***************/

#include "osi.h"
#include "mini_generic.h"
#include "ar.h"
#include "tree.h"


/****************************************************************
****************

    FUNCTION: main              AUTHOR: Brent Gregory - Apr 18 1994

    ABSTRACT: Dump a tree to stdout

*****************************************************************
***************/

void main(int argc, char **argv)
{
  FILE *tree_file, *source_file;
  tree_pt pt;
  char *source;

  if((argc < 2) || (argc > 3)) {
    printf("Usage: %s <tree_file> [<source_file>]\n", argv[0]);
    exit(1);
  }

  if(argc == 3) {
    source = (string) tree_read_raw_file(argv[2], NIL(int *));
  } else {
    source = NIL(string);
  }

  pt = tree_read_pt(argv[1]);
  tree_set_source(pt, source);
  tree_display(pt);
}


/****************************************************************
***************/
#ifndef lint
static  char  rcsid[]  =  "$Header:
```

```
/remote/src/syn/garp/dev/ht/tree/RCS/tree_full.c
,v 1.1 1994/05/01 15:36:29 brent Exp $";
#endif
/*****************************************************************
****************
*****************************************************************
****************

    FILE NAME: tree_full.c        MODULE:

    ABSTRACT:

    COPYRIGHT (C) 1991, SYNOPSYS INC., ALL RIGHTS RESERVED.

*****************************************************************
****************
*****************************************************************
***************/

#include "osi.h"
#include "mini_generic.h"
#include "ar.h"
#include "tree.h"
#include "tree_int.h"
#include "tree_full.h"


/*****************************************************************
****************

  Private Functions

*****************************************************************
***************/

static void tree_full_add_child(tree_full_node parent,
                    tree_full_node last_child,
                    tree_full_node child);
static  void  tree_full_display_with_line_numbers(tree_full_node
node,
                              string *p_source,
                              int *p_line, int *p_column,
                              boolean show_brace);
static void tree_full_display_until_spot(string *p_source,
                          int *p_line, int *p_column,
                          int target_line, int target_column);

/*****************************************************************
****************

   FUNCTION: tree_convert_to_full AUTHOR: Brent Gregory - Apr 23
1994
```

ABSTRACT: Converts the stream tree into the full data structure

```
*****************************************************************
***************/

tree_full_node tree_convert_to_full(tree_pt pt)
{
  int contents;
  char source_char, *source;
  stack active_nodes;
  tree_full_node top_node, current_node, current_child, new_node;
  int current_line, current_column, type;
  tree_gen gen;

  active_nodes = stack_createp();

  current_child = NIL(tree_full_node);
  current_node = top_node = tree_create_full();
  current_line = 1;
  current_column = 1;
  current_node->StartRow = current_line;
  current_node->StartCol = current_column;

  tree_for_all(pt, gen, &type, &source) {
    switch(type) {
    case TREE_START:
      stack_pushp(active_nodes, (caddr_t) current_node);
      new_node = tree_create_full();
      new_node->StartRow = current_line;
      new_node->StartCol = current_column;
      tree_full_add_child(current_node, current_child, new_node);
      current_node = new_node;
      current_child = NIL(tree_full_node);
      break;
    case TREE_END:
      current_node->EndRow = current_line;
      current_node->EndCol = current_column;
      current_child = current_node;
      current_node = (tree_full_node) stack_popp(active_nodes);
      break;
    case TREE_CHAR:
      source_char = *source;
      if(source_char == '\n') {
     current_line++;
     current_column = 0;
      }
      if(source_char != '\0') {
     current_column++;
      }

      break;
    default:
      error_if(TRUE);
    }
```

```
  } tree_end_for;

  current_node->EndRow = current_line;
  current_node->EndCol = current_column;

  error_if_verbose(current_node != top_node, "Start/end did not
match");

  return(current_node);
}


/**************************************************************
****************

    FUNCTION: tree_create_full          AUTHOR: Brent Gregory -
Apr 24 1994

    ABSTRACT: Allocate and initialize a full tree node

**************************************************************
***************/

tree_full_node tree_create_full()
{
  tree_full_node new_node = mem_allocate(tree_full_node_struct,
1);

  new_node->pNode = new_node;
  new_node->pParent = NIL(struct NewNodeStruct *);
  new_node->pChild = NIL(struct NewNodeStruct *);
  new_node->pSibling = NIL(struct NewNodeStruct *);
  new_node->StartRow = 0;
  new_node->StartCol = 0;
  new_node->EndRow = 0;
  new_node->EndCol = 0;
  new_node->Color = 0;
  new_node->Level = 0;
  new_node->Selected = 0;

  return(new_node);
}


/**************************************************************
****************

    FUNCTION: tree_full_add_child  AUTHOR: Brent Gregory - Apr 24
1994

    ABSTRACT: Add child to node

**************************************************************
```

```
***************/

static void tree_full_add_child(tree_full_node parent,
                    tree_full_node last_child,
                    tree_full_node child)
{
  if(parent->pChild == NIL(tree_full_node)) {
    parent->pChild = child;
  } else {
    last_child->pSibling = child;
  }

  child->pParent = parent;
}


/*******************************************************************************

    FUNCTION: tree_full_display          AUTHOR: Brent Gregory -
Apr 24 1994

    ABSTRACT: Display full tree

*****************************************************************
***************/

void tree_full_display(tree_full_node node, string source)
{
  int line = 1;
  int column = 1;

  tree_full_display_with_line_numbers(node,    &source,    &line,
&column,
                          /* show_brace */ FALSE);

  /* print remainder of file */
  printf("%s", source);
}


/*****************************************************************
****************

    FUNCTION: tree_full_display_with_line_numbers
    AUTHOR: Brent Gregory - Apr 24 1994

    ABSTRACT: Print node as source with braces.

*****************************************************************
***************/

static  void  tree_full_display_with_line_numbers(tree_full_node
node,
```

```
                            string *p_source,
                            int *p_line, int *p_column,
                            boolean show_brace)
{
  tree_full_node child;

  tree_full_display_until_spot(p_source, p_line, p_column,
                      node->StartRow, node->StartCol);

  if(show_brace) putchar('{');

  for(child = node->pChild; child != NIL(tree_full_node);
      child = child->pSibling) {

    tree_full_display_with_line_numbers(child, p_source, p_line,
p_column,
                         /* show_brace */ TRUE);
  }

  tree_full_display_until_spot(p_source, p_line, p_column,
                      node->EndRow, node->EndCol);

  if(show_brace) putchar('}');
}


/****************************************************************
****************

    FUNCTION: tree_full_display_until_spot
    AUTHOR: Brent Gregory - Apr 24 1994

    ABSTRACT: Print source until until specified line/column is
reached.

****************************************************************
***************/

static void tree_full_display_until_spot(string *p_source,
                         int *p_line, int *p_column,
                         int target_line, int target_column)
{
  while((*p_line < target_line) ||
     ((*p_line == target_line) && (*p_column < target_column)))
{

    putchar(**p_source);
    if(**p_source == '\n') {
      (*p_line)++;
      *p_column = 1;
    } else {
      (*p_column)++;
    }
```

```
    (*p_source)++;
  }
}


/*****************************************************************
***************/
/*****************************************************************
****************
*****************************************************************
****************

    FILE NAME: full.h                 MODULE: TREE

    ABSTRACT: Declares full tree data structure

    COPYRIGHT (C) 1991, SYNOPSYS INC., ALL RIGHTS RESERVED.

*****************************************************************
****************
*****************************************************************
***************/



/*****************************************************************
****************

    STRUCTURE: tree_full        AUTHOR: Javed Rahman - Apr 23 1994

    ABSTRACT: Structure for full-blown in-memory parse tree

*****************************************************************************/

typedef struct NewNodeStruct {
  struct NewNodeStruct *pNode;
  struct NewNodeStruct *pParent;
  struct NewNodeStruct *pChild;
  struct NewNodeStruct *pSibling;
  int StartRow;
  int StartCol;
  int EndRow;
  int EndCol;
  int Color;
  int Level;
  int Selected;
} tree_full_node_struct, *tree_full_node;


/* declared in tree_full.c */
tree_full_node tree_convert_to_full(tree_pt pt);
tree_full_node tree_create_full();
```

```
void tree_full_display(tree_full_node node, string source);


/***************************************************************
***************/
#ifndef lint
static char rcsid[] = "$Header:
/remote/src/syn/garp/dev/ht/tree/RCS/tree_gen.c,
v 1.1 1994/05/01 15:36:33 brent Exp $";
#endif
/***************************************************************
****************
****************************************************************
****************

    FILE NAME: tree_gen.c            MODULE: TREE

    ABSTRACT: Routines for genning around the tree

    COPYRIGHT (C) 1991, SYNOPSYS INC., ALL RIGHTS RESERVED.

****************************************************************
****************
****************************************************************
***************/

#include "osi.h"
#include "mini_generic.h"
#include "ar.h"
#include "tree.h"

/***************************************************************
****************

  Local Data

****************************************************************
***************/

static int end_of_expanded = TREE_END_OF_EXPANDED;


/***************************************************************
****************

    FUNCTION: tree_init_gen          AUTHOR: Brent Gregory - Apr 25
1994

    ABSTRACT: Initialize generator to start of the file

****************************************************************
***************/
```

```
void tree_init_gen(tree_gen gen, tree_pt pt)
{
  gen->tree_spot = pt->raw_tree;
  gen->last_tree_spot = pt->raw_tree+pt->raw_tree_size;
  gen->source_spot = pt->source;
  gen->current_type = -1;
  gen->current_node_ids = ar_alloc(int, 1);
  gen->last_node_id = 0;
  gen->current_node_id = 0;
  gen->expanded_array = tree_build_expanded_array();
  gen->stack_depth = 0;
  gen->next_token = &end_of_expanded;
}


/*******************************************************************
****************

    FUNCTION: tree_alloc_gen        AUTHOR: Brent Gregory - Apr 27
1994

    ABSTRACT: Make and initialize a new generator

********************************************************************
***************/

tree_gen tree_alloc_gen(tree_pt pt)
{
  tree_gen gen = mem_allocate(tree_gen_struct, 1);

  tree_init_gen(gen, pt);

  return(gen);
}


/*******************************************************************
****************

    FUNCTION: tree_gen_next         AUTHOR: Brent Gregory - Apr 27
1994

    ABSTRACT: Move generator to the next item in the tree.

    WARNING: This routine is performance sensitive.  It is called
millions of
    times!  Edit with care.

*******************************************************************************/

boolean tree_gen_next(tree_gen gen, int *p_type, char **p_source)
{
  switch(*p_type = gen->current_type = *(gen->next_token++)) {
```

```
  case TREE_END_OF_EXPANDED:
    if(gen->tree_spot == gen->last_tree_spot) return(FALSE);
    gen->next_token = gen->expanded_array[*(gen->tree_spot++)];
    return(tree_gen_next(gen, p_type, p_source));

  case TREE_START:
    *p_source = gen->source_spot;
    ar_insert(int, gen->current_node_ids, gen->stack_depth++,
           gen->current_node_id);
    gen->current_node_id = gen->last_node_id++;
    break;

  case TREE_END:
    if(gen->stack_depth == 0) {
      return(FALSE);
    } else {
      *p_source = gen->source_spot;
      gen->current_node_id =
     ar_fetch(int, gen->current_node_ids, --gen->stack_depth);
    }
    break;

  case TREE_CHAR:
    if(*gen->source_spot == '\0') return(FALSE);
    *p_source = gen->source_spot++;
    break;
  default:
    error_if_verbose(TRUE, "Bad token in tree");
  }

  return(TRUE);
}


/****************************************************************
****************

    FUNCTION: tree_build_expanded_array AUTHOR: Brent Gregory -
Apr 27 1994

    ABSTRACT: Create the 256 token sequences for each tree pattern

****************************************************************
***************/

int **tree_build_expanded_array()
{
  int **expanded_array, total_tokens;
  int expanded_char_array[BITS_PER_BYTE/TREE_BITS_PER_ELEMENT];
  int *expanded_char, i, j, k, offset;

  expanded_array = mem_allocate(int *, (1<<BITS_PER_BYTE));

  /* pre-expand each possible tree character */
```

```
  for(i=0; i<(1<<BITS_PER_BYTE); i++) {

    /* split each token into an integer */
    tree_expand_char((char) i, expanded_char_array);
    expanded_char = &expanded_char_array[0];

    /* Count the tokens */
    total_tokens = 0;
    for(j=0; j<BITS_PER_BYTE/TREE_BITS_PER_ELEMENT; j++) {
      total_tokens += (*(expanded_char++) == TREE_BLOCK) ?
     (1 << TREE_LOG_BLOCK_SIZE) : 1;
    }

    /* make space for the tokens */
    expanded_array[i] = mem_allocate(int, total_tokens + 1);

    /* fill the tokens */
    offset = 0;
    expanded_char = &expanded_char_array[0];
    for(j=0; j<BITS_PER_BYTE/TREE_BITS_PER_ELEMENT; j++) {
      if (*expanded_char == TREE_BLOCK) {
     for(k=0; k<(1 << TREE_LOG_BLOCK_SIZE); k++) {
       expanded_array[i][offset++] = TREE_CHAR;
     }
     expanded_char++;
      } else {
     expanded_array[i][offset++] = *(expanded_char++);
      }
    }
    expanded_array[i][offset++] = TREE_END_OF_EXPANDED;
  }

  return(expanded_array);
}


/*****************************************************************
****************

    FUNCTION: tree_gen_empty        AUTHOR: Brent Gregory - Apr 26
1994

    ABSTRACT: Free contents of tree_gen (not the tree_gen itself)

******************************************************************
***************/

void tree_gen_empty(tree_gen gen)
{
  ar_free(gen->current_node_ids);
}
```

H:\HOME\BCE\SYNOPSYS\SY723\ALLSRC0.5P1(5P1)

```
******************************************************************************

    FUNCTION: tree_gen_free          AUTHOR: Brent Gregory - Apr 26
1994

    ABSTRACT: Release all memory from a tree_gen

****************************************************************
***************/

void tree_gen_free(tree_gen gen)
{
  tree_gen_empty(gen);
  mem_free((caddr_t) gen);
}


/****************************************************************
****************

    FUNCTION: tree_gen_dup           AUTHOR: Brent Gregory - Apr 26
1994

    ABSTRACT: Return a copy of a tree_gen.

****************************************************************
***************/

tree_gen tree_gen_dup(tree_gen gen)
{
  tree_gen new_gen = mem_allocate(tree_gen_struct, 1);

  memcpy((char *) new_gen, (char *) gen, sizeof(tree_gen_struct));
  new_gen->current_node_ids = ar_dup(gen->current_node_ids);

  return(new_gen);
}


/****************************************************************
****************

    FUNCTION: tree_gen_type          AUTHOR: Brent Gregory - Apr 26
1994

    ABSTRACT: Returns the type for a generator

    Will return one of TREE_CHAR, TREE_START, or TREE_END

****************************************************************
***************/

int tree_gen_type(tree_gen gen)
```

```
  return(gen->current_type);
}


/*****************************************************************
****************

    FUNCTION: tree_gen_source      AUTHOR: Brent Gregory - Apr 26
1994

    ABSTRACT: Returns the source spot for a generator

*****************************************************************
***************/

string tree_gen_source(tree_gen gen)
{
  return(gen->source_spot);
}


/*****************************************************************
****************

    FUNCTION: tree_gen__node_id         AUTHOR: Brent Gregory -
Apr 26 1994

    ABSTRACT: Returns the node_id for a generator

*****************************************************************
***************/

int tree_gen_current_node_id(tree_gen gen)
{
  return(gen->current_node_id);
}


/*****************************************************************
****************

    FUNCTION: tree_node_is_active  AUTHOR: Brent Gregory - Apr 28
1994

    ABSTRACT: Returns TRUE is the node is current or on the stack.

*****************************************************************
***************/

boolean tree_node_is_active(tree_gen gen, int node_id)
{
```

```
  int i;

  if(node_id == gen->current_node_id) return(TRUE);

  for(i=0; i<gen->stack_depth; i++) {
    if(ar_fetch(int,  gen->current_node_ids,  i)  ==  node_id)
return(TRUE);
  }

  return(FALSE);
}


/****************************************************************
***************/
/****************************************************************
****************
*****************************************************************
****************

    FILE NAME: tree_int.h          MODULE: TREE

    ABSTRACT: Internal declarations for parse tree package.

    COPYRIGHT (C) 1991, SYNOPSYS INC., ALL RIGHTS RESERVED.

*****************************************************************
****************
*****************************************************************
***************/

/* Declared in tree_util.c */
void    tree_expand_char(unsigned    char    packed_char,    int
*expanded_char);
#ifndef lint
static  char  rcsid[]  =  "$Header:
/remote/src/syn/garp/dev/ht/tree/RCS/tree_io.c,v
 1.1 1994/05/01 15:41:51 brent Exp $";
#endif
/****************************************************************
****************
*****************************************************************
****************

    FILE NAME: tree_io.c      MODULE: tree

    ABSTRACT: Read and write trees to a stream

    COPYRIGHT (C) 1991, SYNOPSYS INC., ALL RIGHTS RESERVED.

*****************************************************************
****************
*****************************************************************
***************/
```

```
#include "osi.h"
#include "mini_generic.h"
#include "ar.h"
#include "tree.h"
#include "tree_int.h"


/*****************************************************************
****************

    FUNCTION: tree_write_text       AUTHOR: Brent Gregory - Apr 14
1994

    ABSTRACT: Write placeholders for the specified number of
characters

*****************************************************************
***************/

void tree_write_text(tree_stream stream, int new_char_count)
{
  int block_count = new_char_count >> TREE_LOG_BLOCK_SIZE;
  int char_count = new_char_count & ((1<<TREE_LOG_BLOCK_SIZE)-1);
  int i;

  for(i=0; i<block_count; i++) {
    tree_write_element(stream,  TREE_BLOCK);
  }

  for(i=0; i<char_count; i++) {
    tree_write_element(stream,  TREE_CHAR);
  }
}


/*****************************************************************
****************

    FUNCTION: tree_write_element   AUTHOR: Brent Gregory - Apr 15
1994

    ABSTRACT: Write the next element to the stream.

*****************************************************************
***************/

void  tree_write_element(tree_stream   stream,   unsigned   char
new_element)
{
  stream->current_character <<= TREE_BITS_PER_ELEMENT;
  stream->current_character |= new_element;
  if((--stream->elements_left) == 0) {
    fputc(stream->current_character, stream->out_fp);
```

```
    stream->elements_left = BITS_PER_BYTE/TREE_BITS_PER_ELEMENT;
    stream->current_character = 0;
  }
}


/****************************************************************
****************

    FUNCTION: tree_create_stream   AUTHOR: Brent Gregory - Apr 15
1994

    ABSTRACT: Allocate and initialize a new stream.  The output
of the
    stream is directed into the specified file.

*****************************************************************
***************/

tree_stream tree_create_stream(string out_file_name)
{
  tree_stream stream = mem_allocate(tree_stream_struct, 1);

  stream->current_character = 0;
  stream->elements_left = BITS_PER_BYTE/TREE_BITS_PER_ELEMENT;
  stream->out_fp = fopen(out_file_name, "w");

  if(stream->out_fp == NIL(FILE *)) {
    perror(out_file_name);
    exit(1);
  }

  return(stream);
}


/*******************************************************************************

    FUNCTION: tree_free_stream          AUTHOR: Brent Gregory -
Apr 15 1994

    ABSTRACT: Flush all writes to the file, and free the
structure.

*****************************************************************
***************/

void tree_free_stream(tree_stream stream)
{
    w h i l e ( s t r e a m - > e l e m e n t s _ l e f t   ! =
BITS_PER_BYTE/TREE_BITS_PER_ELEMENT) {
    tree_write_element(stream, TREE_CHAR);
  }
```

```
  fclose(stream->out_fp);
  mem_free(stream);
}


/****************************************************************
****************

    FUNCTION: tree_read_raw_file   AUTHOR: Brent Gregory - Mar 12
1992

    ABSTRACT: Read a file.  Return it as a string. Caller must
free string.

*****************************************************************
***************/

unsigned char *tree_read_raw_file(string file_name, int *p_length)
{
  struct stat buf_struct;
  struct stat *buf = &buf_struct;
  int file_size, fd, bytes_read;
  unsigned char *buffer;

  if(stat(file_name, buf) != 0) {
    perror(file_name);
    exit(1);
  }

  file_size = buf->st_size;
  fd = open(file_name, O_RDONLY);
  if(fd == -1) {
    perror(file_name);
    exit(1);
  }

  buffer = (unsigned char *) mem_malloc(file_size+1);
  bytes_read = read(fd, buffer, file_size);
  if(bytes_read == -1) {
    perror(file_name);
    exit(1);
  }

  buffer[file_size] = '\0';

  error_if(bytes_read != file_size);
  (void) close(fd);
  if(p_length != NIL(int *)) *p_length = (int) file_size;
  return(buffer);
}


/****************************************************************
```

```
****************

    FUNCTION: tree_read_pt          AUTHOR: Brent Gregory - Apr 18
1994

    ABSTRACT: Read a parse tree from a file.

****************************************************************
***************/

tree_pt tree_read_pt(string file_name)
{
  tree_pt pt = tree_create_pt();

  pt->raw_tree    =    tree_read_raw_file(file_name,    &pt-
>raw_tree_size);

  return(pt);
}


/****************************************************************
***************/
#ifndef lint
static   char   rcsid[]   =   "$Header:
/remote/src/syn/garp/dev/ht/tree/RCS/tree_test.c
,v 1.1 1994/05/01 15:36:27 brent Exp $";
#endif
/****************************************************************
****************
****************************************************************
****************

    FILE NAME: tree_test.c          MODULE: TREE

    ABSTRACT: Test procedure for tree package

    COPYRIGHT (C) 1991, SYNOPSYS INC., ALL RIGHTS RESERVED.

****************************************************************
****************
****************************************************************
***************/

#include "osi.h"
#include "ar.h"
#include "tree.h"
#include "tree_int.h"


/****************************************************************************
```

```
FUNCTION: main            AUTHOR: Brent Gregory - Apr 15 1994

ABSTRACT: Test trees

****************************************************************
***************/

void main(int argc, string *argv)
{
  long chars_so_far;
  FILE *in_file;
  tree_stream stream;
  int next_char;

  if(argc != 3) {
    printf("Usage: %s <in_file> <out_file>\n", argv[0]);
    exit(1);
  }

  stream = tree_create_stream(argv[2]);

  in_file = fopen(argv[1], "r");

  if(in_file == NIL(FILE *)) {
    perror(argv[1]);
    exit(1);
  }

  chars_so_far = 0;

  while(1) {
    next_char = getc(in_file);

    if(next_char == EOF) break;

    switch(next_char) {
    case '{':
      tree_write_text(stream, chars_so_far);
      chars_so_far = 0;
      tree_write_element(stream, TREE_START);
      break;
    case '}':
      tree_write_text(stream, chars_so_far);
      chars_so_far = 0;
    tree_write_element(stream, TREE_END);
      break;
    default :
      chars_so_far++;
    }
  }
  fclose(in_file);
  tree_write_text(stream, chars_so_far);
  tree_free_stream(stream);
}
```

```
#ifndef lint
static char rcsid[] = "$Header:
/remote/src/syn/garp/dev/ht/tree/RCS/tree_util.c
,v 1.1 1994/05/01 15:36:28 brent Exp $";
#endif
/*****************************************************************
****************
*****************************************************************
****************

    FILE NAME: tree_util.c          MODULE: Util

    ABSTRACT: Utility functions for the tree package

    COPYRIGHT (C) 1991, SYNOPSYS INC., ALL RIGHTS RESERVED.

*****************************************************************
****************
*****************************************************************
***************/

#include "osi.h"
#include "mini_generic.h"
#include "ar.h"
#include "tree.h"
#include "tree_int.h"


/*****************************************************************
****************

    FUNCTION: tree_create_pt        AUTHOR: Brent Gregory - Apr 18
1994

    ABSTRACT: Allocate and initialize a new tree.

*****************************************************************
***************/

tree_pt tree_create_pt()
{
  tree_pt pt = mem_allocate(tree_pt_struct, 1);

  pt->raw_tree = NIL(unsigned char *);
  pt->source = NIL(string);

  return(pt);
}


/*****************************************************************
****************
```

```
    FUNCTION: tree_set_source       AUTHOR: Brent Gregory - Apr 18
1994

    ABSTRACT: Assign the source location for a parse tree

*****************************************************************
***************/

void tree_set_source(tree_pt pt, string source)
{
  pt->source = source;
}


/****************************************************************
****************

    FUNCTION: tree_expand_char          AUTHOR: Brent Gregory -
Apr 23 1994

    ABSTRACT: takes a packed character and expands into a
character array

*****************************************************************
***************/

void    tree_expand_char(unsigned    char    packed_char,    int
*expanded_char)
{
  long chars_left = BITS_PER_BYTE/TREE_BITS_PER_ELEMENT;

  while(chars_left-- != 0) {
     expanded_char[chars_left]    =    packed_char    &
((1<<TREE_BITS_PER_ELEMENT)-1);
    packed_char >>= TREE_BITS_PER_ELEMENT;
  }
}


/****************************************************************
***************/
```

H:\HOME\BCE\SYNOPSYS\SY723\ALLSRC0.5P1(5P1)

```
#ifndef lint
static char rcsid[] = "$Header:
/remote/src/syn/garp/dev/ht/verilog/RCS/ve_tree.c
,v 1.3 1994/05/01 16:14:23 brent Exp $";
#endif
/*****************************************************************
****************
*****************************************************************
****************

    FILE NAME: ve_tree.c  MODULE: VE

    ABSTRACT: Build parse tree.

    COPYRIGHT (C) 1991, SYNOPSYS INC., ALL RIGHTS RESERVED.

*****************************************************************
****************
*****************************************************************
***************/

#include "osi.h"
#include "mini_generic.h"
#include "stack.h"
#include "ar.h"
#include "tree.h"
#include "symb.h"
#include "sli.h"


/*****************************************************************
****************

    STRUCTURE: ve_tree_node  AUTHOR: Brent Gregory - Mar 31 1994

    ABSTRACT: Store info for one level of the parse tree.

*****************************************************************
***************/

typedef struct ve_tree_node_struct {
  ar_array children;
  int start, end;
  int reduction_number;
  int id;
} ve_tree_node_struct, *ve_tree_node;


/*****************************************************************
****************

  Private functions

*****************************************************************
```

```
***************/

static boolean node_has_exactly_one_same_size_child(ve_tree_node
node);
static    void    ve_write_paren_tree(ve_tree_node    node,    int
*p_last_offset,
    tree_stream stream);
static   void   build_keep_table(char   **reduction_table,   int
max_reduction_number);
static void ve_assign_new_node_id(ve_tree_node node, int *p_value);
static void ve_fix_symbol_pt_pointer(symb_symbol symbol);
static int ve_node_owner(int old_id);
static void ve_fix_parse_tree_node_ids(set design_symbols);


/*****************************************************************
****************

  Private Globals

*****************************************************************
***************/

/* nonterminals that will have their parse tree nodes kept in the
   final parse tree */

static string kept_node_array[] =
{
  "module",
  "port",
  "module_item",
  "function",
  "statement",
  "expression",
  "identifier",
  "lidentifier",
  "name",
  NIL(string)
};

static boolean keep_table_done = FALSE;
static char *keep_reduction_array = NIL(char *);
static stack node_stack = NIL(stack);
static int id_count;
static ar_array ve_node_id_table = NIL(ar_array);
static ar_array ve_node_table = NIL(ar_array);


/*****************************************************************
****************

    FUNCTION: ve_new_token  AUTHOR: Brent Gregory - Mar 31 1994

    ABSTRACT: Push a new token on the stack.  (It will be reduced
```

```
later
    by ve_reduce.

*****************************************************************
***************/

void ve_new_token()
{
  ve_tree_node new_node = mem_allocate(ve_tree_node_struct, 1);

  new_node->children = NIL(ar_array);
  new_node->start = ve_current_token_start();
  new_node->end = ve_current_token_end();
  new_node->reduction_number = -1;

  sli_set_pt_node_id(id_count);
  new_node->id = id_count++;

  stack_pushp(node_stack, (caddr_t) new_node);
}


/****************************************************************
****************

    FUNCTION: ve_reduce   AUTHOR: Brent Gregory - Mar 31 1994

    ABSTRACT: Note reduction by popping the reduced nodes off the
stack.
    Create a new node to represent the result of the reduction.
    Add the popped nodes into the children of the new node if they
    have been designated as "kept nodes", by the kept_node_array.

*****************************************************************
***************/

void ve_reduce(int number_reduced, char **reduce_table,
        int max_reduction_number, int reduction_number)
{
  ve_tree_node new_node, child_node, grand_child;
  long i, j;
  boolean first;

  error_if_real(reduction_number >= max_reduction_number);

  /* Build new parse node */
  new_node = mem_allocate(ve_tree_node_struct, 1);
  new_node->end = new_node->start = 0;
  new_node->reduction_number = reduction_number;
  first = TRUE;

  /* Make sure we have a keep table */
  build_keep_table(reduce_table, max_reduction_number);
```

```
 * Collect info on the children that were reduced into this one
*/
  if(number_reduced == 0) {
    new_node->children = NIL(ar_array);
  } else {
    new_node->children = ar_alloc(ve_tree_node, number_reduced);

    sli_set_pt_node_id(id_count);
    new_node->id = id_count++;

    /* Fill the node_id_table and the node_table with the new node
*/
    ar_insert(int, ve_node_id_table, new_node->id, -1);
    ar_insert(ve_tree_node,    ve_node_table,    new_node->id,
new_node);

    /* Reduce each child */
    for(i=0; i<number_reduced; i++) {
      child_node = (ve_tree_node) stack_popp(node_stack);

      if(child_node->start < child_node->end) {

 /* Keep track of the start and end of the new node */
 if(first || (new_node->start > child_node->start)) {
   new_node->start = child_node->start;
 }
 if(first || (new_node->end < child_node->end)) {
   new_node->end = child_node->end;
 }
 first = FALSE;

 /* Decide whether to collapse the children or keep them */
 if((child_node->reduction_number >= 0) &&
    keep_reduction_array[child_node->reduction_number] &&
    !node_has_exactly_one_same_size_child(child_node)) {

   ar_insert_last(ve_tree_node, new_node->children, child_node);
 } else {

   /* Collapse child into parent by adding all grand children,
      then deleting the child */

   if(child_node->children != NIL(ar_array)) {
     for(j=0; j<ar_size(child_node->children); j++) {
       grand_child = ar_fetch(ve_tree_node, child_node->children,
j);
       ar_insert_last(ve_tree_node,    new_node->children,
grand_child);
     }

     ar_free(child_node->children);
   }

   /* Mark node_id_table with the node_id of the parent */
   ar_insert(int, ve_node_id_table, child_node->id, new_node->id);
```

```
    mem_free(child_node);
   }
      }
     }
   }

  stack_pushp(node_stack, new_node);
}


/***************************************************************
****************

    FUNCTION: node_has_exactly_one_same_size_child
    AUTHOR: Brent Gregory - Apr  4 1994

    ABSTRACT: The title says it all...

***************************************************************
***************/

static boolean node_has_exactly_one_same_size_child(ve_tree_node
node)
{
  ve_tree_node child_node;

  if(node->children == NIL(ar_array)) return(FALSE);
  if(ar_size(node->children) != 1) return(FALSE);

  child_node = ar_fetch(ve_tree_node, node->children, 0);

  return((node->start  ==  child_node->start)  &&  (node->end  ==
child_node->end));
}


/***************************************************************
****************

    FUNCTION: ve_print_tree  AUTHOR: Brent Gregory - Mar 31 1994

    ABSTRACT: Dump Tree as text.

***************************************************************
***************/

void ve_print_tree(string in_file_name)
{
  ve_tree_node node;
  string out_file_name;
  int last_offset = 0;
  tree_stream stream;
```

```
  out_file_name = str_dup(in_file_name);
  (void) str_cat(&out_file_name, ".bi");
  stream = tree_create_stream(out_file_name);
  mem_free(out_file_name);

  node = (ve_tree_node) STACK_TOP_PTR(node_stack);

  ve_write_paren_tree(node, &last_offset, stream);

  tree_free_stream(stream);
}


/****************************************************************
****************

    FUNCTION: ve_write_paren_tree AUTHOR: Brent Gregory - Mar 31
1994

    ABSTRACT: Write the file contents with Parenthesis showing
parse
    node locations.

****************************************************************
***************/

static   void   ve_write_paren_tree(ve-tree_node    node,    int
*p_last_offset,
    tree_stream stream)
{
  int i;
  char kept_char;

  if(*p_last_offset<node->start) {
    tree_write_text(stream, node->start - *p_last_offset);
    *p_last_offset = node->start;
  }

  tree_write_element(stream,  TREE_START);

  if(node->children != NIL(ar_array)) {
    for(i=ar_size(node->children)-1; i>=0; i--) {
      ve_write_paren_tree(ar_fetch(ve_tree_node, node->children,
i),
      p_last_offset, stream);
    }
  }

  if(*p_last_offset<node->end) {
    tree_write_text(stream, node->end - *p_last_offset);
    *p_last_offset = node->end;
  }

  tree_write_element(stream,  TREE_END);
```

```
/***************************************************************
****************

    FUNCTION: build_keep_table  AUTHOR: Brent Gregory - Apr  4
1994

    ABSTRACT: Make an array of chars that is the same size as the
reduction
    table.  A "1" indicates that the reductions should be kept as
a node in
    the parse tree.  A "0" means that the reductions will be
collapsed into
    the parent, and will not stand as a separate parse tree node.

****************************************************************
***************/

static   void   build_keep_table(char   **reduction_table,   int
max_reduction_number)
{
  string *kept_node = kept_node_array;
  hash_table nodes_to_keep;
  int i, keep_number;
  string production, end_of_name;

  if(keep_table_done) return;

  /* Make table of all nodes to keep */
  nodes_to_keep = hash_create_char();
  i = 1;
  while(*kept_node != NIL(string)) {
    hash_put(nodes_to_keep, *kept_node, i++);
    kept_node++;
  }

  /* Loop through each reduction and check if it should be kept
*/
  keep_reduction_array=mem_allocate(char, max_reduction_number);
  for(i=0; i<max_reduction_number; i++) {
    production = str_dup(reduction_table[i]);
    end_of_name = strchr(production, ' ');
    *end_of_name = '\0';
    if(hash_get(nodes_to_keep, production, &keep_number)) {
      keep_reduction_array[i] = keep_number;
    } else {
      keep_reduction_array[i] = 0;
    }
    mem_free(production);
  }

  hash_free(nodes_to_keep);
```

```
}


/***************************************************************
****************

    FUNCTION: ve_init_tree  AUTHOR: Brent Gregory - Apr  4 1994

    ABSTRACT: Prepare to build parse tree for a new file.

****************************************************************
***************/

void ve_init_tree()
{
  keep_table_done = FALSE;
  keep_reduction_array = NIL(char *);
  node_stack = stack_createp();
  ve_node_id_table = ar_alloc(int, 0);
  ve_node_table = ar_alloc(ve_tree_node, 0);
  id_count = 0;
  sli_start_new_design_tracking();
}


/***************************************************************
****************

    FUNCTION: ve_clean_tree  AUTHOR: Brent Gregory - Apr  4 1994

    ABSTRACT: Free memory associated with building the parse tree.

****************************************************************
***************/

void ve_clean_tree()
{
  set design_symbols = sli_new_designs();

  ve_fix_parse_tree_node_ids(design_symbols);
  sli_end_new_design_tracking();
  stack_delete(node_stack);
  ar_free(ve_node_id_table);
  ar_free(ve_node_table);
  mem_free(keep_reduction_array);
}


/***************************************************************
****************

    FUNCTION: ve_fix_parse_tree_node_ids  AUTHOR: Brent Gregory -
```

```
May 1 1994

    ABSTRACT: The original parse tree node id assigned during
parse are
    numbered in post-order.  We need to use preorder.

    Also, several nodes are deleted in the processes of building
the
    parse tree.  Their numbers need to be reused so there are no
gaps.

    This routine first traverses the parse tree, and assignes the
    new numbers.  Next, the symbol table is traversed, and
    references to the old numbers are changed to the new numbers
    with the aid of the ve_node_id_table and ve_tree_node table.

    ve_node_id_table tells the parent id that a node was collapsed
into.  If
    the node was not collapsed, the entry is -1.

    ve_tree_node simply maps from old id numbers into parse tree
node
    structures.

*****************************************************************
***************/

static void ve_fix_parse_tree_node_ids(set design_symbols)
{
  symb_symbol design_symbol;
  int node_number = 0;

  /* First, renumber the remaining nodes in pre-order */
  ve_assign_new_node_id((ve_tree_node)STACK_TOP_PTR(node_stack),
   &node_number);

  /* Second, traverse the symbol table, and fix the id pointers
*/
  set_for_all_members(design_symbols, design_symbol) {
    ve_fix_symbol_pt_pointer(design_symbol);
  } set_end_for;
}


/****************************************************************
****************

    FUNCTION: ve_assign_new_node_id
    AUTHOR: Brent Gregory - May 1 1994

    ABSTRACT: Set new number for node at it's children

*****************************************************************
***************/
```

H:\HOME\BCE\SYNOPSYS\SY723\ALLSRC0.5P1(5P1)

```
static void ve_assign_new_node_id(ve_tree_node node, int *p_value)
{
  int i;

  node->id = (*p_value)++;

  for(i=ar_size(node->children)-1; i>=0; i--) {
    ve_assign_new_node_id(ar_fetch(ve_tree_node, node->children,
i), p_value);
  }
}


/*****************************************************************
****************

    FUNCTION: ve_fix_symbol_pt_pointer AUTHOR: Brent Gregory - May
1 1994

    ABSTRACT: Give symbols the new node id number.  Fix children
too.

*****************************************************************
***************/

static void ve_fix_symbol_pt_pointer(symb_symbol symbol)
{
  symb_symbol children;
  int owner_id = ve_node_owner(SYMB_COLUMN_NUMBER(symbol));
  ve_tree_node   owner   =  ar_fetch(ve_tree_node,   ve_node_table,
owner_id);

  SYMB_COLUMN_NUMBER(symbol) = owner->id;

  symb_for_all(symbol, children) {
    ve_fix_symbol_pt_pointer(children);
  } symb_end_for;
}


/*****************************************************************
****************

    FUNCTION: ve_node_owner  AUTHOR: Brent Gregory - May  1 1994

    ABSTRACT: Determine which pt_node the specified node was
collapsed into.

*****************************************************************
***************/

static int ve_node_owner(int old_id)
{
```

```
  int owner_id;
  ve_tree_node new_node;
  int new_id = ar_fetch(int, ve_node_id_table, old_id);

  /* Where the node id table has -1, the node was not collapsed
*/
  if(new_id == -1) {
    return(old_id);
  }

  owner_id = ve_node_owner(new_id);

  /* short-circuit the table, so the next time we'll find the
owner faster */
  if(owner_id != new_id) {
    ar_insert(int, ve_node_id_table, old_id, owner_id);
  }

  return(owner_id);
}
/*******************************************************************
****************/
```

```
#if ! defined(lint) && ! defined(__SABER__)
static char rcsid[] = "$Header:
/remote/src/sys/garp/dev/generic/ar/RCS/ar.c,v 8.
5 1994/01/21 15:03:20 rudell Exp $";
#endif
/*****************************************************************
****************
*****************************************************************
****************

    FILE NAME: ar.c   MODULE: ar

    ABSTRACT: ar package work routines.

    COPYRIGHT (C) 1989, SYNOPSYS INC., ALL RIGHTS RESERVED.

*****************************************************************
****************
*****************************************************************
***************/


#ifdef ABO_SUBPACKAGE

#include "util.h"
#include "ar.h"
#define ARITHMTC_MAX MAX

#else

#include "osi.h"
#include "ar.h"
#include "generic.h"

#define ALLOC(type, num) \
    ((type *) mem_malloc(sizeof(type) * (num)))
#define REALLOC(type, obj, num) \
    ((type *) mem_realloc((char *) obj, sizeof(type) * (num)))
#define FREE(obj) \
    mem_free(obj)
#define fail(s)   error_if_verbose(1, s)
#endif


#define INIT_SIZE 2

int ar_temp_i;  /* Edward - left this in to minimize disruption
*/
int ar_temp_i1;  /* global for macro's */
int ar_temp_i2;  /* global for macro's */

#if defined(lint)
int ar_lint_var; /* dummy var for lint */
#endif
```

```
ar_array
ar_do_alloc(int size, int number)
{
    ar_array array;

    array = ALLOC(ar_array_struct, 1);
    array->num = 0;
    array->n_size = ARITHMTC_MAX(number, INIT_SIZE);
    array->obj_size = size;
    array->space = ALLOC(char, array->n_size * array->obj_size);
    (void) memset((char *) array->space, 0, array->n_size * array-
>obj_size);
    return array;
}

void
ar_free(ar_array array)
{
    FREE(array->space);
    FREE(array);
}

ar_array
ar_dup(ar_array old)
{
    ar_array new;

    new = ALLOC(ar_array_struct, 1);
    new->num = old->num;
    new->n_size = old->num;
    new->obj_size = old->obj_size;
    new->space = ALLOC(char, new->n_size * new->obj_size);
    (void)  memcpy(new->space,  old->space,  old->num  *  old-
>obj_size);
    return new;
}
```

```
/* append the elements of array2 to the end of array1 */
void
ar_append(ar_array array1, ar_array array2)
{
    char *pos;

    if (array1->obj_size != array2->obj_size) {
 (void) ar_abort(2);
 /* NOTREACHED */
    }

    /* make sure array1 has enough room */
    if (array1->n_size < array1->num + array2->num) {
 (void) ar_resize(array1, array1->num + array2->num);
    }

    pos = array1->space + array1->num * array1->obj_size;
    (void)  memcpy(pos,  array2->space,  array2->num  *  array2-
>obj_size);
    array1->num += array2->num;
}


/* join array1 and array2, returning a new array */
ar_array
ar_join(ar_array array1, ar_array array2)
{
    ar_array array;
    char *pos;

    if (array1->obj_size != array2->obj_size) {
 (void) ar_abort(3);
 /* NOTREACHED */
    }

    array = ALLOC(ar_array_struct, 1);
    array->num = array1->num + array2->num;
    array->n_size = array->num;
    array->obj_size = array1->obj_size;
    array->space = ALLOC(char, array->n_size * array->obj_size);
    (void)  memcpy(array->space,  array1->space,  array1->num  *
array1->obj_size);
    pos = array->space + array1->num * array1->obj_size;
    (void)  memcpy(pos,  array2->space,  array2->num  *  array2-
>obj_size);
    return array;
}
```

```
char *
ar_do_data_copy(ar_array array)
{
    char *data;

    data = ALLOC(char, array->num * array->obj_size);
    (void)  memcpy(data,  array->space,  array->num  *  array-
>obj_size);
    return data;
}


int   /* would like to be void, except for macro's */
ar_resize(ar_array array, int new_size)
{
    int old_size;
    char *pos;

    old_size = array->n_size;
    array->n_size = ARITHMTC_MAX(array->n_size * 2, new_size);
    array->space  =  REALLOC(char,  array->space,  array->n_size  *
array->obj_size);
    pos = array->space + old_size * array->obj_size;
    (void)  memset(pos,  0,  (array->n_size  -  old_size)*array-
>obj_size);
    return(new_size);
}


void
ar_delete_slice(ar_array array, int i, int num)
{
    int num_copy;
    char *src, *dest;

    num_copy = array->num - (i + num);
    /* Denis Martin 06-Jan-94: Only copy active portion of array.
*/
    if (num_copy > 0) {
 src = array->space + (i + num) * array->obj_size;
 dest = array->space + i * array->obj_size;
 (void) memcpy(dest, src, num_copy * array->obj_size);
    }
    array->num -= num;
    if (array->num < 0) array->num = 0;
}
```

```
#define addr(array, pos)        \
    ((array->space + (pos) * (array)->obj_size))

#define swap(a, buf, i, j)          \
    (void) memcpy(buf, addr(a,i), a->obj_size);      \
    (void) memcpy(addr(a,i), addr(a,j), a->obj_size);       \
    (void) memcpy(addr(a,j), buf, a->obj_size);

static void
quick_sort(ar_array_struct *array, ar_compare_fcn compare, char
*buf, int left, i
nt right)
{
    int i, last, pivot;

    if (left >= right) return;

    pivot = (left + right) / 2;
    swap(array, buf, left, pivot);
    last = left;
    for(i = left+1; i <= right; i++) {
 if ((*compare)((char*)addr(array,i), (char*)addr(array,left)) <
0) {
     last++;
     swap(array, buf, last, i);
 }
    }
    swap(array, buf, left, last);
    quick_sort(array, compare, buf, left, last-1);
    quick_sort(array, compare, buf, last+1, right);
}


void
ar_sort(ar_array array, ar_compare_fcn compare)
{
    char *buf;

    buf = ALLOC(char, array->obj_size);
    quick_sort(array, compare, buf, 0, array_n(array)-1);
    FREE(buf);
}


void
ar_sort_safe(ar_array array, ar_compare_fcn compare)
{
    int i, j, ij, ji;

    ar_sort(array, compare);
    for(i = 1; i < array_n(array); i++) {
 for(j = i; j < array_n(array); j++) {
     ij = (*compare)((char *) addr(array, i), (char *) addr(array,
j));
```

```
      if (ij > 0) {
  fail("comparison function not transitive");
      }
      ji = (*compare)((char *) addr(array, j), (char *) addr(array,
i));
      if (ji != - ij) {
  fail("comparison function not symmetric");
      }
 }
    }
}


void
ar_uniq(ar_array  array,  ar_compare_fcn  compare,  ar_free_fcn
free_func)
{
    int i, last;
    char *dest, *obj1, *obj2;

    dest = array->space;
    obj1 = array->space;
    obj2 = array->space + array->obj_size;
    last = array->num;

    for(i = 1; i < last; i++) {
 if ((*compare)((char *) obj1, (char *) obj2) != 0) {
     if (dest != obj1) {
  (void) memcpy(dest, obj1, array->obj_size);
     }
     dest += array->obj_size;
 } else {
     if (free_func != 0) (*free_func)(obj1);
     array->num--;
 }
 obj1 += array->obj_size;
 obj2 += array->obj_size;
    }
    if (dest != obj1) {
 (void) memcpy(dest, obj1, array->obj_size);
    }
}
```

```
int   /* would like to be void, except for macro's */
ar_abort(int i)
{
    switch (i) {
    case 0:
 fail("ar: array access out of bounds");
    case 1:
 fail("ar: object size mismatch");
    case 2:
 fail("ar: append not defined for arrays of different sizes");
    case 3:
 fail("ar: join not defined for arrays of different sizes");
    default:
 fail("ar: unknown error");
    }
    return i;
}
```

```
/*****************************************************************
****************
*****************************************************************
****************

    FILE NAME: ar.h   MODULE: ar

    ABSTRACT: array package manipulating routines and macros.

    COPYRIGHT (C) 1989, SYNOPSYS INC., ALL RIGHTS RESERVED.

*****************************************************************
****************
*****************************************************************
***************/

#ifndef AR_H
#define AR_H

#include "ar_defs.h"

#if !defined(Synopsys_Develop)
#define AR_NO_DEBUG
#endif

struct ar_array_struct {
    char *space;
```

```
    int num;  /* number of array elements */
    int n_size;  /* size of 'data' array (in objects) */
    int obj_size; /* size of each array object */
} ;


#if defined(lint)

#define ar_insert(type, a, i, datum)  \
    (ar_temp_i1 = (i),     \
      ar_lint_var  =  ar_temp_i1  >=  (a)->n_size  ?  ar_resize(a,
ar_temp_i1 + 1) : 0,
\
      ar_lint_var = ar_temp_i1 >= (a)->num ? (a)->num = ar_temp_i1
+ 1 : 0,\
      *((type  *)  ((a)->space  +  ar_temp_i1  *  sizeof(type)))  =
datum)

#define ar_fetch(type, a, i)    \
    (*((type *) ((a)->space + (i) * sizeof(type))))

#elif !defined(AR_NO_DEBUG)

#define ar_insert(type, a, i, datum)   \
    (ar_temp_i1 = (i),     \
      ar_temp_i1 < 0 ? ar_abort(0) : 0,  \
      sizeof(type) != (a)->obj_size ? ar_abort(1) : 0,\
      ar_temp_i1 >= (a)->n_size ? ar_resize(a, ar_temp_i1 + 1) :
0,\
      ar_temp_i1 >= (a)->num ? (a)->num = ar_temp_i1 + 1 : 0,\
      *((type  *)  ((a)->space  +  ar_temp_i1  *  sizeof(type)))  =
datum)

#define ar_fetch(type, a, i)    \
    (ar_temp_i2 = (i),     \
      (ar_temp_i2 < 0 || ar_temp_i2 >= (a)->num) ? ar_abort(0) :
0,\
      sizeof(type) != (a)->obj_size ? ar_abort(1) : 0,\
      *((type *) ((a)->space + ar_temp_i2 * sizeof(type))))

#else

#define ar_insert(type, a, i, datum)  \
    (ar_temp_i1 = (i),     \
      ar_temp_i1 >= (a)->n_size ? ar_resize(a, ar_temp_i1 + 1) :
0,\
      ar_temp_i1 >= (a)->num ? (a)->num = ar_temp_i1 + 1 : 0,\
      *((type  *)  ((a)->space  +  ar_temp_i1  *  sizeof(type)))  =
datum)

#define ar_fetch(type, a, i)    \
    (*((type *) ((a)->space + (i) * sizeof(type))))

#endif
```

```
#define ar_alloc(type, number)
    ar_do_alloc(sizeof(type), number)

#define ar_delete(array, i)    \
    ar_delete_slice(array, i, 1)

#define ar_delete_all(array)                          \
    (array)->num = 0

#define ar_insert_last(type, array, datum) \
    ar_insert(type, array, (array)->num, datum)

#define ar_fetch_last(type, array)   \
    ar_fetch(type, array, (array)->num - 1)

#define ar_delete_last(array)    \
    ar_delete(array, (array)->num - 1)

#define ar_size(array)     \
    ((array)->num)

#define ar_data(type, array)     \
    ((type *) (array)->space)

#define ar_data_copy(type, array)   \
    (type *) ar_do_data_copy(array)


/* backwards compatability for abo */
/* define of #defines */
#define array_alloc(type, number)        ar_alloc(type, number)
#define array_data(type, array)          ar_data(type, array)
#define array_data_copy(type, array)    ar_data_copy(type, array)
#define array_delete(array,i)            ar_delete(array,i)
#define array_delete_last(array)         ar_delete_last(array)
#define array_delete_slice(array,i)      ar_delete_slice(array,i)
#define array_fetch(type,a,i)            ar_fetch(type,a,i)
#define array_fetch_last(type,array)    ar_fetch_last(type,array)
#define array_n(array)                   ar_size(array)
#define array_insert(type,a,i,datum)    ar_insert(type,a,i,datum)
#define array_insert_last(type,array,datum)
ar_insert_last(type,array,datum)

/* define of functions */
#define array_join      ar_join
#define array_sort      ar_sort
#define array_uniq      ar_uniq
#define array_free      ar_free
#define array_t         ar_array_struct
#define array_append    ar_append
#define array_dup       ar_dup

/* this is needed so we can use these functions with C++ */
#ifdef __cplusplus
extern "C" {
```

```
#endif
extern ar_array ar_do_alloc(int size, int number);
extern ar_array ar_dup(ar_array old);
extern ar_array ar_join(ar_array array1, ar_array array2);
extern void ar_free(ar_array array);
extern void ar_append(ar_array array1, ar_array array2);
extern void ar_delete_slice(ar_array array, int i, int num);
extern void ar_sort(ar_array array, ar_compare_fcn compare);
extern void ar_sort_safe(ar_array array, ar_compare_fcn compare);
extern  void  ar_uniq(ar_array  array,  ar_compare_fcn  compare,
ar_free_fcn free);
extern int ar_abort(int i);
extern int ar_resize(ar_array array, int new_size);
extern char *ar_do_data_copy(ar_array array);

extern int ar_temp_i1;
extern int ar_temp_i2;

#if defined(lint)
extern int ar_lint_var;
#endif
#ifdef __cplusplus
};
#endif
#endif
```

```
/****************************************************************
****************
*****************************************************************
****************

    FILE NAME: ar_defs.h   MODULE: ar

    ABSTRACT: array package manipulating routines and macros.

    COPYRIGHT (C) 1989, SYNOPSYS INC., ALL RIGHTS RESERVED.

*****************************************************************
****************
*****************************************************************
***************/

#ifndef AR_DEFS_H
#define AR_DEFS_H

typedef struct ar_array_struct ar_array_struct, *ar_array;
```

```
typedef int (*ar_compare_fcn)(char *x, char *y);
typedef void (*ar_free_fcn)(char *x);

#endif
```

```
#include "osi.h"
#include "ar.h"
#include "mem.h"

extern long random(void);
extern void srandom(int);
extern int optind;
extern char *optarg;
extern int getopt(int, char **, char *);

static int count;    /* global: count # compares */


static int
compare(char *a, char *b)
{
    count++;
    return *(int *) a - * (int *) b;
}


static void
print(char *s, ar_array a)
{
    int i;

    (void) printf("%s\n", s);
    for(i = 0; i < ar_size(a); i++) {
 (void) printf(" %d", ar_fetch(int, a, i));
    }
    (void) printf("\n");
}


#define IN_ORDER  1
#define REVERSE_ORDER  2
#define RANDOM    3
#define RANDOM_RANGE 4


static void
usage(char *prog)
```

```
    (void) fprintf(stderr, "%s: check out the array package\n",
prog);
    (void) fprintf(stderr, "\t-o\tinitial data in order\n");
    (void)  fprintf(stderr,  "\t-r\tinitial  data  in  reverse
order\n");
    (void) fprintf(stderr, "\t-n #\tnumber of values to sort\n");
    (void) fprintf(stderr, "\t-b #\tmaximum value for the random
values\n");
    exit(2);
}

int
main(int argc, char **argv)
{
    ar_array a, a1;
    int *b, i, n, type, c, range, value;

    type = RANDOM_RANGE;
    range = 10;
    n = 15;
    while ((c = getopt(argc, argv, "b:orn:")) != EOF) {
 switch (c) {
     case 'o':
  type = IN_ORDER;
  break;
     case 'r':
  type = REVERSE_ORDER;
  break;
     case 'n':
  n = atoi(optarg);
  break;
     case 'b':
  type = RANDOM_RANGE;
  range = atoi(optarg);
  break;
     default:
  usage(argv[0]);
  break;
 }
    }

    if (optind != argc) {
 usage(argv[0]);
    }

    /*
     *  create the input-data
     */
    srandom(1);
    a = ar_alloc(int, 0);
    for(i = 0; i < n; i++) {
 if (type == IN_ORDER) {
     value = i;
 } else if (type == REVERSE_ORDER) {
```

```
        value = n - i;
    } else if (type == RANDOM_RANGE) {
        value = random() % range;
    } else {
        value = random();
    }
    ar_insert(int, a, i, value);
    if (n < 50) (void) printf(" %d", value);
    }
    (void) printf("\nfill: %d objects, time was %s\n", ar_size(a),
"");
    if (n < 50) print("unsorted list", a);


    /*
     *  time a fill using normal subscripted arrays
     */
    srandom(1);
    b = (int *) mem_malloc((long) (sizeof(int) * n));
    for(i = 0; i < n; i++) {
    if (type == IN_ORDER) {
        value = i;
    } else if (type == REVERSE_ORDER) {
        value = n - i;
    } else if (type == RANDOM_RANGE) {
        value = random() % range;
    } else {
        value = random();
    }
    b[i] = value;
    }
    (void) printf("fill (fast): %d objects, time was %s\n",
ar_size(a), "");

    /*
     *  now a quick check of append() and insert_last()
     */
    a1 = ar_alloc(int, 5);
    ar_insert_last(int, a1, 2);
    ar_insert_last(int, a1, 1);
    ar_insert_last(int, a1, 0);
    if (n < 50) print("unsorted list1", a1);
    ar_append(a, a1);
    (void) printf("after join: %d objects, time was %s\n",
ar_size(a), "");
    if (n < 50) print("unsorted list (after join)", a);
    ar_free(a1);



    /*
     *  Test the sorter
     */
    count = 0;
    ar_sort(a, compare);
```

```
    (void) printf("sort: %d objects, %d compares, time was %s\n",
ar_size(a), count, "");
    if (n < 50) print("sorted list", a);

    /*
     *  Try the uniq
     */
    count = 0;
    ar_uniq(a, compare, (void (*)(char *)) 0);
    (void) printf("uniq: %d objects, %d compares, time was %s\n",
ar_size(a), count, "");
    if (n < 50) print("uniq list", a);

    /*
     *  check macro nesting
     */
    ar_insert_last(int,a,ar_fetch(int,a,0));
    print("inserted [0] at end of list", a);

    /*
     *  Try delete()
     */
    ar_delete(a,2);
    print("deleted [2] list", a);

    /*
     *  Try delete_slice()
     */
    ar_delete_slice(a,2,3);
    print("deleted [2..4] list", a);

    /*
     *  Try delete_all()
     */
    ar_delete_all(a);
    print("delete all list", a);

    return 0;
}
```

```
#ifndef lint
static char rcsid[] = "$Header:
/remote/src/sys/garp/dev/generic/str/RCS/str.c,v 8.11 1994/04/26
16:28:36 billm Exp $";
#endif
/*****************************************************************
****************
*****************************************************************
****************
**
** FILE NAME: str.c
**
**      MODULE:    generic
**
** ABSTRACT:  Contains system string handling routines.
**
**      CONVENTIONS:
**
** COPYRIGHT (C) 1987, OPTIMAL SOLUTIONS INC., ALL RIGHTS
RESERVED.
**
*****************************************************************
****************
*****************************************************************
***************/

#include "osi.h"
#include "mem.h"
#include "set.h"
#include "str.h"
#include "error.h"
#include "min_max.h"

#ifdef Synopsys_SystemFive
#include <string.h>
#else
#include <strings.h>
#endif

static long str_get_token(string *p_text, boolean *p_integer, long
int *p_length) ;
static boolean is_all_white_space(string str) ;

          /* continues!! */
```

```
/*****************************************************************
****************
*
* FUNCTION: str_alloc
*
* ABSTRACT: Allocates a string of a specified size and gives it
an
*                  initial character string, if one is specified.
*
* RETURNS:  Returns a string.
*
* EXTERNAL EFFECTS:  Memory is allocated.
*
* NOTES AND ASSUMPTIONS:
*
*            o The header file 'str.h' must be included to use this
function
*
*             o If size is smaller than the length of the initial
character
*               string, then size is disregarded and the string is
made at
*               least as big as 1 plus the length of the initial
*               character string.
*
*             o Example call (to allocate a string of size 14):
*
*               STRING foo;
*               foo = str_alloc( 14, NULL);
*
*            o Example call (to allocate a string with "hi there!"
in it):
*
*               string foo ;
*               foo = str_alloc( 0, "hi there!") ;
*
*             o This routine assumes that the memory manager will
signify an
*             OUT_OF_MEMORY error.  However, if the memory manager
returns
*               a NULL pointer to this routine, this routine will
return NULL.
*
* HISTORY:
*  Dec 11 1987 Russ Segal Changed string structure
*  Oct 23 1987 Brent Gregory Added groups
*  Aug 11 1987 Jerry Huth put in init_str stuff
*  Jul 28 1987 Van Morgan Fixed type cast problems
*  Jan 14 1987 Timothy Moore Original.
*
*****************************************************************
***************/

string str_alloc(int size, char *init_str)
```

```
                /* initial size of the character string to be
allocated */
                /* this routine does NOT allocate an extra byte
for '\0' */
                    /* the initial character string */

{

  long len ;   /* length of the initial string */
  long size_to_use ;  /* the size to allocate */
  string str;         /* the newly allocated string */

   /* Find the size string to alloc */

   if( init_str == NULL)
     size_to_use = size ;
   else {
     len = strlen(init_str) ;
     if( len >= size)
       size_to_use = len+1 ;
     else
       size_to_use = size ;
   }
   if ( size_to_use <= 0 )
     size_to_use = 1;  /* Allocate at least something */


   /* Allocate the string */

   str = (string) mem_malloc((long) size_to_use * sizeof(char));

   /* Check for a NULL string allocated, if so, then out of
memory.          */

   if ( str == NULL) {
      return( NULL );
   }

   /* copy in the initial string */

   if( init_str != NULL)
     (void) strcpy((char *) str, init_str) ;
   else ((char *) str)[0] = '\0';

   return( str );
}
```

```
/*****************************************************************
****************
*
* FUNCTION: str_free
*
* ABSTRACT: Free the memory for a given string
*
* RETURNS:  void
*
* EXTERNAL EFFECTS: Frees the memory
*
* NOTES AND ASSUMPTIONS:
*
*             o This routine assumes that the memory manager will
signify if an
*               error freeing memory occurred.
*
* HISTORY:
*  Jun 04 1992 Rob Verbrugghe Don't fatal on NIL strings!
*  Dec 11 1987 Russ Segal Changed string structure
*  Aug  4 1987 Jerry Huth modified to return void
*  Jul 28 1987 Van Morgan fixed type cast problems
*  Jan 14 1987 Timothy Moore Original.
*
*****************************************************************
***************/

void str_free(string str)

                /* the string to be freed */

{

  /* Free the actual character string if one has been allocated
         */

  mem_free(str) ;
}
```

```
/***************************************************************
***************
*
* FUNCTION: str_install
*
* ABSTRACT: Places a character string into a string.
*
* RETURNS:  void
*
* EXTERNAL EFFECTS: Memory is allocated if the string is too small
*                 to fit the character string.
*
* NOTES AND ASSUMPTIONS:
*
*             o If the destination string was too small to accept
the target
*              character string, then the previous piece of memory
is freed and
*                 a piece of memory is allocated large enough to
accommodate the
*               target string.
*
*            o Example call:
*
*               str_install( foo, "This is only a test." );
*
*             o This routine assumes that the memory manager will
signify an
*               OUT_OF_MEMORY error if out of memory.
*
* HISTORY:
*  Dec 11 1987 Russ Segal Changed string structure
*  Aug 12 1987 Jerry Huth changed back to NOT
*                                                   return a string
*  Aug  4 1987 Jerry Huth changed to return a string
*  Jan 14 1987 Timothy Moore Original.
*  Mar  9 1989 Fred Krumbein Cast the return value of
*      strlen () to long.
*
***************************************************************
***************/

void str_install(string *str, char *char_str)

                     /* the string into which the character string
is */
                     /*    installed (unless str is NULL).
   */
                     /*  the  character  string  which  is  to  be
installed into the */
                     /* string */

{
   long length;  /* needed length of str */
```

```
    error_if ( char_str == NIL(char *)) ;

    length = (long)strlen(char_str) + 1;

    if( *str == NULL) {

       /* NULL str, create one */
        *str = (string) mem_malloc(length * sizeof(char));
    } else {

       /* Realloc the str in case it's too small */
       *str = (string) mem_realloc((caddr_t) *str, length) ;
    }
    if (*str == NULL) return;

    /* copy and return str */
    (void) strcpy(*str, char_str);
}
```

```
/*****************************************************************
****************
*
* FUNCTION: str_copy
*
* ABSTRACT: Copies one STRING to another
*
* RETURNS:  void
*
* EXTERNAL EFFECTS:
*
* NOTES AND ASSUMPTIONS:
*
*           o If the destination string was too small to accept
the target
*             string, then the previous piece of memory is freed
and a piece of
*            memory is allocated large enough to accommodate the
target
*             string.
*
*           o Example call:
*
*             str_copy( foo, glorp );
*
*           o This routine assumes that the memory manager will
signify an
*             OUT_OF_MEMORY error.
*
* HISTORY:
*                 Sep 23 1993     Randy Karasek   Changed error_if
to
*                                                 check "dest", not
"*dest"
*  Dec 11 1987 Russ Segal Changed string structure
 *  Oct 15 1987 Van Morgan fixed a realloc problem.
*  Aug  4 1987 Jerry Huth changed to return void
*  Jan 14 1987 Timothy Moore Original.
*
*****************************************************************
***************/

void str_copy(string *dest, string target)

                      /* The destination string */
                     /* The string copied into destination string
*/

{

   error_if ( dest == NIL(string*) || target == NIL(string)) ;

   /* mem_realloc string in case it's too small */
```

```
    *dest = (string) mem_realloc((caddr_t) *dest,
      (long) (strlen(target) + 1) * sizeof(char)) ;
    if (*dest == NULL) return;
    (void) strcpy((char *) *dest, (char *) target);

    return ;
}
```

```
/*****************************************************************
****************
*
* FUNCTION: str_realloc
*
* ABSTRACT: Reallocates the actual character string within the
STRING
*                structure, copies the old string, then frees the
old string
*
* RETURNS:  TRUE if the reallocation was successful, else FALSE.
*
* EXTERNAL EFFECTS: The previous piece of memory is freed and a
larger
*                  piece is allocated.
*
* NOTES AND ASSUMPTIONS:
*
*            o This routine assumes that the memory manager will
signify an
*            OUT_OF_MEMORY error.  However, if the memory manager
returns
*              a NULL pointer to this routine, this routine will
return FALSE.
*
*            o This functions uses 'mem_malloc' to allocate the
character string
*                which will sometimes allocates more memory than
requested.  If
*              additional memory is allocated, this will be noted
and used.
*
* HISTORY:
*  Dec 11 1987 Russ Segal Changed string structure
*  Sep  8 1987 Van Morgan copies old string into the new,
*                                                no longer static
*  Jan 14 1987 Timothy Moore Original.
*
*****************************************************************
***************/

boolean str_realloc(string *str, int size)

                 /* The string to be reallocated */
              /* The size to make the new string */

{

   error_if ( str == NIL(string *) ) ;

   if ((*str = (string) mem_realloc((caddr_t) *str, (long) size))
== NULL)   {
       return( FALSE );
   }
```

H:\HOME\BCE\SYNOPSYS\SY723\ALLSRC0.5P1(5P1)

```
    return( TRUE );
}
```

```
/***************************************************************
****************
*
* FUNCTION: str_cat
*
* ABSTRACT: Concatenate one string onto another string.
*
* RETURNS:  void
*
* EXTERNAL EFFECTS:
*
* NOTES AND ASSUMPTIONS:
*
*           o If the destination string is too small to accept the
result of
*             the concatenation, then the previous piece of memory
is freed and
*               a piece of  memory is allocated large enough to
accommodate the
*              resulting string.
*
*            o Example call:
*
*              str_install( foo, "This is only " );
*              str_install( foobar, "a test." );
*
*              str_cat( foo, foobar );
*
*              This would yield:  "This is only a test." in foo.
*
*             o This routine assumes that the memory manager will
signify an
*              OUT_OF_MEMORY error.
*
*              o If NULL arguments are passed to this routine, an
error message
*              of severity ERROR is printed.
*
* HISTORY:
*                Sep 23 1993     Randy Karasek   Changed error_if
to
*                                                check "str1", not
"*str1"
 *  Jul 12 1988 Jerry Huth Changed the local variable
 *     'size' to a long so that the
 *     resultant string can be as long as long
*  Dec 11 1987 Russ Segal Changed string structure
*  Jan 14 1987 Timothy Moore Original.
*
****************************************************************
***************/

void str_cat(string *str1, string str2)
```

```
                    /* Destination string */
                    /*   string   to   be   concatentation   onto
destination string */

{

   long size;  /* Resultant size */
   long str1_size;

   error_if (str1 == NIL(string*) || str2 == NIL(string)) ;

  /* REALLOC/ALLOC the destination in case it is too small or NIL
*/

  if (*str1 == NIL(string)) {
    str1_size = 0;
    size = strlen(str2) + 1 /* for EOS */ ;
    *str1 = (string) mem_malloc(size);
    **str1 = EOS;
  } else {
    str1_size = strlen(*str1);
    size = str1_size + strlen(str2) + 1 /* for EOS */ ;
    *str1 = (string) mem_realloc((caddr_t) *str1, size);
  } /* realloc existing string */

   if (*str1 == NIL(string)) return;

  /* Concatenate the second string to the first */

   (void) strcpy((*str1) + str1_size, str2);

}
```

```
/****************************************************************
****************
*
* FUNCTION: str_upper
*
* ABSTRACT: Converts a string to all upper-case characters.
*
* RETURNS:  void.
*
* EXTERNAL EFFECTS:
*
* NOTES AND ASSUMPTIONS:
*
*              o The conversion is done in place so no memory
manipulations are
*           performed.
*
*         o Example call:
*
*           str_upper( foo );
*
*
* HISTORY:
*  Dec 11 1987 Russ Segal Changed string structure
*  Jan 14 1987 Timothy Moore Original.
*
****************************************************************
***************/

void str_upper(string str)

                  /* string to be converted */

{

   char *p;

   error_if ( str == NIL(string)) ;

   for ( p=(char *)str; *p != EOS; ++p )
      *p = STR_CHAR_TO_UPPER(*p);
}
```

```
/*****************************************************************
****************
*
* FUNCTION: str_lower
*
* ABSTRACT: Convert a string to all lower case characters
*
* RETURNS:  void
*
* EXTERNAL EFFECTS:
*
* NOTES AND ASSUMPTIONS:
*
*              o The conversion is done in place so no memory
manipulations are
*            performed.
*
*          o Example call:
*
*            str_lower( foo );
*
*
* HISTORY:
*  Dec 11 1987 Russ Segal Changed string structure
*  Jan 14 1987 Timothy Moore Original.
*
*****************************************************************
***************/

void str_lower(string str)

                  /* the string to be converted to lower case */

{
   char *p;

   error_if ( str == NIL(string)) ;

   for ( p=(char *)str; *p != EOS; ++p )
      *p = STR_CHAR_TO_LOWER(*p);
}

/*****************************************************************
****************

    FUNCTION: str_cmp_long      AUTHOR: Ron Miller - Feb 25, 1992

    ABSTRACT: This function is identical to str_cmp, except that
it returns
  a long. This is necessary when using str_cmp with set_sort,
because
  set_sort requires a function pointer that returns a long.

*****************************************************************
```

```
***************/

long str_cmp_long(string str1, string str2)
{
    return( (long) str_cmp( str1, str2 ) );
}

/*****************************************************************
****************

    FUNCTION: str_icmp_long      AUTHOR: Ching Lai - July 9, 1993

    ABSTRACT: This function is identical to str_icmp, except that
it returns
  a long. This is necessary when using str_icmp with set_sort,
because
  set_sort requires a function pointer that returns a long.

*****************************************************************
***************/

long str_icmp_long(string str1, string str2)
{
    return( (long) str_icmp( str1, str2 ) );
}
```

```
/*****************************************************************
****************

    FUNCTION: str_equal   AUTHOR: Jerry Huth - Apr  9 1992

    ABSTRACT: Return TRUE if the strings are equal, else return
FALSE.

    This routine is more efficient that calling str_cmp(), but it
doesn't
    return as much information.

    This routine treats NIL pointers like null strings.

*****************************************************************
***************/

boolean str_equal(string str1, string str2)
{
  str1 = (str1 == NIL( string)) ? "" : str1 ;
  str2 = (str2 == NIL( string)) ? "" : str2 ;

  for( ; *str1 != '\0' && *str2 != '\0'; str1++, str2++) {
    if( *str1 != *str2) {
      break ;
    }
  }
  return( *str1 == *str2) ;
}
```

```
/*****************************************************************
****************

    FUNCTION: str_iequal  AUTHOR: Jerry Huth - Jul  2 1992

    ABSTRACT: Just like str_equal(), but this ignores differences
between
    capital and small letters.

*****************************************************************
***************/

boolean str_iequal(string str1, string str2)
{
  str1 = (str1 == NIL( string)) ? "" : str1 ;
  str2 = (str2 == NIL( string)) ? "" : str2 ;

  for( ; *str1 != '\0' && *str2 != '\0'; str1++, str2++) {
    if( STR_CHAR_TO_LOWER( *str1) != STR_CHAR_TO_LOWER( *str2))
{
      break ;
    }
  }

  /* This is a little tricky.  If they're equal, then both will
be '\0'.
   * Otherwise they must be different characters.
   */
  return( *str1 == *str2) ;
}
```

```
/*******************************************************************
****************
*
* FUNCTION: str_cmp
*
* ABSTRACT: Compare two strings and returns a negative, zero, or
positive
*                 integer, indicating that the first string is
lexicographically
*                less than, equal to, or greater than the second
string.
*
* RETURNS:  A short integer indicating relationships between the
two
*           strings.
*
* EXTERNAL EFFECTS:
*
* NOTES AND ASSUMPTIONS:
*
*           o If a NULL pointer is passed, in a NULL string is
used for the
*             comparison.
*
* HISTORY:
*  Dec 11 1987 Russ Segal Changed string structure
*  Jan 14 1987 Timothy Moore Original.
*
*******************************************************************
***************/

short str_cmp(string str1, string str2)
{
   char *p1, *p2; /* temporary pointers */

   p1 = ( str1 == NULL ) ? "" : (char *) str1;
   p2 = ( str2 == NULL ) ? "" : (char *) str2;

   return( (short) strcmp( p1, p2 ) );
}
```

```
/*****************************************************************
***************
*
* FUNCTION: str_icmp
*
*  ABSTRACT:  Compares  two  strings  using  a  case  insensitive
comparison.
*                Unlike, 'str_cmp' simply returns zero if the two
strings
*                 are equal, else a nonzero integer is returned.
*
* RETURNS:  A short integer indicating relationships between the
two
*            strings.
*
* EXTERNAL EFFECTS:
*
* NOTES AND ASSUMPTIONS:
*
*            o If a NULL pointer is passed, in a NULL string is
used for the
*             comparison.
*
* HISTORY:
*  Dec 11 1987 Russ Segal Changed string structure
*  Jan 14 1987 Timothy Moore Original.
*
*****************************************************************
***************/

short str_icmp(string str1, string str2)

                /* the two strings to be compared */

{

   char *p1, *p2;

   p1 = ( str1 == NULL ) ? "" : (char *) str1;
   p2 = ( str2 == NULL ) ? "" : (char *) str2;

   for ( ; *p1 != EOS || *p2 != EOS; ++p1, ++p2 )
      if ( STR_CHAR_TO_LOWER(*p1) != STR_CHAR_TO_LOWER(*p2) )
 return( (short) 1 );

   if ( STR_CHAR_TO_LOWER(*p1 )!= STR_CHAR_TO_LOWER(*p2) )
     return( (short) 1 );
   return( (short) 0 );
}
```

H:\HOME\BCE\SYNOPSYS\SY723\ALLSRC0.5P1(5P1)

```
/*****************************************************************
****************
*
* FUNCTION: str_extract
*
* ABSTRACT: Extracts a substring out of an existing string as
definied by
*                    a starting and ending point in the string.
*
* RETURNS:  The extracted string if the extraction was successful,
else
*                   NULL.
*
* EXTERNAL EFFECTS:
*
* NOTES AND ASSUMPTIONS:
*
*            o The substring is extracted from the i'th character
up to and
*             including the j'th character where the i'th and j'th
character
*              are the starting and ending index, respectively,
which are passed
*             by paramter to the routine.
*
*            o Example:
*
*                    Assumed we has a string ABCDEF and wished to
extract out
*                   the 0'th thru the 2'nd character.  The function
call is
*
*                    new_string = str_extract( my_string, 0, 2 );
*
*                    and we return the string ABC.
*
*            o This routine assumes that the memory manager will
signify an
*            OUT_OF_MEMORY error.  However, if the memory manager
returns
*              a NULL pointer to this routine, this routine will
return NULL.
*
*          o If a NULL string is passed to this routine, an error
message
*             of severity ERROR is printed, and NULL is returned.
*
*           o If the starting index is less than zero, then zero
is assumed.
*
*           o If the ending index is larger than the size of the
string, then
*             the new string will be extracted up the end of the
string.
```

```
*
*           o If the end index is less than zero or start index
is larger than
*             the end index, then NULL is returned.
*
* HISTORY:
*  Dec 11 1987 Russ Segal Changed string structure
*  Jan 14 1987 Timothy Moore Original.
*
****************************************************************
***************/

string str_extract(string str, int start_index, int end_index)

                /* the string from the substring is extracted */
                      /* starting index for substring extraction
*/
                    /* ending index for substring extraction */

{

   char  *p;     /* temprary pointer */

   int i;      /* loop index */
   int size;   /* size of character string that will be extracted
*/
   int place; /* index into new string */
   int length; /* length of string */
   boolean index_error; /* flag indicating if the is an error in
the indexes */

   string new_string; /* the new string */

   /* Check for NULL pointer for the string structure */

   error_if ( str == NIL(string)) ;

   length = strlen((char *)str);

   index_error= FALSE;

   /* Check for indexes out of bounds of the size of the string
         */

   if ( start_index < 0 )          start_index = 0;
   if ( end_index > length - 1)    end_index = length - 1;
   if ( end_index < start_index )  index_error = TRUE;
   if ( end_index < 0 )            index_error = TRUE;


   if ( index_error == TRUE ) return( NULL );

   size = ( end_index - start_index + 1 ) + 1 /* for EOS */ ;

   new_string = (string) mem_malloc((long)size * sizeof(char));
```

```
    if ( new_string == NULL ) return( NULL );

    p = (char *) str;
    for ( i=start_index,place=0; i <= end_index && p[i] != EOS; ++i
)
        new_string[place++] = p[i];
    new_string[place] = EOS;

    return( new_string);
}
```

H:\HOME\BCE\SYNOPSYS\SY723\ALLSRC0.5P1(5P1)

```
/*****************************************************************
**********
*
* FUNCTION: str_dup
*
* ABSTRACT: Duplicates an existing string
*
* RETURNS:  The duplicated string if successful, else NULL.
*
* EXTERNAL EFFECTS:
*
* NOTES AND ASSUMPTIONS:
*
*          o This routine assumes that the memory manager will
signify an
*           OUT_OF_MEMORY error.  However, if the memory manager
returns
*             a NULL pointer to this routine, this routine will
return NULL.
*
*         o If Nil is passed in, then Nil is returned.
*
* HISTORY:
*  Feb 20 1990 Rob Verbrugghe Nil in gets Nil out.
*  Dec 11 1987 Russ Segal Changed string structure
*  Jan 14 1987 Timothy Moore Original.
*
*****************************************************************
*********/

string str_dup(string str)

               /* the string to duplicate */

{

   string dup;  /* the new string */

   if (str == NIL(string))
     return NIL(string);

   dup   =   (string)  mem_malloc((long)  (strlen(str)   +  1)   *
sizeof(char));
   if (dup == NULL) return NULL;

   (void) strcpy((char *) dup, (char *) str );
   return( dup );
}
```

```
/***************************************************************
**********

  FUNCTION: str_dup_mem()                    AUTHOR: Randy Karasek

  ABSTRACT: Routine to duplicate an existing string, with the new
string
     being allocated from the specified memory group.

  RETURNS : ptr to the allocated/duplicated string if successful,
     otherwise NIL

  MODIFIED: 07/30/93   Randy Karasek - initial creation.

  CAUTIONS: Similar to str_dup() above:

           o This routine assumes that the memory manager will
signify
      an OUT_OF_MEMORY error. However, if the memory manager
      returns a NULL pointer to this routine, this routine will
      return NULL.

           o If Nil is passed in, then Nil is returned.

***************************************************************
*********/

string
str_dup_mem(string str, mem_group group)
{

  long   size = 0;
  string dup  = NIL(string);

  if ( str != NIL(string) ) {
    size = (strlen(str) + 1) * sizeof(char);
    dup  = (string)mem_malloc_from_group(size, group);

    if ( dup != NIL(string) ) {
      (void)strcpy((char *)dup, (char *)str);
    } /* if able to allocate memory */
  } /* if user input string */

  return( dup );

} /* str_dup_mem */
```

```
/****************************************************************
****************
 *
 * FUNCTION: str_add_char
 *
 * ABSTRACT: adds a character to a string in the given position,
and
 *        then terminates the string in the next position.  Will
realloc the
 *       string if needed.
 *
 * RETURNS: void
 *
 * EXTERNAL EFFECTS: may change the size of the string
 *
 * NOTES AND ASSUMPTIONS:
 *
 * HISTORY:
*  Dec 11 1987 Russ Segal Changed string structure
 *  Sep  9 1987 Van Morgan Original.
 *

****************************************************************
**************/

void str_add_char(string *st, char ch, int pos)
                   /* the string to add a character to */
              /* the character to add */
                /* the position to add the character */
{

   if (*st == NULL) {
      /* alloc new string */
      *st = (string) mem_malloc((long) (pos+1) * sizeof(char));
   } else {
       /* reallocate string in case it's too small */
       *st = (string) mem_realloc((caddr_t) *st,
  (long) pos+2 * sizeof(char));
   }
   if (*st == NULL) return;
   (*st)[pos] = ch; /* add the character */
   (*st)[pos+1] = EOS; /* terminate the string */
}

/****************************************************************
****************
 *
 * FUNCTION: str_cmp_integer
 *
 * ABSTRACT: Does a strcmp that is normal except that "x9" comes
 * before "x10".  That is, embedded integers are treated as
tokens.
 *
 * RETURNS:
```

```
 *
 * EXTERNAL EFFECTS:
 *
 * NOTES AND ASSUMPTIONS:
 *
 * HISTORY:
 *  May  8 1988 Brent Gregory Original.
 *
*****************************************************************
**************/

long str_cmp_integer(string name_1, string name_2)
{
  boolean integer_1, integer_2, end_1, end_2;
  long token_1, token_2;
  long length_1, length_2;
  long tie_breaker = 0;

  error_if( name_1 == NIL( string) || name_2 == NIL( string)) ;

  while (TRUE) {
    token_1 = str_get_token(&name_1, &integer_1, &length_1);
    token_2 = str_get_token(&name_2, &integer_2, &length_2);

    end_1 = token_1 < 0;
    end_2 = token_2 < 0;

    if (end_1 && end_2) {
      return (tie_breaker);
    }

    if (end_1) {
      return (-1);
    }

    if (end_2) {
      return (1);
    }

    if (integer_1 & !integer_2) {
      return (-1);
    }

    if (!integer_1 & integer_2) {
      return (1);
    }

    if (token_1 != token_2) {
      return (token_1 - token_2);
    }
    tie_breaker = (length_1 - length_2);
    if (tie_breaker != 0) {
      return (tie_breaker);
    }
```

```
}


/*****************************************************************************
 *
 * FUNCTION: str_get_token
 *
 * ABSTRACT: Given a pointer to a string, will return the first
 * token.  That is: the integer value of the first character if
 * it is not a digit.  the integer value of the embedded textual
 * integer from the start of the string until the first
 * non-digit.  Or, a -1 if the string is nil.
 *
 * The string is modified to point to the first character after
 * the token.  A boolean is returned which indicates whether an
 * integer was found.
 *
 * RETURNS:
 *
 * EXTERNAL EFFECTS:
 *
 * NOTES AND ASSUMPTIONS:
 *
 * HISTORY:
 *  Feb 17 1988 Brent Gregory Original.
 *
    MODIFIED: Aug 30 1988 - Jerry Huth : Added this routine to the
str module
    MODIFIED: Apr 27 1990 - John Dickhoff : Added length output
argument

*****************************************************************
**************/

/* test if the character is a digit */

#define str_is_a_digit( character) (('0' <= (character)) &&
(character <= '9'))

static long str_get_token(string *p_text, boolean *p_integer, long
int *p_length)
{
  long token;

  *p_length = 0;
  if (**p_text == '\0') {
    return (-1);
  }

  if (!str_is_a_digit(**p_text)) {
    token = (long) **p_text;
```

```
      (*p_text)++;
      (*p_length)++;
      *p_integer = FALSE;
      return (token);
    }

    *p_integer = TRUE;

    token = 0;

    while (str_is_a_digit(**p_text)) {
      token = 10 * token + (((long) **p_text) - '0');
      (*p_text)++;
      (*p_length)++;
    }

    return (token);
}
```

```
/*****************************************************************
****************

    FUNCTION: str_substring_position

    ABSTRACT: Search for a substring in a given string.
 Returns the position of the first occurence of the substring
 in the target string or -1 if the substring is not found.
    Both string must not be nil.

    AUTHOR: Mar 15 1986  Jim Reed

*****************************************************************
***************/

int str_substring_position(string the_string, string sub_string)
                                /* the string to be searched */
                                /* the key string */
{
  int i, j;                       /* loop counters */
  int sublen = strlen( sub_string);         /* length of the
substring */
  int limit = strlen( the_string) - sublen;
                                  /* latest point in string at
which
                                       substring can start */
  boolean equal;                  /* flag, TRUE while we may be
in substring */


  for (i = 0; i <= limit; i++) {
    equal = TRUE;
    for (j = 0; (j < sublen) && (equal == TRUE); j++) {
      if (the_string[i+j] != sub_string[j]) {
        equal = FALSE;
      }
    }
    if (equal == TRUE) {
      return( i);
    }
  }

  /* could not find the substring */
  return( -1);

}  /* str_substring_position */
```

```
*******************************************************************
****************

    FUNCTION: str_substring_next_position

    ABSTRACT: Search for next occurence of a substring in a given
string.
    Pass in -1 to start with, and keep on calling until you get -
1 to
    get all occurences of the given substring.
    Both string must not be nil.

    AUTHOR: Jun 26 1992  Sandeep Srivastava

*******************************************************************
***************/

int   str_substring_next_position(string   the_string,   string
sub_string, int cur_pos)
                                /* the string to be searched */
                                /* the key string */

{
  int i, j;                       /* loop counters */
  int sublen  = strlen( sub_string);          /* length of the
substring */
  int limit = strlen( the_string) - sublen;
                                  /* latest point in string at
which
                                       substring can start */
  boolean equal;                   /* flag, TRUE while we may be
in substring */

  /* so the caller doesn't hurt himself by passing in less than -
1 */
  cur_pos = max(cur_pos, -1) ;

  for (i = cur_pos + 1 ; i <= limit; i++) {
    equal = TRUE;
    for (j = 0; (j < sublen) && (equal == TRUE); j++) {
      if (the_string[i+j] != sub_string[j]) {
        equal = FALSE;
      }
    }
    if (equal == TRUE) {
      return( i);
    }
  }

  /* could not find the substring */
  return( -1);

}  /* str_substring_next_position */
```

H:\HOME\BCE\SYNOPSYS\SY723\ALLSRC0.5P1(5P1)

```
/*****************************************************************
****************

    FUNCTION: str_substring_last_position

    ABSTRACT: Search for the last occurence of a substring in a
given string.
 Returns the position of the last occurence of the substring
 in the target string or -1 if the substring is not found.
    Both string must not be nil.

    AUTHOR: June 25 1991 - Adel Khouja : Original
                                               (derived   from
str_substring_position)

*****************************************************************
***************/

int   str_substring_last_position(string   the_string,   string
sub_string)
                               /* the string to be searched */
                               /* the key string */
{
  int i, j;                      /* loop counters */
  int sublen = strlen( sub_string);          /* length of the
substring */
  int limit = strlen( the_string) - sublen;
                                 /* latest point in string at
which
                                      substring can start */
  boolean equal;                  /* flag, TRUE while we may be
in substring */

  for (i = limit; i >= 0; i--) {
    equal = TRUE;
    for (j = 0; (j < sublen) && (equal == TRUE); j++) {
      if (the_string[i+j] != sub_string[j]) {
        equal = FALSE;
      }
    }
    if (equal == TRUE) {
      return( i);
    }
  }

  /* could not find the substring */
  return( -1);

}  /* str_substring_last_position */
```

H:\HOME\BCE\SYNOPSYS\SY723\ALLSRC0.5P1(5P1)

```
/*****************************************************************
****************

    FUNCTION: str_substring_next_last_position

    ABSTRACT: Search for next occurence of a substring in a given
string,
    starting from the last occurence and going backwards.
    Pass in -1 to start with, and keep on calling until you get -
1 to
    get all occurences of the given substring.
    None of the strings should be NIL.

    AUTHOR: Sep 02 1992  Sandeep Srivastava

*****************************************************************
***************/

int  str_substring_next_last_position(string the_string,  string
sub_string, int cur_pos)
                                  /* the string to be searched */
                                  /* the key string */

{
  int i, j;                         /* loop counters */
  int sublen  = strlen( sub_string);         /* length of the
substring */
  int limit = strlen( the_string) - sublen;
                                    /* latest point in string at
which
                                         substring can start */
  boolean equal;                     /* flag, TRUE while we may be
in substring */

  if (cur_pos < 0) {
    cur_pos = limit + 1 ;
  }

  for (i = cur_pos - 1 ; i >= 0; i--) {
    equal = TRUE;
    for (j = 0; (j < sublen) && (equal == TRUE); j++) {
      if (the_string[i+j] != sub_string[j]) {
        equal = FALSE;
      }
    }
    if (equal == TRUE) {
      return( i);
    }
  }

  /* could not find the substring */
  return( -1);

}  /* str_substring_next_last_position */
```

H:\HOME\BCE\SYNOPSYS\SY723\ALLSRC0.5P1(5P1)

```
/*****************************************************************
****************

    FUNCTION: str_convert_type  AUTHOR: Jerry Huth - May  2 1990

    ABSTRACT: Convert the given type to a string.

    The returned string MUST NOT be freed!!  It is static to this
routine.
    Make a copy of it if you need to muck with it!!

    MODIFIED: Mar 26 1992 - Adel Khouja : Fixed up casting of
p_data to
    a string before testing if it is NIL.

*****************************************************************
***************/

string str_convert_type(str_data_type type, caddr_t p_data)

                      /* this is a POINTER to the data - NOT the
     * data itself */
{
  static string result = NIL( string) ;

  error_if( p_data == NIL( caddr_t)) ;
  error_if( type == str_unknown_type) ;

  if( result == NIL( string)) {
    mem_push_group( mem_default_group) ; {
      result = str_alloc( 50, NIL( char *)) ;
    } mem_pop_group() ;
  }

  /* check if anyone freed the string */
  error_if(  mem_group_of_pointer(  (caddr_t)  result)  ==  NIL(
mem_group)) ;

  switch( type) {
  case str_char_type:
    result[ 0] = *(char *)(p_data) ;
    result[ 1] = '\0' ;
    break ;
  case str_boolean_type:
    if( *(boolean *)(p_data)) {
      str_copy( &result, "true") ;
    }
    else {
      str_copy( &result, "false") ;
    }
    break ;
  case str_short_type:
    str_sprintf( &result, "%d", (int) *(short *)(p_data)) ;
    break ;
```

```
case str_integer_type:
  str_sprintf( &result, "%d", *(int *)(p_data)) ;
  break ;
case str_long_type:
  str_sprintf( &result, "%d", (int) *(long *)(p_data)) ;
  break ;
case str_float_type:
  str_sprintf( &result, "%f", *(float *)(p_data)) ;
  break ;
case str_double_type:
  str_sprintf( &result, "%f", *(double *)(p_data)) ;
  break ;
case str_string_type:
  if( *(string *)(p_data) != 0) {
    str_sprintf( &result, "%s", *(string *)(p_data)) ;
  }
  else {
    result[0] = '\0' ;
  }
  break ;
case str_pointer_type:
  str_sprintf( &result, "0x%lx", *(long *)(p_data)) ;
  break ;
case str_byte_type:
  str_sprintf( &result, "%d", (int) *(char *)(p_data)) ;
  break ;
default:
  error_if( TRUE) ;
  break ;
}

return( result) ;
}
```

```
/*****************************************************************
****************

    FUNCTION: str_find_nth_char

    AUTHOR: Frederic Mailhot - Mar 19 1992

    ABSTRACT: Return the offset of the nth occurence of a
character in a string.

*****************************************************************
***************/
int
str_find_nth_char(string  the_string,  char  the_char,  int
the_number)
{
  int i;
  int limit = strlen(the_string);

  if (the_number < 0)
    return -1;

  for(i = 0; (i < limit) &&  the_number; i++) {
    if (the_string[i] == the_char) {
      the_number--;
    }
  }

  i--;

  if (the_number) {
    i = -1;
  }

  return i;
}
```

```
/*****************************************************************
****************

    FUNCTION: str_replace_char  AUTHOR: Pankaj Mayor - Mar  2 1992

    ABSTRACT: Replaces the specified character, if it is present
in the
    string, with the given charcter.

*****************************************************************
***************/

void
str_replace_char(string   str,   char   char_to_replace,   char
replace_with_char)
{
  long  length;
  long  i;

  if (str == NIL(string))   return;

  length = strlen(str);

  for (i = 0; i < length; i++)
  {
    if (str[i] == char_to_replace)
    {
      str[i] = replace_with_char;
    }
  }
}
```

```
/*****************************************************************
****************

    FUNCTION: str_list_to_set  AUTHOR: Dennis Fogg - Apr 14 1992

    ABSTRACT: insert the elements of a list into a set.
    List is a string with elements separated by Separaters.
    Set is the set to insert the elements in.
    Each element in the list is copied and added to the end
    of the set.
    The set can have data in it already.
    Separaters is a string of character separators.
    eg: if the separators are spaces and tabs, then separaters =
" \t"
    The memory for the element copies comes from the set's memory
group.

    REMEMBER: str_free each string inside the set, as well as
    set_delete the set itself.

*****************************************************************
***************/
void
str_list_to_set(string list, set str_set, string separaters)
{
   string chop_up, next_str;

   if (list == NIL(string)) return;
   if (str_set == NIL(set)) return;

   mem_push_group(mem_group_of_pointer( (caddr_t) str_set)); {
      chop_up = str_dup(list);
      next_str = strtok(chop_up, separaters);
      if (next_str != NIL(char *)) {
  (void) set_add_to_end( str_set, (caddr_t) str_dup(next_str));
      }

      while ((next_str = strtok(NIL(char *), separaters)) !=
NIL(char *)) {
  (void) set_add_to_end( str_set, (caddr_t) str_dup(next_str));
      }
      str_free(chop_up);
   } mem_pop_group();
}
```

```
/*****************************************************************
****************

    FUNCTION: is_all_white_space AUTHOR: Jerry Huth - Oct 23 1990

    ABSTRACT:

*****************************************************************
****************/

static boolean is_all_white_space(string str)
{
  boolean found ;
  int i ;

  error_if( str == NIL( string)) ;

  found = FALSE ;
  for( i = 0; str[ i] != '\0'; i++) {
    if( !isspace( str[ i])) {
      found = TRUE ;
      break ;
    }
  }
  return( !found) ;
}
```

```
/*****************************************************************
****************

    FUNCTION: str_is_blank  AUTHOR: Jerry Huth - Jun 29 1992

    ABSTRACT: See if the given string is blank (all whitespace).

*****************************************************************
***************/

boolean str_is_blank(string str)
{
  return( !str || *str == '\0' || is_all_white_space( str)) ;
}
```

```
/*****************************************************************
****************

    FUNCTION: str_string_to_set  AUTHOR: Ron Miller - Jul 14, 1992

    ABSTRACT: Converts a string into a set. The delimeters string
that
 is passed in is used to determine what characters are used to
 distinguish word boundaries.

 e.g.

 str_string_to_set( "A, B, C", " " )  would return { "A," "B," "C"
}
 str_string_to_set( "A, B, C", "," )  would return { "A" " B" "
C" }
 str_string_to_set( "A, B, C", ", " ) would return { "A" "B" "C"
}

    WARNING: The returned set and the strings in it are allocated
from
    the current mem_group.  You can free the whole enchilada with
    str_free_string_set().

*****************************************************************
***************/

set str_string_to_set(string str, string delimeters)
{
    string start, loop_str;
    set strings;
    long size;

    /* Allocate a set */
    strings = set_create();

    /* NIL input case */
    if (str == NIL(string)) return(strings);

    /* Loop until the end of the string is reached */
    while ( *str != '\0' ) {

 /* Strip off leading delimter characters */
 while ( *str != '\0' && (string)rindex( delimeters, *str ) !=
NIL( string ) ) {
     str++;
 }

 /* If the end of string was reached, I am done */
 if ( *str == '\0' ) break;

 /* Loop until a delimter character is found */
 start = str;
 while ( *str != '\0' && (string)rindex( delimeters, *str ) ==
```

```
NIL( string ) ) {
     str++;
 }

 /* Add the string to the set */
 size = (str - start);
 loop_str = str_alloc( (size + 1), "" );
 (void) strncpy( loop_str, start, (int) size );
 loop_str[size] = '\0';
 (void) set_add_to_end( strings, loop_str );

    }

    /* Return the set */
    return( strings );
}

/**************************************************************
****************

    FUNCTION: str_set_to_string  AUTHOR: Ron Miller - Jul 14, 1992

    ABSTRACT: This function takes in a set of strings, and
converts the set
 into a string. The delimeter string passed in is used to separate
 the elements of the set in the string.

 WARNING: The returned string is allocated from the current
mem_group,
 so you must make sure it gets freed.

**************************************************************
***************/

string str_set_to_string(set strings, string delimeter)
{
    string str = NIL( string ), loop_str;
    boolean first;
    long count = 0, delimeter_size;

    /* Figure out how big the string should be first to avoid re-
allocing
     * memory all of the time */
    first = TRUE;
    delimeter_size = strlen( delimeter );
    set_for_all_members( strings, loop_str ) {
 /* If this is not the first, then I need to count the delimeter
*/
 if ( first ) {
     first = FALSE;
     count += strlen( loop_str );
 } else {
     count += strlen( loop_str );
     count += delimeter_size;
 }
```

```
    } set_end_for;

    /* Add one for the null character */
    count++;

    /* Allocate a string to the full size */
    str = str_alloc( count, "" );

    /* Loop through the elements of the strings array */
    first = TRUE;
    set_for_all_members( strings, loop_str ) {

 /* If this is not the first element, add the delimter */
 if ( !first ) {
     (void) strcat( str, delimeter );
 }
 first = FALSE;

 /* Add this element */
 (void) strcat( str, loop_str );

    } set_end_for;

    /* Return the new string */
    return( str );
}

/****************************************************************
****************

    FUNCTION: str_remove_chars_from_string
    AUTHOR: Dennis Fogg - Oct 29 1992

    ABSTRACT: Remove instances of certain characters from a string
and
    return the resulting string.
    original_cast is the string to have the chars removed from and
    black_list is the string that contains the characters.
    For example, str_remove_chars_from_string( "  N = 8 ", " \t")
= "N=8".
    Memory comes from the current mem_group.
    Caller needs to free return string.

****************************************************************
***************/
string
str_remove_chars_from_string(string   original_cast,   string
black_list)
                        /* black-listed "characters" */
{
    char *p_oc;
    string downsized_str;
    char *p_d;
```

```
    if (original_cast == NIL(string)) {
 return(NIL(string));
    }

    p_oc = original_cast;
    downsized_str = str_dup(original_cast);
    p_d = downsized_str;

    if (black_list == NIL(string)) {
 return(downsized_str);
    }

    /* for each char in original string, check if it's in the
black list */
    while (*p_oc != NULL) {

 if (index(black_list, *p_oc) == NULL) {
     *p_d = *p_oc;
     p_d++;
 }
 p_oc++;
    }
    *p_d = NULL;
    return(downsized_str);
}
```

```
/*****************************************************************
****************

  FUNCTION: str_cat_and_wrap
  AUTHOR: Bill Mullen - Dec 15 1992

  ABSTRACT: Given an existing string output_str, and a string to
add, str,
  cat str to the end of output_str.  If str is greater than
max_line (for
  example 80), we try to break the string and place a '\'
character to
  show line continuation.

  This function is derived from a function in ui_script.c.

*****************************************************************
***************/
void
str_cat_and_wrap(string *output_str, string str, int max_line)
{
  int  i, j, cur_length;
  char  c;
  string cur_str;

  if (STR_LENGTH(str) > max_line) {
    i = 0;
    cur_length = 0;
    for (c = str[i]; c != '\0'; c = str[++i]) {
      cur_length++;
      if (cur_length >= max_line - 1) {
 /* Find a space to break the string */
 for (j = i; j > 0; j--) {
   if (str[j] == ' ') {
     break;
   }
 }
 if (j != 0) {
   /* Extract the portion of the string for this line and write
it.*/
   cur_str = str_extract(str, 0, j);
   str_cat(&cur_str, "\\\n");
   str_cat(output_str, cur_str);
   str_free(cur_str);

   /* Reset the original string back to the first non-blank */
   /* character yet to be written. */
   str = &(str[j+1]);
   cur_length = 0;
   i = 0;
 }
      }
    }
```

```
    /* Write the remainder of the string. */
    if (STR_LENGTH(str) > 0) {
      str_cat(output_str, str);
    }
  } else {
    str_cat(output_str, str);
  }
}

/*************************************************************
****************

    FUNCTION:  str_char_is_a_separator    AUTHOR:  Ching  Lai  -
02/08/93

    ABSTRACT: Local routine, used by str_tok to determine whether
a
 character is part of separator.

*************************************************************
***************/
static  boolean
str_ch_is_a_separator(char ch, string separator)
{
    while (*separator) {
       if (ch != *separator) separator++;
       else return (TRUE);
    }
    return(FALSE);
}

/*************************************************************
****************

    FUNCTION: str_tok  AUTHOR: Ching Lai - 02/08/93


    NOTE:    borrow    the    code    of    cdshr_my_strtok    from
ht/cdcshr/cdshr_util.c

    ABSTRACT: Do standard strtok function, except return handle
which
 should be used in next call.  Standard calling sequence is:
 Return NIL when there is no more to parse.

  string handle = string_to_parse;
  i = 0;
  while (1) {
      temp = str_tok(&handle, " \t\n");
      if (temp == NIL(string)) break;
      tok[i++] = temp;
  }

*************************************************************
***************/
```

```
string
str_tok(string *handle, string separator)
{
    string retval;

    error_if (*handle == NIL(string));

    /* find start of token */
    retval = *handle;
    while (str_ch_is_a_separator(*retval,separator)) retval++;
    *handle = retval;
    if (*retval == '\0') {
 return NIL(string);
    }

    /* find end of token */
    while     ((!str_ch_is_a_separator(**handle,separator))      &&
(**handle != '\0')) (*handle)++;

    /* token ends at string end -- we're all set */
    if (**handle == '\0') return retval;

    /* terminate token and advance handle for next time */
    **handle = '\0';
    (*handle)++;
    return retval;
}
```

```
/*****************************************************************
****************

  FUNCTION: str_format_float
  AUTHOR: Bill Mullen - Apr 18 1994

  ABSTRACT: Given a float value, format value_str as "%.*f", based
  on the significant_digits argument.  The string must be
  already allocated.

*****************************************************************
***************/
void
str_format_float(float   value,   int   significant_digits,   int
min_width,
   string *value_str)
{
  str_sprintf(value_str, "%*.*f", min_width, significant_digits,
value);
}
```

```
/*****************************************************************
****************

  FUNCTION: str_choose_plural
  AUTHOR: Bill Mullen - Apr 26 1994

  ABSTRACT: If number_of_items > 1, return the plural_string, else
return
  the singular string.  No copying is done.

*****************************************************************
***************/
string
str_choose_plural(long  count,  string  singular_string,  string
plural_string)
{
  return((count > 1) ? plural_string : singular_string);
}
```

```
/*****************************************************************
****************

  FUNCTION: str_get_plural_suffix
  AUTHOR: Bill Mullen - Apr 25 1994

  ABSTRACT: Given a count, return "s" if > 1, otherwise "".  Don't
free
  the return value.

  example:
   printf("%ld   cell%s   in   design.\n",   count,
str_get_plural_suffix(count));

  output:

  1 cell in design.
  5 cells in design.

*****************************************************************
***************/
string
str_get_plural_suffix(long count)
{
  return(str_choose_plural(count, "", "s"));
}



/*   static   char   rcsid[]   =   "$Header:
/remote/src/sys/garp/dev/generic/str/RCS/str.h,v 8.9 1994/04/26
16:28:40 billm Exp $"; */

/*****************************************************************
****************
*****************************************************************
****************
**
** FILE NAME: str.h
**
**      MODULE:    generic
**
** ABSTRACT: The purpose of the string module is to provide
**       developers with a common representation of a character
**       strings and routines which
**      manipulate this representation.  The representation of the
character
**         string and the associated routines were designed to
overcome a number
```

```
**      of problems that usually accompany the use of string in
C.  Normally
**      developers used either fixed size arrays or variable
length dynamically
**      allocated arrays.  The fixed size arrays have the
disadvantage
**      that they tend to be large in order to
**      accommodate the largest possible string
**      that will likely be encountered which is wasteful of
**      memory if the average string size is much less
**      and if a string is encountered that is longer
**      than the maximum length then a problem occurs.
Dynamically allocated
**      arrays are more versatile since they can accommodate
**      any size string and require less memory but
**      are a little harder to use.  The developer must always
check for an
**      out-of-memory error when allocating a new string and also
copying one
**      string to another can be potentially dangerous since the
destination
**      string may not be long enough to accommodate the target
string.  Thus
**      the developer must constantly check the size of the
destination string
**      and allocate additional memory in order to hold the target
string.
**
**      As a result, a data representation and common routines
**      have been developed which incorporates
**      the advantages of both methods presented and hopefully
**      eliminates all the disadvantages.  These commons routines
have several
**      additional benefits.  The routines isolate "standard"
**      C functions dealing with character
**      strings that potentially may not be available on all
**      machines.  Thus, when a port to one of these machines is
done, only the
**      string module will need to be changed, and not the
developers code that
**      uses the string module.  Additionally the string module
should provide
**      routines which are more robust than the "standard" C
string functions
**      since numerous error checks are performed on the strings
**      and all interactions
**      to strings must be made through the string module.
**
**      CONVENTIONS:
**
**      AUTHOR: Timothy Moore and Jerry Huth
**
** COPYRIGHT (C) 1987, OPTIMAL SOLUTIONS INC., ALL RIGHTS
RESERVED.
**
```

```
*****************************************************************
****************
*****************************************************************
***************/

#ifndef STR_H
#define STR_H

#include "set_defs.h"
#include "mem.h"

/* this enum is used to communicate type info */
typedef enum {
  str_unknown_type = 0,
  str_char_type,
  str_boolean_type,
  str_short_type,
  str_integer_type,
  str_long_type,
  str_float_type,
  str_double_type,
  str_string_type,
  str_pointer_type,
  str_byte_type
} str_data_type ;

#define EOS  '\0'      /* The end of string character */

/****************************************************************
****************
*
* MACRO:    str_iequal         AUTHOR: Ron Miller - March 2 1990
*
* ABSTRACT:  Returns true (1) if the two strings passed to it are
equal,
*       ignoring the case of letters.
*
*       PARAMETES: str1 - (string)
*                  str2 - (string)
*
    MODIFIED: Jul  2 1992 - Jerry Huth : Changed this macro to a
function
    for greater efficiency.

*****************************************************************
***************/


/****************************************************************
****************
*
* MACRO:    STR_CHAR_OF
*
* ABSTRACT:  Get the i'th character out of a string; returns EOS
```

```
if 'i'
*               is longer than string or if the string is NULL.
*
*       PARAMETES: str - (string)
*                  i   - (long) specifies the i'th character
*
*****************************************************************
***************/
#if defined(__STDC__)
#define STR_CHAR_OF(str,i) \
          (((str)==NULL) ? EOS : ((long)i > (long)strlen((const
char *)(str))) ? EOS : \
                      (((char *) (str))[i]))
#else
#define STR_CHAR_OF(str,i) \
          (((str)==NULL) ? EOS : (i > strlen((char *)(str)))
? EOS : \
                      (((char *) (str))[i]))
#endif

/*****************************************************************
****************
*
* MACRO:      STR
*
*  ABSTRACT:   Macro to extract the actual string out the
representation
*                  scheme.  This macro-is intended for use with
printing a
*                 string:
*
*                 printf("The string: %s\n", STR(my_string) );
*
*       PARAMETES: the_string - (string)
*
*****************************************************************
***************/

#define STR(the_string) \
  ((char *)(the_string))


/*****************************************************************
****************
*
* MACRO:      STR_LENGTH
*
* ABSTRACT:  Returns the length of the string
*
*       PARAMETES: the_string - (string)
*
*****************************************************************
***************/
#ifdef __STDC__
#define STR_LENGTH(str) \
```

```
    (((str) == NULL) ? 0 :  long)strlen((const char *)(str)))
#else
#define STR_LENGTH(str) \
    (((str) == NULL) ? 0 : strlen((char *)(str)))
#endif

#define STR_a_MINUS_A   (32) /* 'a' - 'A' = 32 */

/***************************************************************
****************
*
* MACRO:      STR_CHAR_TO_LOWER
*
* ABSTRACT:   Converts a single character to lower case.
*
*       PARAMETES: c - (char)
*
****************************************************************
***************/

#define STR_CHAR_TO_LOWER(c)  ((c >= 'A'  &&  c <= 'Z')  ?  (c +
STR_a_MINUS_A)  :  c)


/***************************************************************
****************
*
* MACRO:      STR_CHAR_TO_UPPER
*
* ABSTRACT:   Converts a single character to upper case.
*
*       PARAMETES: c - (char)
*
****************************************************************
***************/

#define STR_CHAR_TO_UPPER(c)  ((c >= 'a'  &&  c <= 'z')  ?  (c -
STR_a_MINUS_A)  :  c)
```

```
/*****************************************************************
****************

    MACRO: STR_ALLOC_DEFAULT  AUTHOR: Jerry Huth - Apr 26 1992

    ABSTRACT: Allocate memory to initialize the given string
variable if its
    current value is NIL.  The memory will come from the
mem_default_group
    and the initial size is 10.  You can use the macro
STR_ALLOC_INIT()
    if you want to change the mem_group of initial size.

    As an example, if you have a local variable that is a static
string,
    you would declare it with an initial value of NIL, and use
this
    macro to allocate memory the first time the function is
called, as
    in the following example:

.nf
.in 2i
    void your_function()
    {
      static string your_local_string = NIL( string) ;

      STR_ALLOC_DEFAULT( your_local_string) ;

                          .
                          .
                          .
                          .
                          .

    }
.in
.fi

    WARNING: If you try to use this construct but you forget to
make the
    variable a static variable, then you will be leaking memory
badly.
    Although I could imagine a purpose for this routine with non-
static
    variables, you should be extremely careful if you try it.

    The interface to this macro is:

.nf
.in 2i

    STR_ALLOC_DEFAULT( a_string_variable)
```

```
    string a_string_variable ;   * if value is NIL, it will be
assigned
     * an allocated string, otherwise this
     * macro does nothing.  Be very careful
     * not to leak memory, especially
     * if this is not a static variable

.in
.fi

*****************************************************************
****************/

#define STR_ALLOC_DEFAULT( your_str) \
  STR_ALLOC_INIT( your_str, mem_default_group, 10)
```

```
/*****************************************************************
****************

    MACRO: STR_ALLOC_INIT  AUTHOR: Jerry Huth - Apr 26 1992

    ABSTRACT: Allocate memory to initialize the given string
variable if its
    current value is NIL.

    See also STR_ALLOC_DEFAULT() for a simplified interface that
uses
    the mem_default_group.

    The interface to this macro is:

.nf
.in 2i

    STR_ALLOC_INIT(    a_string_variable,    a_mem_group,
an_initial_size)
    string a_string_variable ;   * If value is NIL, it will be
assigned
     * an allocated string, otherwise this
     * macro does nothing.
     * Be very careful not to not to leak memory,
     * especially if this is not a static
     * variable. *
    mem_group a_mem_group ;   * mem_group to allocate the string
from. *
    int an_initial_size ;  * Size of the string to allocate.
     * This actually accepts any type, so don't
     * worry about typecasting arguments.

..in
.fi

*****************************************************************
***************/

#define    STR_ALLOC_INIT(    a_string_variable,    a_mem_group,
an_initial_size) \
\
  if( a_string_variable == NIL( string)) { \
    mem_push_group( a_mem_group) ; { \
      a_string_variable = str_alloc( (int) (an_initial_size), NIL(
char *)) ; \
    } mem_pop_group() ; \
  }
```

```
/*****************************************************************
****************

    MACRO: str_free_string_set  AUTHOR: Jerry Huth - Aug  8 1992

    ABSTRACT:  Free  the  set  and  strings  returned  by
str_string_to_set().

*****************************************************************
****************/

#define   str_free_string_set(   the_set)      (set_delete_data(
(the_set), (set_data_delete_fnc) str_free))
```

```
/*****************************************************************
****************

    MACRO: str_free_if_nonnil  AUTHOR: Jerry Huth - Nov 13 1992

    ABSTRACT: Free the given string if it is not NIL.  TRUE is
returned
    if the string is not NIL, else FALSE is returned.

*****************************************************************
***************/

/* Check if the string is NIL before freeing it.  Nothing
interesting */
#define str_free_if_nonnil( str) ( (str) ?    \
      (str_free( (str)),TRUE) :  \
      FALSE)


#ifdef __cplusplus
extern "C" {
#endif

extern string str_alloc(int size, char *init_str);
extern void str_free(string str);
extern void str_install(string *str, char *char_str);
extern void str_copy(string *dest, string target);
extern void str_cat(string *str1, string str2);
extern void str_cat_and_wrap(string *output_str, string str, int
max_line);
extern void str_upper(string str);
extern void str_lower(string str);
extern boolean str_equal(string str1, string str2);
extern boolean str_iequal(string str1, string str2);
extern short str_cmp(string str1, string str2);
extern long str_cmp_long(string str1, string str2);
extern short str_icmp(string str1, string str2);
extern long str_icmp_long(string str1, string str2);
extern  string  str_extract(string  str,  int  start_index,  int
end_index);
extern string str_dup(string str);
extern string str_dup_mem(string str, mem_group group);
extern boolean str_realloc(string *str, int size);
extern void str_sprintf(string *str, char *control, ...);
#if defined ( __GNUC__ )
extern void str_sprintf(string *str, char *control, ...)
       __attribute__ ((format (printf, 2, 3)));
extern void str_sprintf_strings(string *str_src, char *control,
...)
       __attribute__ ((format (printf, 2, 3)));
#else
extern void str_sprintf(string *str, char *control, ...);
extern void str_sprintf_strings(string *str_src, char *control,
...);
```

```
#endif
extern void str_vsprintf(string *str, char *control, va_list ap);
extern void str_add_char(string *st, char ch, int pos);
extern long str_cmp_integer(string name_1, string name_2) ;
extern int str_substring_position(string the_string, string
sub_string) ;
extern int str_substring_next_position(string the_string, string
sub_string, int cur_pos) ;
extern int str_substring_last_position(string the_string, string
sub_string) ;
extern int str_substring_next_last_position(string the_string,
string sub_string, int cur_pos) ;
extern string str_convert_type(str_data_type type, caddr_t p_data)
;
extern int str_find_nth_char(string the_string, char the_char, int
the_number);
extern void str_replace_char(string str, char char_to_replace,
char replace_with_char);
extern void str_list_to_set(string list, set str_set, string
separaters);
extern boolean str_is_blank(string str) ;
extern struct set_struct *str_string_to_set(string str, string
delimeters);
extern string str_set_to_string(set strings, string delimeter);
extern string str_remove_chars_from_string(string original_cast,
string black_list);
extern string str_tok(string *handle, string separator);
extern string str_get_plural_suffix(long count);
extern void str_format_float(float value, int significant_digits,
     int min_width, string *value_str);
extern string str_choose_plural(long count, string singular,
string plural);

#ifdef __cplusplus
}
#endif

#endif




#ifndef lint
static char rcsid[] = "$Header:
/remote/src/sys/garp/dev/generic/mem/RCS/mem_mm.c,v 8.4 1993/12/15
12:00:53 verb Exp $";
#endif
/*****************************************************************
****************

*****************************************************************
***************
 **
```

```
** FILE NAME: mm.c
**
** MODULE: mem
**
** ABSTRACT: This is a modified allocator from Berkeley
**
** CONVENTIONS:
**
** COPYRIGHT (C) 1987, OPTIMAL SOLUTIONS INC., ALL RIGHTS
RESERVED.
**

*****************************************************************
***************

*****************************************************************
**************/

/*
 * Memory allocator with the following features:
 *
 * 1) Uses bins for objects up to a fixed size, and uses
logarithmic binning
 * (with interpolation) for larger objects
 *
 * 2) Calls sbrk() to get large blocks (currently 16K bytes)
 *
 * 3) Checks for free object being freed, and corrupt objects;
Attempts to avoid
 * core-dumping when passed a bad pointer
 *
 * 4) Attempts to compact free blocks when sbrk() fails
 *
 * 4) Option (MM_PARANOID) to perform bounds checking on each
object when that
 * object is free'd.
 *
 * 5) Option (MM_TRACE) to record stack backtraces and dump to a
file
 * information on each object still allocated at termination.
 *
 * #Define options:
 *
 * MM_PARANOID enables code to place extra word(s) at the start
and end of each
 * block to try to catch errors when the object is freed.
MM_NPARANOID is the
 * number of words to place at each end of the block.
 *
 * MM_TRACE enables code which keeps a stack trace with each
allocation, and
 * maintains a list of allocated objects (as well as the list of
free
 * objects) to allow detection of "leaks" when the program
terminates.
```

```
 *
 * WARNING: Do not compile MM_TRACE with -pg; compile it with -g
so that prleak
 * can print out the function name and source line number.
 *
 * TODO: allow for arbitrary precision on interpolation of bins
have first
 * allocation round to 4k boundary ? Necessary ? MMsalloc(obj,
size) /
 * MMsfree(obj, size) to avoid 4-word overhead on very small
objects; macros
 * SALLOC() and SFREE()
 */


#include "osi.h"
#include "mm.h"
#include "mem.h"
#include "mem_int.h"
#include "mem_debug.h"


#define not(x) (!(x))


/*  Local Functions  */

static void dummy_function(void);
static void rebin(char *block, long int size);
static void null_routine(void);
static long four_byte_hack(memory_block *p);
static int compact_compare(memory_block *p1, memory_block *p2);
static void compact_memory(void);
static void     find_more_memory(long int start_bin);
static void unwind_call_stack(trace_memory_block *p);


#if !defined(Synopsys_DontRedefineMalloc)

/*****************************************************************
****************

    FUNCTION:  dummy_function    Rob Verbrugghe - 29 Dec 1992

    ABSTRACT:  This will never be called.  It is included only to
ensure that
    mem_redefine.c is loaded.  What a hack!

*****************************************************************
***************/

static void dummy_function(void)
{
```

```
  dummy_function();
  mem_load_redefinitions_of_malloc_free();
}

#endif



#ifdef mips
#define local_memset(mem, c, count) {      \
  register long i;         \
  register char *mem_p;        \
         \
  mem_p = mem;          \
          \
  for(i=0;i<count;i++) {        \
    *mem_p = c;         \
    mem_p++;         \
  }          \
}
#else
#define local_memset (void) memset
#endif

/*  These  are  macro's  so  MM_PARANOID  can  give  reasonable
performance */
#define insert_trailer(p) {       \
    register pad_size;        \
    register char *l;        \
         \
    pad_size = global->pad_size*ALIGN;      \
         \
    l = (char *) ((char *) p + sizeof(pad_memory_block) + p-
>request); \
         \
    local_memset(l, (char) 0xa5, pad_size);     \
    }



/*****************************************************************
****************
 *
 * FUNCTION: mem_verify_trailer
 *
 * ABSTRACT: Checks to be sure that a pad is ok.
 *
 * RETURNS: TRUE or FALSE depending on whether the pad is ok.
 *
 * HISTORY:
 *  Oct 21 1987 Brent Gregory Original.
 *
```

```
*****************************************************************
**************/

boolean
mem_verify_trailer(pad_memory_block *p)
{
  register long i, pad_size, bin;
  register char *l;
  mm_global global;
  mem_group group;
  long mem_bad_allocation;

  if((char *) p < mem_low_memory || (char *) p > mem_high_memory)
{
    mem_watcher
      ("Memory structures have been trashed, try running with a
larger pad\n");
    return(FALSE);
  }

  bin = p->binnum;

  /* Check for binnum in bounds, and for magic number (high order)
*/
  if (((bin & ~0xFFF) != (MAGIC & ~0xFFF)) || ((bin & 0xFFF) >=
BINS)) {
    mem_watcher
      ("Memory structures have been trashed, try running with a
larger pad\n");
    return(FALSE);
  }

  if((group    =    MEM_GROUP_OF_POINTER((caddr_t)    p))    ==
NIL(mem_group)) {
    mem_watcher
      ("Memory structures have been trashed, try running with a
larger pad\n");
    return(FALSE);
  }

  global = group->global;
  pad_size = global->pad_size*ALIGN;

  l = (char *) ((char *) p + sizeof(pad_memory_block) + p->request);

  if(l<mem_low_memory || l>mem_high_memory ||
     (l+pad_size)>mem_high_memory || pad_size < 0) {

    mem_watcher
      ("Memory structures have been trashed, try running with a
larger pad\n");
    return(FALSE);
  }
```

```
  for(i = 0; i < pad_size; i++) {
    if (l[i] != (char) 0xa5) {
      mem_watcher("A memory pad has been overwritten at 0x%x.\n",
&(l[i]));
      mem_watcher("Allocation = 0x%x,  Start pad = 0x%x,  End pad
= 0x%x\n",
    mem_bad_allocation =
    ((long) (((char *) p) + sizeof(pad_memory_block))),
    (long) l, ((long) l) + (pad_size));
      mem_display_block((((char *) p) + sizeof(pad_memory_block))
+ p->request,
   pad_size);

      mem_watcher  ("To  stop  just  before,  type  something
like:\n\tstop  in  main\n\trun\n\tstop  in  mem_stop\n\tcall
mem_stop_at(%d)\n\tcall mem_watch_pad(0x%x)\n\tcont\n",
       mem_iteration - 1, mem_bad_allocation);
      mem_stop();

      return(FALSE);
    }
  }
  return(TRUE);
}

/* GET_BIN -- determine the bin number based on the size; this is
magic */

#define GET_BIN(bin, size){\
    register long n, log;\
    if ((size) <= 0) (bin) = 0;\
    else if ((size) <= SMALL_SIZE) (bin) = ((size) - 1) / ALIGN
+ 1;\
    else {\
 for(log = LOG_SMALL_SIZE, n = ((size)-1) >> log; n > 0; log++,
n>>=1);\
 (bin) = log*2 + SMALL_SIZE/ALIGN - 2*LOG_SMALL_SIZE \
      - ((size) <= (3 << (log-2)));\
    }\
}

/* GET_SIZE -- get the block size from the bin number; this is
magic */
#define GET_SIZE(bin, size) {\
    register long tmp;\
    if ((bin) <= SMALL_SIZE/ALIGN) (size) = (bin) * ALIGN;\
    else {\
 tmp = (bin) - SMALL_SIZE/ALIGN + 2*LOG_SMALL_SIZE - 3;\
 (size) = ((tmp & 1) == 0 ? 3 : 4) << (tmp >> 1);\
    }\
}


/* rebin -- place a block into the free list */
```

```
static void
rebin(char *block, long int size)
{
  mm_global global;
  long            bin, actual_bin_size;
  memory_block   *p;

  global = mem_current_group->global;

  if (size >= global->memory_block_size) {

    p = (memory_block *) block;

    /*
     * (bin, actual_bin_size) refers to the first bin with blocks
that are
     * larger than (or equal to) 'size'.  If this is in fact not
the same
     * size as 'size', then we must drop down a bin, and then re-
bin the
     * remainder
     */
    GET_BIN(bin, size);
    GET_SIZE(bin, actual_bin_size);
    if (actual_bin_size != size) {
      bin--;
      GET_SIZE(bin, actual_bin_size);
      rebin(block + actual_bin_size, size - actual_bin_size);
    }
    p = (memory_block *) (((char *) p) +
     (global->memory_block_size - sizeof(memory_block)));

    p->nextblock = global->free_list[bin];
    global->free_list[bin] = p;
  }
}


/*****************************************************************
****************
 *
 * FUNCTION: mem_malloc
 *
 * ABSTRACT: General-purpose storage allocator.
 *
 * RETURNS: caddr_t
 *
 * HISTORY:
 *  Oct 21 1987 Brent Gregory Original.
 *
******************************************************************
**************/
```

```
caddr_t
mem_normal_malloc(long int bytes)
{
  static caddr_t emergency_memory=NULL;
  static long emergency_count=0;
  mm_global global;
  char          *block;
  register long  bin, alloc_size, request;
  register memory_block *p;
  mem_out_of_memory_fnc old_out_of_memory_routine;
  long block_count;

  if(!mem_initialized) {
    mem_initialize();
  }

#ifdef MEM_RANDOM
  /***********************************************/
  /**      **/
  /** RANDOMIZATION:     **/
  /**      **/
  /** This mixes up the memory state a bit **/
  /**      **/
  /***********************************************/
  mem_mix_up_memory(bytes);
  /***********************************************/
#endif


  mem_iteration++;

  if((bytes <= mem_current_group->small_allocation) &&
      (!mem_current_group->debugging)) {

    return(mem_small_alloc(bytes));
  }

  if(bytes < 8) {
    bytes = 8;
  }

  verify_group(mem_current_group);

  global = mem_current_group->global;

  if(!mem_current_group->item_free || (global == NIL(mm_global)))
{
    block = mem_galloc_from_group(bytes, mem_current_group);
  }
  else {

    /* Handle page or larger allocations -rjv */
    if (!mem_current_group->debugging && bytes >= mem_block_size)
{
      return mem_alloc_large_block(bytes);
```

```
    if(mem_malloc_unready) {
      if(not(mem_initialized)) {
 if(not(mem_trying_to_initialize)) {
   mem_initialize();
   return(mem_malloc(bytes));
 }
      }

      if((bytes&(ALIGN-1)) != 0) {
 bytes +=  (ALIGN-(bytes&(ALIGN-1)));
      }

      if(bytes<emergency_count){
 block = emergency_memory;
 emergency_count -= bytes;
 emergency_memory += bytes;
      }
      else {
 block_count = (bytes >> mem_log_block_size)+1;
 block =  mem_alloc_blocks(block_count);
 mem_note_group_of_blocks(block, block_count, mem_current_group);
 emergency_memory = block+bytes;
 emergency_count = (block_count<<mem_log_block_size) - bytes;
      }
      return(block);
    }

    mem_malloc_unready = TRUE;

    mem_error_if( mem_current_group->status == FREED_GROUP) ;
    mem_error_if( mem_current_group->status != ACTIVE_GROUP) ;

    global = mem_current_group->global;

    /* Decide how much we must really allocate */
    request = bytes + global->extra_byte_count;


    /* Determine which bin, and then how much we really need */
    GET_BIN(bin, request);
    GET_SIZE(bin, alloc_size);

    /* See if we have a block in the free list for this bin */
    if ((p = global->free_list[bin]) == NIL(memory_block *)) {

      /* Must allocate a new block, check for space on the current
page */
      if (global->sbrk_remaining < alloc_size) {

 /* take remaining stuff on current page and place in free list
*/
 rebin(global->sbrk_last, global->sbrk_remaining);
```

```
 /*
  * when PAGE_SIZE divides alloc_size this allocates an extra page
  * worth; this is of no concern to us, we will use it eventually
  */
 global->sbrk_remaining = (alloc_size / PAGE_SIZE + 1) * PAGE_SIZE;

 mem_get_out_of_memory_routine(&old_out_of_memory_routine);
 mem_set_out_of_memory_routine(null_routine);
 global->sbrk_last = mem_galloc((long) global->sbrk_remaining);

 mem_set_out_of_memory_routine(old_out_of_memory_routine);

 /* See if the sbrk() failed; if so, hunt around for more memory
*/
 if ((long) global->sbrk_last == -1) {
   find_more_memory(bin);
   if (global->sbrk_last == NIL(char *)) {
     (*mem_out_of_memory_routine)();
     mem_malloc_unready = FALSE;
     return NIL(char *);
   }
 }
 else {
   global->obj_allocated++;
   global->bytes_allocated += global->sbrk_remaining;
 }
      }
      /* Peel off a piece from 'global->sbrk_last' for the next
object */
      p    =    (memory_block    *)    (global->sbrk_last+global-
>memory_block_size-
       sizeof(memory_block));
      global->sbrk_last += alloc_size;
      global->sbrk_remaining -= alloc_size;

    }
    else {
      /* We can reuse the first entry on the garbage list for this
size */
      global->free_list[bin] = p->nextblock;
    }

    /* Make sure the pointer looks good */
    if   ((char   *)   p   <   mem_low_memory   ||   (char   *)   p   >
mem_high_memory) {
      mem_error_string (BAD_POINTER, "from free list\n");
      mem_malloc_unready = FALSE;
      return NIL(char *);
    }
    /* Save the bin-number and a MAGIC number */
    p->binnum = bin | (MAGIC & ~0xFFF);

    if (mem_current_group->debugging) {

      if(global->counting) {
```

```
global->obj_active++;
global->bytes_active += alloc_size;

if (global->bytes_active > global->max_bytes_active) {
  global->max_bytes_active = global->bytes_active;
}
      }

      if(global->tracing || (global->pad_size!=0)) {
mem_pad(p)->next = global->active_list[bin];
mem_pad(p)->prev = NIL(pad_memory_block *);

if (mem_pad(p)->next != NIL(pad_memory_block *)) {
  mem_pad(p)->next->prev = mem_pad(p);
}
global->active_list[bin] = mem_pad(p);
      }

      if(global->tracing) {

unwind_call_stack(trace(p));

trace(p)->request = bytes;
      }

      if(global->pad_size != 0) {
mem_pad(p)->request = bytes;
insert_trailer(mem_pad(p));
      }

      if(mem_check_for_trash) {
mem_do_trash_check();
      }

      if(mem_pointer_to_watch    ==    (char    *)    p    +
sizeof(memory_block)) {
mem_watcher("Allocated 0x%x\n", (long) mem_pointer_to_watch);
      }
    }

    block = (char *) p + sizeof(memory_block);

    mem_malloc_unready = FALSE;
  }

  if(mem_trash) {
    mem_trash_block(block, bytes);
  }

  return block;
}

/*
 * null_routine -- This routine does absolutely nothing...
```

```
 */

static void
null_routine(void)
{
}

#define remove_from_active_list(p) \
  if (p->prev == NIL(pad_memory_block *)) { \
    global->active_list[bin] = p->next; \
  } \
  else { \
    p->prev->next = p->next; \
  } \
  if (p->next != NIL(pad_memory_block *)) { \
    p->next->prev = p->prev; \
  }


/*****************************************************************
**************
 *
 * FUNCTION: mem_free
 *
 * ABSTRACT:  free the memory allocated by malloc().
 *
 * HISTORY:
 *  Oct 21 1987 Brent Gregory Original.
 *

*****************************************************************
**************/

void mem_normal_free(char *block)
{
  mem_group group;
  register mm_global global;
  register memory_block *p, *freed;
  register pad_memory_block *active, *pp;
  register long   bin, size;
  long i, table_entry;

  mem_iteration++;

#ifdef MEM_RANDOM
  /*************************************************/
  /**       **/
  /** RANDOMIZATION:     **/
  /**       **/
  /** This mixes up the memory state a bit **/
  /**       **/
  /*************************************************/
  mem_mix_up_memory((long) 0);
  /*************************************************/
#endif
```

```
  if(block == NIL(char *)) {
    return;
  }

  if ((char *) block < mem_low_memory || (char *) block >
mem_high_memory) {
    mem_error_string (CRAP, "pointer not within allocated memory
range\n");
    return;
  }

  table_entry = (long) (mem_chunk_table[MEM_CHUNK_INDEX(block)].group);

  group = (mem_group) (table_entry & (~mem_block_mask));
  size = table_entry & mem_block_mask;

  if(size != 0) {
    mem_small_free(block, group, size);
    return;
  }

  if((group == NIL(mem_group)) || (group->status != ACTIVE_GROUP))
{
    mem_error_string (CRAP, "pointer does not belong to an active
group\n");
    return;
  }

  if(!mem_item_free_group(group)) {
    return;
  }

  if(((long) block)&(ALIGN-1) != 0) {
    mem_error_string (CRAP, "Tried to free an unaligned
pointer.\n");
    return;
  }

  /* Check to see if it is a large block -rjv */
  if (!group->debugging && (mem_block_mask & (long) block) == 0)
{
    mem_free_large_block(block);
    return;
  }

  global = group->global;

  /* Dereference the block */
  p = (memory_block *) (block - sizeof(memory_block));

  bin = p->binnum;

  /* Check for binnum in bounds, and for magic number (high order)
*/
  if (((bin & ~0xFFF) != (MAGIC & ~0xFFF)) || ((bin & 0xFFF) >=
```

```
3INS)) {
    if(!mem_display_warning_messages) {
      mem_error_string(CRAP,    "internal    memory    allocation
error.\n");
      return;
    }

    for(i=0;i<BINS; i++) {
      for(freed = global->free_list[i];
   freed != NIL(memory_block *);
   freed = freed->nextblock) {

         if(p == freed) {
   mem_error_string (CRAP, "Tried to free a pointer a second
time.\n");
   return;
 }
      }
    }

    if (global->tracing || (global->pad_size > 0)){
      pp = mem_pad(p);

      for(i=0;i<BINS; i++) {
 for(active = global->active_list[i];
     active != NIL(pad_memory_block *);
     active = active->next) {

          if(pp == active) {
     mem_error_string (CRAP,
   "The beginning of a block has been overwritten.\n");
     mem_printf("Allocation = 0x%x    Spot overwritten = 0x%x\n",
         (long) block, (long) p);
     mem_display_block((char *) p, (long) 4);
     return;
   }
 }
      }

      mem_error_string (CRAP, "Tried to free a pointer which was
not created by a MEM allocation routine\n");
      return;
    }
    else {
      mem_error_string (CRAP, "Tried to free a pointer which was
not created by a MEM allocation routine\nor which has been
overwritten past the beginning\nto determine which, you should
turn on tracing or padding for this group.\n");
      return;
    }
  }

  bin &= 0xFFF;

  GET_SIZE(bin, size);
```

```
if (group->debugging) {

    if (global->counting) {
      global->obj_active--;
      global->bytes_active -= size;
    }

    if (global->tracing || (global->pad_size > 0)){
      remove_from_active_list(mem_pad(p));
    }

    if (global->pad_size > 0) {
      (void) mem_verify_trailer(mem_pad(p));
    }

    if(mem_check_for_trash) {
      mem_do_trash_check();
    }

    if(mem_pointer_to_watch == block) {
      mem_watcher("Freed 0x%x\n", (long) mem_pointer_to_watch);
    }
  }

  /* Link p into the free list for this block size */
#ifdef MEM_RANDOM
  /***********************************************/
  /**       **/
  /** RANDOMIZATION:     **/
  /**       **/
  /** This puts the memory back in a random **/
  /** spot in the free list.    **/
  /**       **/
  /***********************************************/
  if((global->free_list[bin] == NIL(memory_block *)) ||
     ((random()&1) == 0)) {
    p->nextblock = global->free_list[bin];
    global->free_list[bin] = p;
  } else {
    last = global->free_list[bin];
    while((last->nextblock != NIL(memory_block *)) &&
   ((random()&1) == 0)) {
      last = last->nextblock;
    }
    p->nextblock = last->nextblock;
    last->nextblock = p;
  }
  /***********************************************/
#else
  p->nextblock = global->free_list[bin];
  global->free_list[bin] = p;
#endif
  if (mem_trash) {
    mem_trash_block(((caddr_t) p) + sizeof(memory_block),
      size - global->memory_block_size);
```

```
}
}

/*
 * Bring in the generic linked-list sorting package
 */

#define SORT   other_list_sort

#define NEXT   nextblock
#define TYPE   memory_block
#include "lsort.h"


#define SIZE_FIELD(p)  (*(long *) (p + 1))

/* ARGSUSED */
static long four_byte_hack(memory_block *p)
{
  /*
   * we just assume any missing four-byte chunk is on the free-
list this is
   * mostly safe because be never allocate less than 8 bytes for
any object
   * we give back to the user. It will fail, however, if someone
attempts to
   * sbrk(4) behind our back -- we may reclaim his memory !
   */
  MEM_GROUP_OF_POINTER((caddr_t) p)->global->free_list[1] = 0;

  return 1;
}



/* Sort the memory block by their address */
static int
compact_compare(memory_block *p1, memory_block *p2)
{
  return p1 - p2;
}


static void
compact_memory(void)
{
  long             i, size, cnt, byte_cnt;
  memory_block   *pnext, *last, *head, *p;
  mm_global global;

  global = mem_current_group->global;
```

```
#ifdef DEBUG
  (void) fprintf(stderr, "MM: compacting memory\n");
  free_list_histogram();
  (void) fflush(stdout);
#endif

   /*
    * Place all blocks in a single linked-list; cheat and place the
size in
    * the first longword of each memory object;
    */
   head = NIL(memory_block *);
   byte_cnt = cnt = 0;
   for (i = 2; i < BINS; i++) {
     if (global->free_list[i] != NIL(memory_block *)) {
       GET_SIZE(i, size);
       last = NIL(memory_block *);
       for (p = global->free_list[i]; p != NIL(memory_block *); p
= p->nextblock) {
 SIZE_FIELD(p) = size;
 last = p;
 cnt++;
 byte_cnt += size;
       }
       last->nextblock = head;
       head = global ->free_list[i];
       global->free_list[i] = NIL(memory_block *);
     }
   }

#ifdef DEBUG
  (void) fprintf(stderr,
   "%ld free objects totaling %ld bytes\n", cnt, byte_cnt);
  (void) fflush(stdout);
#endif

  /* gratituous use of byte_cnt to shut up lint */
  if (byte_cnt == 0 || head == NIL(memory_block *))
    return;

  /* Sort this by address */
  head = other_list_sort(head, compact_compare, cnt);

  /* Coallesce adjacent blocks */
  for (p = head; p != NIL(memory_block *);) {

    /* See if the block fits perfectly */
    if ((char *) p + SIZE_FIELD(p) == (char *) p->nextblock) {
      SIZE_FIELD(p) += SIZE_FIELD(p->nextblock);
      p->nextblock = p->nextblock->nextblock;

      /* See if the block fits (except for a 4-byte missing chunk)
*/
    }
    else if ((char *) p + SIZE_FIELD(p) + 4 == (char *) p-
```

```
>nextblock) {
      if (four_byte_hack(p)) {
 SIZE_FIELD(p) += SIZE_FIELD(p->nextblock) + 4;
 p->nextblock = p->nextblock->nextblock;
      }
      else {
 p = p->nextblock; /* no match */
      }

      /* it just doesn't match */
    }
    else {
      p = p->nextblock;
    }
  }

  /* Re-bin each of the blocks */
  cnt = 0;
  for (p = head; p != NIL(memory_block *); p = pnext) {
    pnext = p->nextblock;
    cnt++;
    rebin(((char*)p)-global->memory_block_size+sizeof(memory_block),
   SIZE_FIELD(p));
  }

#ifdef DEBUG
  (void) fprintf(stderr, "%ld free objects after compaction\n",
cnt);
  free_list_histogram();
  (void) fflush(stdout);
#endif
}


static void
find_more_memory(long int start_bin)
{
  mm_global global;
  long            bin, loop;

  global = mem_current_group->global;

  for (loop = 0; loop < 2; loop++) {
    /* First look for a larger block to tear apart */
    for (bin = start_bin + 1; bin < BINS; bin++) {
      if (global->free_list[bin] != NIL(memory_block *)) {
 global->sbrk_last = (char *) global->free_list[bin];

 GET_SIZE(bin, global->sbrk_remaining);
 global->free_list[bin] = global->free_list[bin]->nextblock;

 return;
      }
    }
```

```
    /* okay, play hardball now -- compact the free memory list */
    if (loop == 0)
      compact_memory();
  }

  /* There's only so much we can do about it (buy more memory ?)
*/
  global->sbrk_last = NIL(char *);
  global->sbrk_remaining = -1;

  return;
}


/*******************************************************************
****************
 *
 * FUNCTION: mem_realloc
 *
 * ABSTRACT:  re-allocate a block of memory.
 *
 * RETURNS: char *
 *
 * HISTORY:
 *  Oct 21 1987 Brent Gregory Original.
 *
********************************************************************
**************/

char *mem_realloc(char *block, long int new_size)
{
  register long bin, size;
  register memory_block *p;
  char *new_block;
  mm_global global;
  mem_group group;
  long data_size, table_entry;
  long copy_count, max_size;

  mem_iteration++;

#ifdef MEM_RANDOM
  /**************************************************/
  /**       **/
  /** RANDOMIZATION:     **/
  /**       **/
  /** This mixes up the memory state a bit **/
  /**       **/
  /**************************************************/
  mem_mix_up_memory(new_size);
  /**************************************************/
#endif
```

```
  if (block == NIL(char *)) return mem_malloc((long) new_size);

      table_entry = (long)
(mem_chunk_table[MEM_CHUNK_INDEX(block)].group);

  group = (mem_group) (table_entry & (~mem_block_mask));
  size = table_entry & mem_block_mask;

  if(size != 0) {
    if(MAKE_ALIGNED(new_size) <= size) {
      return(block);
    }

    if ((new_block = mem_malloc_from_group((long) new_size,group))
!=
 NIL(char *)) {

      bcopy(block, new_block, (int) size);
      mem_small_free(block, group, size);
      return(new_block);
    }

    return(block);
  }

  if(new_size < 8) {
    new_size = 8;
  }

  if ((char *) block < mem_low_memory || (char *) block >
mem_high_memory) {
    mem_error_string (CRAP, "pointer not within allocated memory
range\n");
    return NIL(char *);
  }

  if((group == NIL(mem_group)) || (group->status != ACTIVE_GROUP))
{
    mem_error_string (CRAP, "pointer does not belong to an active
group\n");
    return NIL(char *);
  }

  if(!mem_item_free_group(group)) {
    new_block = mem_malloc_from_group((long) new_size, group);

    if((long) new_size + (long) block >= (long) mem_high_memory)
{
      /* EMPTY */
    };

    /* Note:  We do not know how big the source was,
       but we should not copy from off the end of memory */
```

```
    max_size = ((long) mem_high_memory) - ((long) block);

    if(new_size > max_size) {
      copy_count = max_size;
    }
    else {
      copy_count = new_size;
    }


    bcopy(block, new_block, (int) copy_count);
    return(new_block);
  }

  /* Perhaps this is a large block -rjv */
  if (!group->debugging && (mem_block_mask & (long) block) == 0)
{
    return mem_realloc_large_block(block, new_size);
  }

  /* Dereference the block */
  p = (memory_block *) (block - sizeof(memory_block));

  if ((char *) p < mem_low_memory || (char *) p > mem_high_memory)
{
    mem_error_string (CRAP, "pointer not within allocated memory
range\n");
    return NIL(char *);
  }

  bin = p->binnum;

  /* Check for binnum in bounds, and for magic number */
  if (((bin & ~0xFFF) != (MAGIC & ~0xFFF)) || ((bin & 0xFFF) >=
BINS)) {
    mem_error_string (CRAP,
   "Tried to free a pointer twice, or tried to free an offset
pointer\n");
    return (NIL(char *));
  }

  bin &= 0xFFF;
  global = group->global;
  GET_SIZE(bin, size);

  /* Check if there already is enough room */
  data_size = size - global->extra_byte_count;
  if (data_size >= new_size) {
    new_block = block;

    if(group->debugging) {
      if (global->pad_size > 0) {
 (void) mem_verify_trailer(mem_pad(p));
 mem_pad(p)->request = new_size;
 insert_trailer(mem_pad(p));
```

```
        }

        if(mem_check_for_trash) {
  mem_do_trash_check();
        }

        if(mem_pointer_to_watch == block) {
  mem_watcher("Realloced 0x%x (pointer not moved)\n",
        (long) mem_pointer_to_watch);
        }
      }
    }
    else {
      if ((new_block = mem_malloc_from_group((long) new_size,group))
!=
  NIL(char *)) {
        if(mem_pointer_to_watch == block) {
  mem_watcher("Realloced 0x%x (new pointer is 0x%x)\n",
        (long) mem_pointer_to_watch, (long) new_block);
        }
        bcopy(block, new_block, (int) data_size);
        mem_free(block);
      }
    }

    return new_block;
}

/****************************************************************
****************

    FUNCTION:  unwind_call_stack

****************************************************************
***************/

static void unwind_call_stack(trace_memory_block *p)
{
  mem_do_stack_unwind(p->stack_trace, (long) MAX_STACK_TRACE);
}  /* unwind_call_stack() */


/****************************************************************
****************

    FUNCTION: mem_extra_byte_count      AUTHOR: Ron Miller - Mar
13, 1991

    ABSTRACT: Given a memory group, returns the number of bytes
extra that
  are allocated with each memory allocation in the group (this
  includes pads, headers, etc.).

****************************************************************
```

```
***************/

long mem_extra_byte_count(mem_group group)
{
    return( group->global->extra_byte_count );
}


/****************************************************************
****************
 *
 *      FUNCTION: mem_calloc
 *
 *       ABSTRACT: Allocate a block of memory from the current
group.
 *          At least item_count*item_size bytes of memory are
allocated.
 *          If more is allocated, it is done in multiples of
item_size.
 *     The actual number of item_size blocks of contiguous memory
 *      allocated is returned in p_actual.
 *
 *      RETURNS: a pointer to the allocated memory.
 *
 *      HISTORY:
 *              Dec 10 1987     Jerry Huth      added code to zero
out memory
 *               Oct 12 1987     Brent Gregory   Original.
 *

****************************************************************
**************/

caddr_t mem_calloc(long int item_count, long int item_size, long
int *p_actual)
{
  long count;
  caddr_t store ;

  count = item_count * item_size;

  if(p_actual != NIL(long *)) {
    *p_actual = item_count;
  }

  store = mem_malloc( count) ;

  (void) bzero( (char *)store, (int)count) ;

  return( store);
}

/****************************************************************
****************
```

```
    FUNCTION:  mem_group_get_active  Rob Verbrugghe - 29 Dec 1992

    ABSTRACT:  Return total number of bytes allocated, and the
number of
    allocations.

****************************************************************
***************/

long    mem_group_get_active(mem_group    group,    long    int
*p_allocations)
{
  register pad_memory_block *memory;
  register long total, count, bin;
  long i;

  count = 0;
  total = 0;

  for (i=0; i<BINS; i++) {
    for (memory = group->global->active_list[i];
        memory != NIL(pad_memory_block *);
        memory = memory->next) {

      bin = (memory->request+3)/4;
      count++;
      total += bin*4;
    }
  }

  if (p_allocations != NIL(long *)) {
    *p_allocations = count;
  }

  return total;
}  /* mem_group_get_active() */


/***************************************************************
****************

    FUNCTION:  mem_group_get_free  Rob Verbrugghe - 29 Dec 1992

    ABSTRACT:  Returns total number of bytes free, and the number
of
    free allocations in both the mm allocator and the small
allocator.

****************************************************************
***************/

long mem_group_get_free(mem_group group, long int *p_free_blocks)
{
  register memory_block *memory;
  register long total, count;
```

```
  caddr_t small_memory;
  long small_size;
  long i, size;

  count = 0;
  total = 0;

  /* Get the mm free list */
  for (i = 1; i < BINS; i++) {
    GET_SIZE(i, size);
    for (memory = group->global->free_list[i];
  memory != NIL(memory_block *);
  memory = memory->nextblock) {
      count++;
      total += size;
    }
  }
  if (group->global->sbrk_remaining > 8) {
    count++;
    total += group->global->sbrk_remaining;
  }


  /* Get the small free list */

  if (group->small_allocation < MEM_ALIGN) small_size = 0;
  else small_size = (group->small_allocation - 1) / MEM_ALIGN +
1;

  for (i = 0; i < small_size; i++) {
    size = i * MEM_ALIGN;
      for   (small_memory   =   (caddr_t)   group-
>small_blocks[i].free_list;
  small_memory != NIL(caddr_t);
  small_memory =  *((caddr_t *) small_memory)) {
      count++;
      total += size;
    }
  }

  if (p_free_blocks != NIL(long *)) {
    *p_free_blocks = count;
  }

  return total;
}  /* mem_group_get_free() */


/*    Now define functions for mem_malloc && mem_free */


char *mem_malloc(long int size)
{
  return(mem_normal_malloc(size));
}
```

```
#endif


void mem_free(char *pointer)
{
  mem_normal_free(pointer);
}
#endif
```

What is claimed is:

1. A system for displaying a text, said system having a processor coupled to a memory unit wherein said processor is programmed to perform logic processing, said system comprising:

parsing logic which parses said text to create a parse tree representation of said text;

parse node correspondence logic accessing said parse tree representation, said parse node correspondence logic finding a smallest enclosing parse node of a first portion of said text;

text correspondence logic accessing said parse tree representation, said text correspondence logic finding a second portion of said text which corresponds to all text enclosed by said smallest enclosing parse node; and text display logic, said text display logic displaying said second portion of said text with a display characteristic, said display characteristic differentiating said second portion of said text.

2. The system of claim 1, said system further comprising:

text selection logic, said text selection logic selecting said first portion of said text.

3. The system of claim 1, wherein said parse tree representation is a parse array.

4. The system of claim 3, wherein said parse array has no more than (N+2M) symbols where N is the number of characters in said text and M is the number of parse nodes in said parse tree representation.

5. A method, performed by a data processing system having a memory, for displaying a text, said method comprising the steps of:

parsing said text into a parsed text;

creating a parse tree representation of said parsed text;

identifying a smallest enclosing parse node of a first portion of said text using said parse tree representation;

finding a second portion of said text which corresponds to all text enclosed by said smallest enclosing parse node; and displaying said second portion of said text with a display characteristic, said display characteristic differentiating said second portion of said text.

6. The method of claim 5, said method further comprising the step of:

selecting said first portion of said text in accordance with a user selection.

7. The method of claim 5, wherein said parse tree representation is a parse array and said step of creating said parse tree representation includes:

building said parse array.

8. The method of claim 7, wherein the step of building said parse array further includes the steps of:

adding a begin node symbol to said parse array to indicate the beginning of a parse node;

adding an end node symbol to said parse array to indicate the end of said parse node; and adding a character symbol to said parse array to indicate a character of said parse node.

9. The method of claim 8, wherein the step of building said parse array further includes the steps of:

adding a character block symbol to represent a predetermined number of characters of said parse node.

10. The method of claim 8, further comprising the step of:

writing said parse array to a computer storage device using a set of symbols which represent said parse array in said memory.

11. A method, performed by a data processing system having a memory, for finding a parse node identifier corresponding to a text index into a text array of N characters, said parse node identifier corresponding to a parse node belonging to a parse tree with M parse nodes, said parse tree derived from said text array, said method comprising the steps of:

constructing a parse array comprising a sequence of symbols with each symbol chosen from a group comprising a begin parse node symbol, an end parse node symbol, and a character symbol;

initializing a parse index, a character count, and said parse node identifier;

adjusting said parse node identifier and said character count in accordance with a reference symbol located in said parse array at a location specified by said parse index.

12. The method of claim 11, wherein said adjusting step includes:

incrementing said parse node identifier if said reference symbol is a begin parse node symbol.

13. The method of claim 11, wherein said adjusting step includes:

decrementing the parse node identifier if said reference symbol is an end parse node symbol.

14. The method of claim 11, wherein said adjusting step is repeated until said character count corresponds to said text index.

15. A computer system having a memory, comprising:

a text array stored in the memory and including a sequence of characters, the set of characters including a set of selected characters in said text array;

a parse tree stored in the memory and derived from said text array, with said parse tree represented as a parse array comprising a sequence of symbols where each symbol is chosen from a group comprising a begin parse node symbol, an end parse node symbol, a single character symbol, and a block character symbol, a parse node in the parse tree being the smallest parse node enclosing said set of selected characters, said parse node represented as an index into said parse array; and a set of parse node characters stored in the memory and corresponding to all characters of said text array enclosed by said parse node wherein each character of said set of parse node characters has a parse node display characteristic.

16. A computer-readable medium encoded with a data structure including an ordered array that represents a mapping between computer program text and parse node information about a parse tree produced from said computer program text, the array comprising:

locations in the array holding respective sets of begin and end markers that correspond to respective parse nodes of the parse tree wherein the respective sets of begin and end markers are ordered in the array such that respective corresponding begin and end markers for any respective given parent parse node encompass respective corresponding begin and end markers for every respective child parse node of said respective given parent node; and locations in the array holding respective character markers that correspond to respective characters of the computer program text wherein respective character markers are ordered in the array such that any respective given character marker in the array is encompassed by every respective set of begin and end markers that correspond to a parse node that covers said character.

17. A computer-readable medium encoded with a data structure including an ordered array that represents a mapping between computer program text and parse node information about a parse tree produced from said computer program text, the array comprising:

locations in the array holding respective sets of begin and end markers that correspond to respective parse nodes of the parse tree wherein respective begin markers are ordered in the array such that a respective corresponding begin marker for any respective given parse node is placed before each respective begin marker of each respective parse node beneath said parent node in the parse tree and wherein a respective corresponding end marker for said respective given parse node is placed after each respective end marker of each respective parse node beneath said parent node in the parse tree; and locations in the array holding respective character markers that correspond to respective characters of the computer program text wherein the respective character markers are ordered in the array such that any respective given character marker in the array is encompassed by every respective set of begin and end markers that correspond to a parse node that covers a given character that corresponds to the given character marker.

18. The array of claim 17 wherein the array further includes:

locations in the array holding respective character markers that are ordered in the array such that any respective given character marker that corresponds to a respective given character that is covered by a parse node in a higher level of the parse tree and by another parse node in a lower level of the parse tree is placed in the array between a set of begin and end markers that correspond to the parse node in the higher level of the parse tree and is placed in the array between another set of begin and end markers that correspond to the parse node in the lower level of the parse tree.

19. The array of claim 17 wherein the array further includes:

locations in the array holding respective character markers that are ordered in the array such that any respective given character marker that corresponds to a respective given character that is covered by a first parse node in a higher level of the parse tree and by a second parse node in a lower level of the parse tree is placed in the array between a first set of begin and end markers that correspond to the first parse node and is placed in the array between a second set of begin and end markers that correspond to the second parse node; and said respective given character marker being outside a third set of begin and end markers that correspond to a third parse node.

20. A computer-readable medium encoded with a parse data structure, said parse data structure comprising:

an array of no more than (N+2M)/4 bytes where a text represented by said parse data structure has N characters, and a parse tree corresponding to said parse data structure has M nodes; and wherein (2M)/4 bytes of the array correspond to the parse tree nodes and no more than N/4 bytes of the array represent the text.

21. The data structure of claim 20, wherein said array represents a set of no more than (N+2M) symbols, where each symbol of said set is chosen from a group comprising a begin parse node symbol, an end parse node symbol, and a character symbol.

22. The data structure of claim 21, wherein each symbol of said set is represented with 2 bits.

23. A computer-readable medium encoded with a parse data structure, said parse data structure comprising:

an array of no more than (N+2M) symbols, where each symbol is chosen from a group comprising a begin parse node symbol, an end parse node symbol, a single character symbol, and a block character symbol; and wherein a text represented by said data structure has N characters, and a parse tree corresponding to said data structure has M nodes.

24. The data structure of claim 23, wherein said block character symbol represents four sequential characters being associated with a parse node.

* * * * *